United States Patent [19]
Yamada et al.

[11] Patent Number: 5,627,665
[45] Date of Patent: *May 6, 1997

[54] LIQUID CRYSTAL DISPLAY DEVICE AND METHOD FOR PRODUCING THE SAME

[75] Inventors: Nobuaki Yamada, Higashiosaka; Nobukazu Nagae, Tenri; Noriaki Onishi; Shuichi Kozaki, both of Nara; Masayuki Okamoto, Tenri; Motohiro Yamahara, Osaka; Masahiko Kondo, Nara-ken; Wataru Horie, Hashimoto, all of Japan

[73] Assignee: Sharp Kabushiki Kaisha, Osaka, Japan

[*] Notice: The term of this patent shall not extend beyond the expiration date of Pat. No. 5,473,450.

[21] Appl. No.: 452,529

[22] Filed: May 30, 1995

Related U.S. Application Data

[62] Division of Ser. No. 274,438, Jul. 13, 1994, abandoned.

[30] Foreign Application Priority Data

Jul. 15, 1993 [JP] Japan ................... 5-199285
Aug. 31, 1993 [JP] Japan ................... 5-216700
Dec. 28, 1993 [JP] Japan ................... 5-338706

[51] Int. Cl.⁶ .............................................. G02F 1/13
[52] U.S. Cl. ............................................ 349/156; 349/94
[58] Field of Search ........................ 359/62, 51, 52, 359/99, 102; 428/1

[56] References Cited

U.S. PATENT DOCUMENTS

| | | | |
|---|---|---|---|
| 4,295,712 | 10/1981 | Ishiwatari | 350/350 |
| 4,579,423 | 4/1986 | Fergason | 350/350 |
| 4,596,445 | 6/1986 | Fergason | 350/350 |
| 4,662,720 | 5/1987 | Fergason | 350/350 |
| 4,671,618 | 6/1987 | Wu et al. | 350/350 |
| 4,815,826 | 3/1989 | Fergason | 350/350 |
| 4,890,902 | 1/1990 | Doane et al. | 350/350 |
| 5,089,904 | 2/1992 | Fergason | 350/350 |
| 5,103,326 | 4/1992 | Fergason | 350/350 |
| 5,262,882 | 11/1993 | Hikmet | 359/75 |
| 5,333,074 | 7/1994 | Hikmet | 350/350 |
| 5,357,356 | 10/1994 | Konuma et al. | 354/52 |
| 5,473,450 | 12/1995 | Yamada et al. | 359/62 |
| 5,528,401 | 6/1996 | Narutake et al. | 359/76 |

FOREIGN PATENT DOCUMENTS

| | | |
|---|---|---|
| 0568355 | 11/1993 | European Pat. Off. |
| 58-501631 | 9/1983 | Japan |
| 59-226322 | 12/1984 | Japan |
| 61-116329 | 6/1986 | Japan |
| 61-502128 | 9/1986 | Japan |
| 1-209424 | 8/1989 | Japan |
| 1-269922 | 10/1989 | Japan |
| 2-99920 | 4/1990 | Japan |
| 2-153319 | 6/1990 | Japan |
| 2-153318 | 6/1990 | Japan |
| 2-306217 | 12/1990 | Japan |
| 3-61925 | 3/1991 | Japan |
| 3-278024 | 12/1991 | Japan |
| 4-31823 | 2/1992 | Japan |
| 4-31824 | 2/1992 | Japan |
| 4-188105 | 7/1992 | Japan |
| 4-212928 | 8/1992 | Japan |

(List continued on next page.)

*Primary Examiner*—William L. Sikes
*Assistant Examiner*—James A. Dudek
*Attorney, Agent, or Firm*—Nixon & Vanderhye P.C.

[57] ABSTRACT

According to the present invention, a display medium layer is sandwiched between a TFT substrate and a counter substrate. In the display medium layer, resin walls are respectively formed in regions other than those where a plurality of segmented electrodes are formed, and liquid crystal portions are respectively formed in regions between the respective resin walls, corresponding to those where the segmented electrodes are formed. Disclination lines are formed on the interfaces between the resin walls and the liquid crystal regions. In a liquid crystal display device, liquid crystal molecules in the liquid crystal regions are radially oriented and at least one liquid crystal domain is formed in each liquid crystal region.

14 Claims, 39 Drawing Sheets

FOREIGN PATENT DOCUMENTS

| | | |
|---|---|---|
| 4-338923 | 11/1992 | Japan . |
| 4-323616 | 11/1992 | Japan . |
| 5-11237 | 1/1993 | Japan . |
| 5-27242 | 2/1993 | Japan . |
| 5-257135 | 8/1993 | Japan . |
| 5-281519 | 10/1993 | Japan . |
| 6-160814 | 6/1994 | Japan . |
| 6-160801 | 6/1994 | Japan . |
| WO83/01016 | 3/1983 | WIPO . |
| WO85/04262 | 9/1985 | WIPO . |

FIG.10
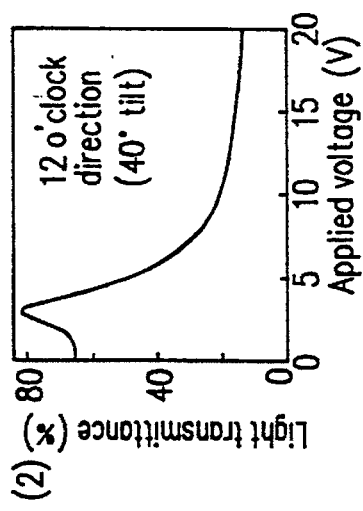
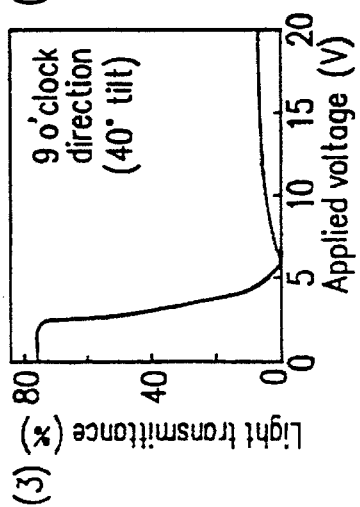
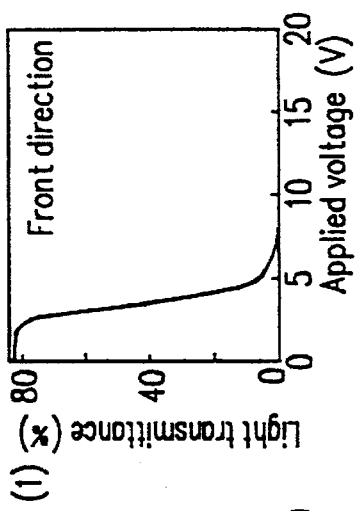
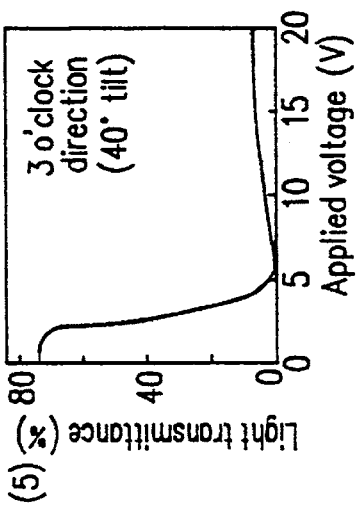
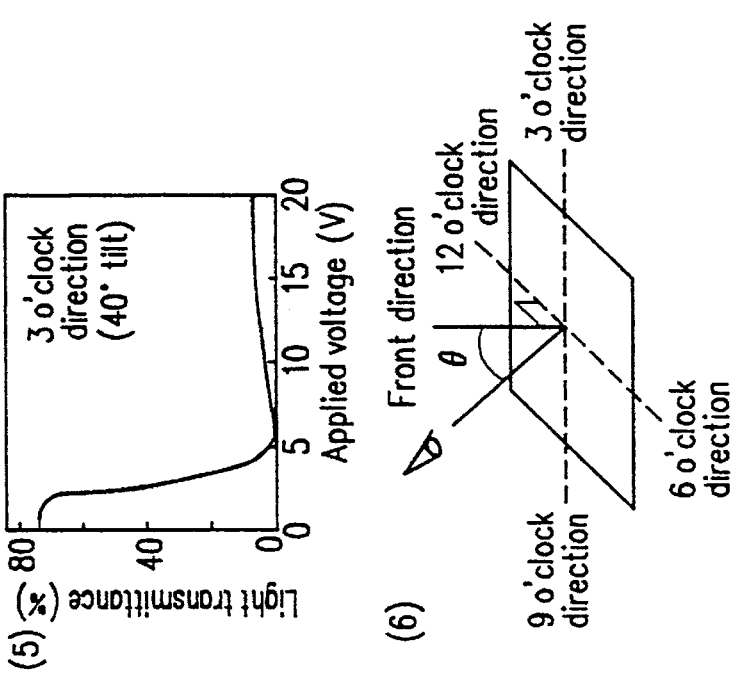

Z=d

Liquid crystal molecule orientation

Z=d/2

Z=0

Z=d liquid crystal molecule orientation

Z=d/2

Z=0

Transmission axis of polarizer

Transmission axis of analyzer

Brightness of regions A to D

| Region | A | B | C | D |
|---|---|---|---|---|
| Brightness | Middle | Light | Middle | Dark |

Brightness of regions A to D

| Region | A | B | C | D |
|---|---|---|---|---|
| Brightness | Almost the same | | | |

Brightness of region A₁ to D₁

| Region | A₁ | B₁ | C₁ | D₁ |
|---|---|---|---|---|
| Brightness | Middle | Light | Middle | Dark |

Brightness of region A₂ to D₂

| Region | A₂ | B₂ | C₂ | D₂ |
|---|---|---|---|---|
| Brightness | Middle | Dark | Middle | Light | g --- Liquid crystal region in which center axis is positioned at center h --- Liquid crystal region in which center axis is offset

LIQUID CRYSTAL DISPLAY DEVICE AND METHOD FOR PRODUCING THE SAME

This is a divisional of application Ser. No. 08/274,438, filed Jul. 13, 1994 now abandoned.

BACKGROUND OF THE INVENTION

1. Field of the Invention

The present invention relates to a liquid crystal display device and a method for producing the same. More specifically, the present invention relates to a liquid crystal display device having a display medium with a structure in which liquid crystal regions are partitioned by a polymeric material and a method for producing the same.

2. Description of the Related Art

As display devices utilizing an electro-optic effect, liquid crystal display devices using nematic liquid crystals have conventionally been used. Examples of such liquid crystal display devices include a twisted nematic (TN) liquid crystal display device and a super-twisted nematic (STN) liquid crystal display device. Liquid crystal display devices using ferroelectric liquid crystal have also been proposed. These liquid crystal display devices include a pair of glass substrates, nematic liquid crystal or smectic liquid crystal provided between the substrates, and two polarizing plates sandwiching the substrates.

Furthermore, as the display devices utilizing an electro-optic effect, liquid crystal display devices utilizing a light scattering phenomenon of liquid crystal, instead of using the polarizing plates, have been known. Such liquid crystal display devices use a dynamic scattering (DS) mode and a phase change (PC) mode.

In recent years, liquid crystal display devices requiring no alignment treatment have been proposed. Such a liquid crystal display device electrically regulates a transparent state and an opaque state by using the birefringence of a liquid crystal. More specifically, in such a liquid crystal display device, the refractive index of liquid crystal molecules with respect to ordinary light is matched with the refractive index of a supporting medium which supports the liquid crystal. Thus, liquid crystal molecules are oriented under the application of a voltage and hence a transparent state is displayed; whereas the orientation of the liquid crystal molecules is disturbed under the application of no voltage and hence a light scattering state is displayed. Japanese National Publication No. 61-502128 discloses a specific method: liquid crystal and photopolymerizable or thermosetting resin are mixed and resin is cured to deposit liquid crystal, whereby liquid crystal droplets are formed in the resin.

Japanese Laid-Open Patent Publication Nos. 4-338923 and 4-212928 disclose a liquid crystal display device using polarizing plates with improved viewing angle characteristics, i.e., a polymer dispersed liquid crystal device sandwiched with polarizing plates disposed so that the respective polarizing directions cross at right angles (hereinafter, referred to as crossed polarizing plates). These conventional liquid crystal display devices have improved viewing angle characteristics. However, the use of scattering of light for the elimination of polarization makes the brightness of the device ½ that of a TN liquid crystal display device. Thus, these conventional devices have not found a wide range of use.

Furthermore, Japanese Laid-Open Patent Publication No. 5-27242 discloses a method for improving viewing angle characteristics by disturbing the orientation of liquid crystal molecules with walls or projections of a polymer to form random domains. However, according to this method, liquid crystal domains are formed at random, a polymeric material enters a pixel portion, and a plurality of disclination lines formed at random between the liquid crystal domains are not eliminated even under the application of a voltage. For these reasons, the conventional liquid crystal display devices have the disadvantage of low contrast, light transmittance under the application of no voltage is low, that is, the black level is not satisfactory under the application of a voltage.

Accordingly, the conventional liquid crystal display devices using polarizing plates have poor viewing angle characteristics and hence are unsuitable for use as a liquid crystal display device for a wide viewing angle. For example, a TN liquid crystal display device undergoes alignment treatment so that liquid crystal molecules rise in the same direction under the application of a voltage. That is to say, the TN liquid crystal display device has a structure in which liquid crystal molecules have an initial orientation of 90° twist and rise in one direction at a certain angle, i.e., a pretilt angle. This makes the liquid crystal molecules tilt in the same direction in the case where a gray scale display is conducted to allow the liquid crystal molecules to rise, as shown in FIGS. 51(a) to 51(c). Because of this, as shown in FIG. 51(b), when the liquid crystal molecules are viewed from directions A and B, apparent refractive indices become different. This also makes the difference in contrast between directions A and B large, and in some cases, results in an abnormal display such as a change in hue and the reversal of black and white colors.

As described above, the conventional liquid crystal display devices have the disadvantage of poor viewing angle characteristics.

Another method for producing a liquid crystal display device using polarizing plates has been proposed. According to this method, first, a mixture containing liquid crystal and a photopolymerizable material is provided between a pair of substrates. Then, light is irradiated to the mixture to a predetermined pattern through a photomask. At this time, the liquid crystal is phase-separated from the polymeric material in a regular manner. As shown in FIGS. 52(a) to 52(c), when a voltage is applied to the device thus produced, liquid crystal molecules interact with the polymer and consequently, the liquid crystal molecules rise along walls in each direction. Because of this, apparent refractive indices become nearly the same in directions A and B in FIG. 52(b), improving viewing angle characteristics.

For improving the viewing angle characteristics most effectively, liquid crystal molecules in each pixel should be oriented so as to be symmetric with respect to an axis. However, the axisymmetric orientation requires walls, pillars, or the like of a polymer in the middle of the pixels. This leads to problems during practical use, such as the reduction of liquid crystal regions and decreased light transmittance under the application of no voltage. Furthermore, in this case, disclination lines between the liquid crystal domains cannot be controlled, which makes it impossible to eliminate the disclination lines even under the application of voltage. As a result, the display quality is degraded. Alternatively, the decrease in contrast due to difficulties in eliminating disclination lines degrades the display quality.

SUMMARY OF THE INVENTION

The liquid crystal display device of this invention, comprises: two substrates respectively defining a plurality of pixels, each pixel being a display unit, at least one of the substrates being transparent; and a display medium layer formed between the two substrates, having a supporting medium made of a polymeric material and a liquid crystal, the liquid crystal being respectively filled in a plurality of liquid crystal regions being partitioned by supporting walls made of the polymeric material in the supporting medium and each having a size corresponding to a size of each of the plurality of pixel regions, wherein molecules of the liquid crystal filled in the plurality of liquid crystal regions is axisymmetrically oriented in an imaginary plane parallel with a surface of the substrates, and at least one liquid crystal domain is positioned in each of the plurality of the liquid crystal regions.

In one embodiment of the present invention, one liquid crystal domain is positioned in each of the plurality of liquid crystal regions.

In another embodiment of the present invention, a plurality of liquid crystal domains are positioned in each of the plurality of liquid crystal regions, liquid crystal molecules in each domain are axisymmetrically oriented, and the supporting walls made of the polymeric material are present outside of each domain.

In still another embodiment of the present invention, a thin film made of a material selected from the group consisting of an organic material and an inorganic material is provided on surfaces of the two substrates.

In still another embodiment of the present invention, the two substrates are sandwiched between polarizing plates.

In still another embodiment of the present invention, a product $\Delta$ n·d of anisotropy of refractive index $\Delta$ n of the liquid crystal and a cell gap d between the two substrates is in the range of 300 nm to 650 nm.

In still another embodiment of the present invention, a twist angle of the liquid crystal between the two substrates when the liquid crystal is injected therebetween is in the range of 45° to 150°.

In still another embodiment of the present invention, the liquid crystal has a viscosity $\mu$ of 50 mPa.s or less at 20° C. and dielectric constant anisotropy $\Delta\epsilon$ of +3(1 kHz) or more.

In still another embodiment of the present invention, the liquid crystal satisfies a condition under which a voltage $V_{10}$ is 2 volts or less in a voltage-light transmittance characteristic at 25° C., in a TN cell when light transmittance of the liquid crystal changes from an initial state to 90%.

In still another embodiment of the present invention, a product $\Delta$ n·d of anisotropy of refractive index $\Delta$ n of the liquid crystal and a cell gap d between the two substrates is in the range of 1000 nm to 1400 nm, and a twist angle of the liquid crystal present in a cell is in the range of 45° to 150°.

In still another embodiment of the present invention, a product $\Delta$ n·d of anisotropy of refractive index $\Delta$ n of the liquid crystal and a cell gap d between the two substrates is in the range of 550 nm to 800 nm, and a twist angle of the liquid crystal present in a cell is in the range of 240° to 300°.

In still another embodiment of the present invention, the supporting walls reach each of the two substrates.

In still another embodiment of the present invention, a center axis of orientation of the liquid crystal regions present in the pixels is orthogonal to at least one of the substrates.

In still another embodiment of the present invention, disclination lines are formed at the periphery of the liquid crystal regions under an application of a voltage.

In still another embodiment of the present invention, the liquid crystal molecules in the liquid crystal regions are axisymmetrically oriented so as to be in parallel with the surface of the substrates, a center axis of an orientation of the liquid crystal regions is aligned in a vertical direction to the substrates, and the polymer material in the supporting walls is symmetrically oriented with respect to the center axis, whereby disclination lines are not formed in the liquid crystal regions under the application of a voltage.

In still another embodiment of the present invention, the liquid crystal molecules in the liquid crystal regions are axisymmetrically oriented so as to be in parallel with the surface of the substrates, a center axis of orientation of the liquid crystal regions is aligned in a vertical direction to the substrates, and the polymer material in the supporting walls is oriented in one direction, whereby disclination lines are not formed in the liquid crystal regions under the application of a voltage.

In still another embodiment of the present invention, a polymer present between the substrates and the liquid crystal in the liquid crystal regions has a pretilt angle axisymmetric with respect to a center axis of orientation of the liquid crystal regions, whereby disclination lines are not formed in the liquid crystal regions under the application of a voltage.

In still another embodiment of the present invention, a black mask is provided on one of the substrates so as to correspond to a center portion of the domains in which the liquid crystal molecules are radially oriented.

According to another aspect of the present invention, the method for producing a liquid crystal display device of this invention comprises the steps of: (1) providing a mixture containing a liquid crystalline compound and a photopolymerizable compound between two substrates, at least one of which is transparent; and (2) irradiating light having a predetermined irradiation intensity distribution to the mixture between the two substrates, allowing a phase separation of the mixture involved in polymerization thereof to be effected, and uniformly distributing supporting walls made of a resin and a liquid crystal.

In one embodiment of the present invention, a photopolymerization initiator is added to the mixture.

In another embodiment of the present invention, in step (2), a uniform distribution of the supporting walls and the liquid crystal is determined so as to correspond to an arrangement pitch of a plurality of pixels defined by the two substrates.

In still another embodiment of the present invention, step (2) includes alignment treatment for allowing molecules of the liquid crystal partitioned by the supporting walls to be axisymmetrically oriented in an imaginary plane parallel with a surface of the substrates.

In still another embodiment of the present invention, a light-shielding chip corresponding to a center portion of an axisymmetric orientation of the liquid crystal molecules is formed on either of the two substrates.

In still another embodiment of the present invention, the mixture is irradiated with light having uniform irradiation intensity distribution under a condition that a UV-rays component in a short wavelength region of 300 nm or less is shielded.

In still another embodiment of the present invention, the UV-rays component in a short wavelength region is shielded by using a UV-rays cut filter.

In still another embodiment of the present invention, the UV-rays component in a short wavelength region is shielded by using an inorganic and organic material which makes transmittance of light with a wavelength of 300 nm not more than 10% and transmittance of light with a wavelength of 350 nm at least 40%, assuming that light transmittance with respect to air is 100%.

In still another embodiment of the present invention, while being substantially controlled, at least one of an electric field and a magnetic field is applied to the mixture during light irradiation.

In still another embodiment of the present invention, the electric field is applied by using an electrode for a display.

In still another embodiment of the present invention, light having the predetermined irradiation intensity distribution is formed by using a photomask.

Alternatively, the method for producing a liquid crystal display device of this invention comprises the steps of: injecting a mixture containing a liquid crystalline compound, a photopolymerizable compound, and a liquid crystalline photopolymerizable compound between electrode substrates in a cell, at least one of the substrates being transparent; and irradiating the mixture with light having a uniform irradiation intensity distribution while at least one of an electric field and a magnetic field is applied to the mixture, thereby allowing phase separation involved in polymerization to be effected.

In one embodiment of the present invention, a temperature of the cell during light irradiation is set to be at least a temperature at which the liquid crystalline compound to be used exhibits an isotropic phase, and then the cell is cooled.

In another embodiment of the present invention, the photopolymerizable compound includes a fluorinated compound.

The liquid crystal display device of the present invention has a structure in which a display medium layer is sandwiched between two substrates. For producing such a liquid crystal display device, in the first step, a mixture containing a liquid crystalline compound, a photopolymerizable compound, and a photopolymerization initiator is provided between the two substrates. In the second step, the mixture is irradiated with light having a predetermined irradiation intensity distribution, thereby allowing phase separation involved in polymerization of the mixture to be effected. In this way, the display medium layer having a structure in which supporting walls made of the polymer (resin) and liquid crystal are uniformly distributed is obtained.

Molecules in the liquid crystal filled in a plurality of liquid crystal regions in the display medium layer are axisymmetrically oriented in an imaginary plane parallel with a surface of the substrates. Furthermore, at least one liquid crystal domain is positioned in each of the plurality of liquid crystal regions.

When the angle and direction, in which the liquid crystal display device of the present invention are observed from outside, are changed, the dependence of display contrast on a viewing angle can be eliminated because of the axisymmetric orientation of the liquid crystal molecules. Also, the axisymmetric orientation of the liquid crystal molecules prevents the disclination lines from being formed in the liquid crystal region, and thus the display quality is remarkably improved.

According to the present invention, the product $\Delta$ n·d of anisotropy of refractive index $\Delta$ n of the liquid crystal material and a cell gap d (distance between substrates sandwiching a display medium) is set to be in the range of 300 to 650 nm, and the twist angle of liquid crystal between the substrates is set to be in the range of 45° to 150° when the liquid crystal is injected therebetween. Because of this, the light transmittance of the display device can be optimized, and the light transmittance of the liquid crystal display device can be remarkably improved.

Thus, the invention described herein makes possible the advantages of (1) providing a liquid crystal display device with markedly improved viewing angle characteristics and display quality; and (2) a simplified method for producing a liquid crystal display device.

These and other advantages of the present invention will become apparent to those skilled in the art upon reading and understanding the following detailed description with reference to the accompanying figures.

BRIEF DESCRIPTION OF THE DRAWINGS

FIG. 10 shows graphs illustrating the viewing angle characteristics of a conventional TN liquid crystal display device.

DESCRIPTION OF THE PREFERRED EMBODIMENTS

Hereinafter, the present invention will be described by way of illustrative examples with reference to the accompanying drawings. It is noted that the present invention is not limited to the following examples in terms of size, material, and structure.

EXAMPLE 1

Figure 1:
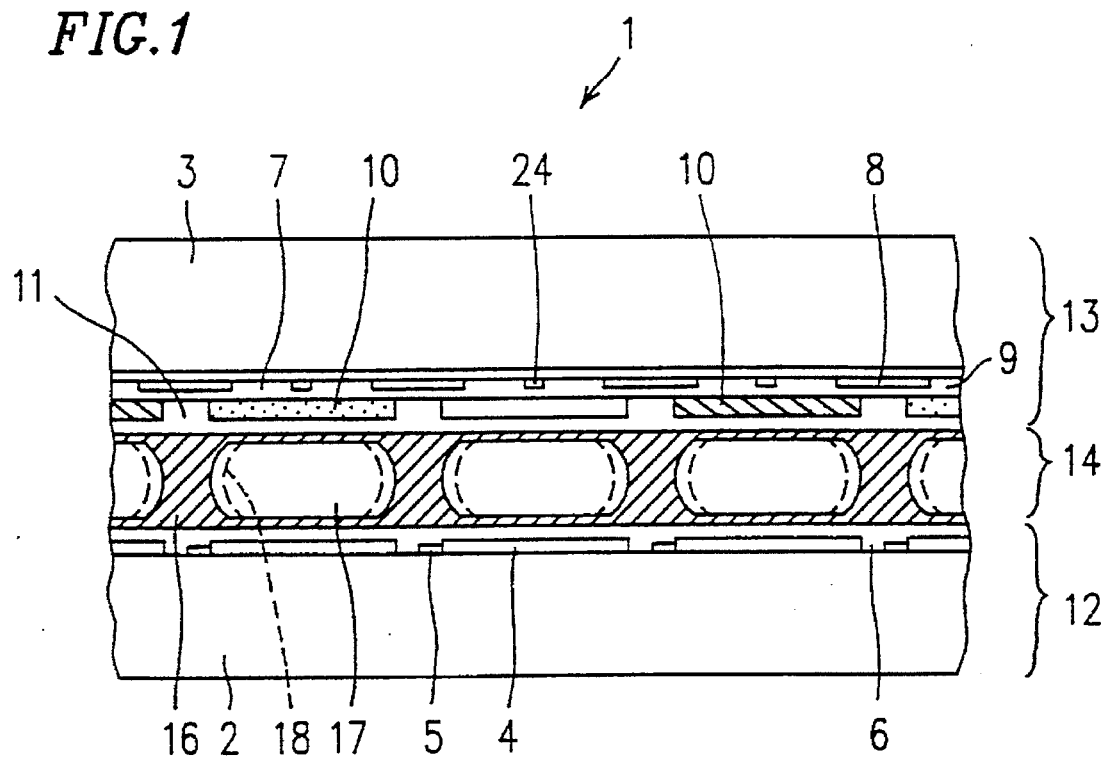
FIG. 1 is a cross-sectional view of a liquid crystal display device in Example 1 according to the present invention.

FIG. 1 is a cross-sectional view of a liquid crystal display device 1 in Example 1 according to the present invention. The liquid crystal display device 1 includes a pair of glass substrates 2 and 3 having a thickness of 1.1 mm each. On the glass substrate 2, a plurality of segmented electrodes 4 and a plurality of switching devices 5 are provided in a matrix. The segmented electrodes 4 are made of a mixture containing indium oxide and tin oxide (ITO), and have a thickness of 50 nm. The switching devices work for applying a signal voltage to the segmented electrodes 4, or for interrupting the signal voltage. As the switching devices, for example, a thin film transistor (TFT) is used. An organic thin film 6 covers the segmented electrodes 4 and the switching devices 5. It is noted that the organic thin film 6 can be omitted. Accordingly, a TFT substrate 12 is constructed.

On the other glass substrate 3, a counter electrode 7 made of ITO is provided. In addition, a black mask 8 having light-shielding portions is positioned on the counter electrode 7 so that the light-shielding portions correspond to portions between the segmented electrodes 4 on the glass substrate 2. A smoothing film 9 covers the black mask 8. A color filter 10 having red (R), green (G), and blue (B) primitives, in an appropriate color pixel arrangement, is incorporated on the smoothing film 9 so that each color corresponds to each segmented electrode 4. The color filter 10 is covered with an organic thin film 11. It is noted that the organic thin film 11 can be omitted. Accordingly, a counter substrate 13 is constructed.

A display medium layer 14 is sandwiched between the TFT substrate 12 and the counter substrate 13. The display medium layer 14 includes resin walls 16 (i.e., polymer walls) and liquid crystal regions 17. The resin walls 16 are formed in regions of the display medium layer 14 excluding regions where the segmented electrodes 4 are formed, and the liquid crystal regions 17 are formed between the respective resin walls 16 and in regions of the display medium layer 14 where the segmented electrodes 4 are formed. Disclination lines 18 are formed on interfaces between the resin walls 16 and the liquid crystal regions 17. In the liquid crystal display device 1, liquid crystal molecules in the liquid crystal regions 17 are oriented symmetrically with respect to an axis, and at least one liquid crystal domain is formed in each liquid crystal region 17.

A process for producing the liquid crystal display device 1 having the above-mentioned structure will be described.

First, a display cell was made of the TFT substrate 12, the counter substrate 13, and spacers (not shown) so that a cell gap was kept to be identical with the diameter of the spacers. Spherical or cylindrical spacers having a diameter of 6 µm were used.

Figure 2:
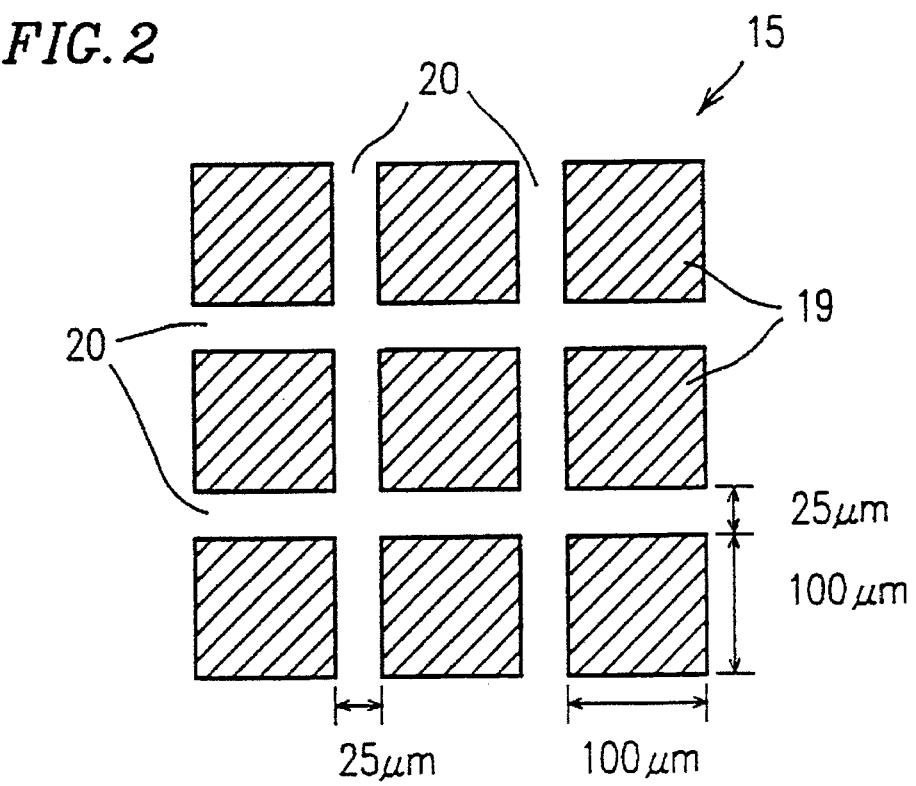
FIG. 2 is a plan view of a photomask used for producing the liquid crystal display device shown in FIG. 1.

Next, a photomask 15, as shown in FIG. 2, was placed on the display cell thus obtained. The photomask 15 had a plurality of light-shielding portions 19 formed in a matrix, each having a size of 100 µm×100 µm and being arranged with light-transmitting portions 20 having a width of 25 µm interposed therebetween.

A mixture was injected into the display cell in a transparent state at 35° C. The mixture was prepared by mixing 0.1 g of R-684 (manufactured by Nippon Kayaku Co., Ltd.), 0.05 g of styrene, 0.85 g of isobornyl methacrylate, a liquid crystal material ZLI-4729 (containing 0.4% by weight of S-811: manufactured by Merck & Co., Inc.), and 0.0025 g of photopolymerization initiator (Irgacure 651).

Under the condition of the same temperature, the display cell was irradiated with collimated light beams at 10 mW/cm$^2$ using a high-pressure mercury lamp through a dot pattern of the photomask 15 for one second, and the display cell was allowed to stand for 30 seconds without the irradiation. This cycle was repeated 20 times. Then, the display cell was irradiated with UV-rays for 10 minutes to cure the resin. After the resin was cured, the display cell was observed with a polarizing microscope, indicating that liquid crystal domains having the same size and arrangement pitch as those of the dot pattern of the photomask 15 were formed.

Next, two crossed-polarizing plates were attached to both sides of the display cell to fabricate the liquid crystal display device 1, as shown in FIG. 1, having a plurality of liquid crystal regions 17 partitioned by the resin walls 16.

The liquid crystal display device 1 thus produced having the above-mentioned structure includes the liquid crystal regions 17 partitioned by the resin walls 16. The liquid crystal regions 17 contain the fewest number of liquid crystal domains, and liquid crystal molecules in each liquid crystal domain are oriented symmetrically with respect to an axis in a virtual plane parallel with the substrate surface. In such a structure, the disclination lines 18 in the pixels can be minimized and excellent viewing angle characteristics with high contrast can be realized. According to the present invention, a method for producing the liquid crystal display device having such a structure can be realized.

Hereinafter, the characteristics of the liquid crystal display device 1 having the structure in Example 1 and a method for producing the same including the steps in Example 1 will be described.

(Orientation of Liquid Crystal Molecules in Domains)

Figure 3:
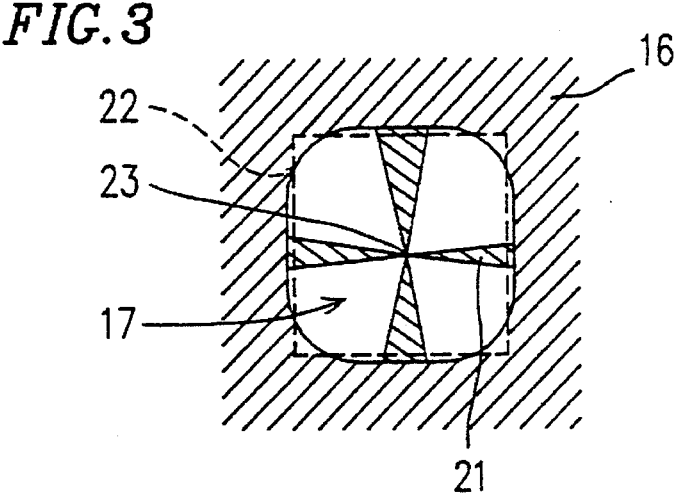
FIG. 3 is a plan view of one pixel of the liquid crystal display device shown in FIG. 1, observed with a polarizing microscope.

As shown in FIG. 3, in the liquid crystal domain of the liquid crystal display device 1 according to the present invention, a pixel region 22, having the same shape as that of the segmented electrode 4, and the liquid crystal region 17, having almost the same shape as that of the pixel region 22, are formed, being partitioned by the resin wall 16. In the liquid crystal region 17, a cross-shaped extinction pattern 21 is observed in the polarization axis directions of the polarizing plates. The extinction pattern 21 shows that the liquid crystal molecules in the liquid crystal region 17 are oriented axisymmetrically, i.e., radially or concentrically with respect to a center disclination point 23 in the liquid crystal region 17.

Figure 4:
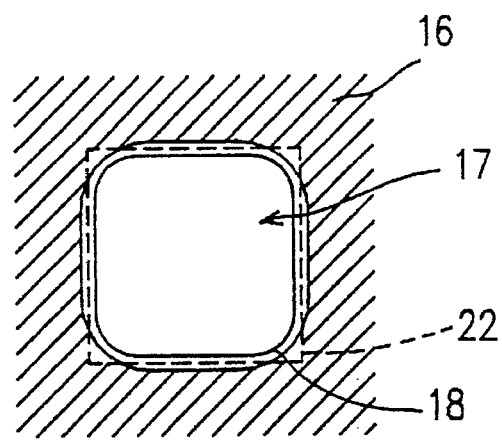
FIG. 4 is a state of disclination lines generated under the application of a voltage in one pixel of the liquid crystal display device shown in FIG. 1.

As shown in FIG. 4, in the liquid crystal domain having such an orientation of liquid crystal molecules, although the disclination line 18 is formed at the periphery of the liquid crystal region (or liquid crystal domain) 17 under the application of a voltage, the disclination line 18 is not formed within the liquid crystal region 17. Thus, it is possible to form the disclination line 18 outside of the pixel region 22. By forming the disclination line 18 under the light-shielding portions of the black mask 8 or the like as shown in FIG. 1, a liquid crystal display device with an improved black level and contrast can be obtained. As a result, the display quality of the liquid crystal display device of the present invention can be improved.

Figure 52A:
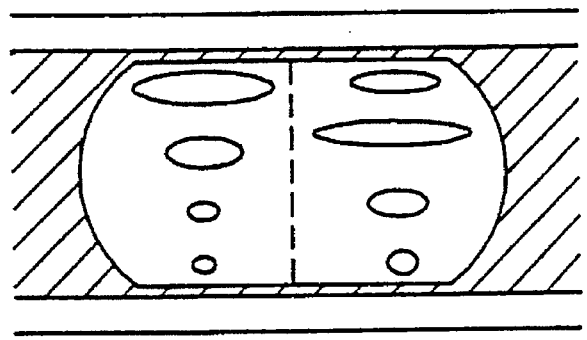
FIGS. 52(a) to 52(c) are cross-sectional views illustrating the behavior of liquid crystal molecules of the liquid crystal display device according to the present invention.
Figure 52B:
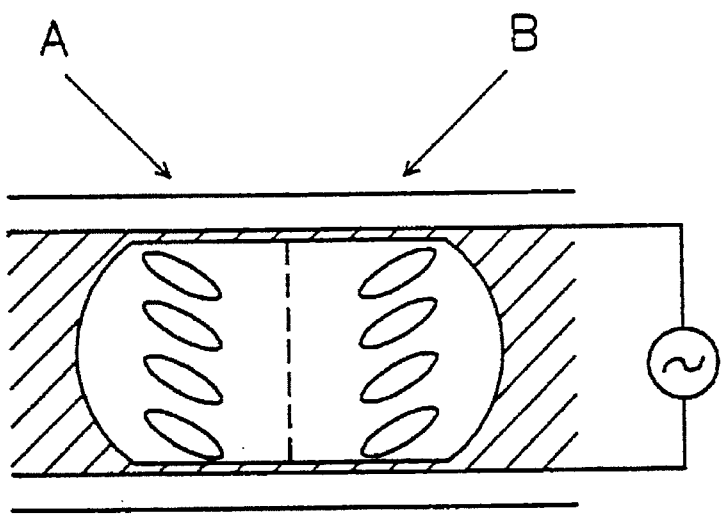
Figure 52C:
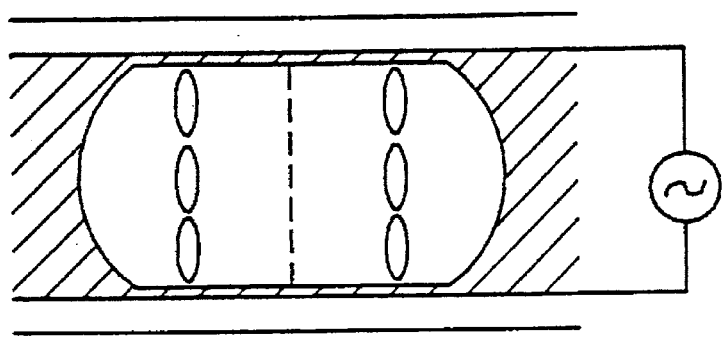

When a display voltage is applied to the liquid crystal display device having the above-mentioned orientation, the liquid crystal molecules rise so as to be in parallel with the direction orthogonal to the glass substrates. At this time, the liquid crystal molecules rise as shown in FIGS. 52(a) to 52(c). More specifically, the liquid crystal molecules rise axisymmetrically becoming an initial orientation in the present example. Because of this orientation, the apparent refractive index of the liquid crystal display device 1 in any direction becomes uniform. Thus, the problem of poor viewing angle characteristics can be solved.

By placing the black mask 8 on the counter substrate 3 so that the light-shielding portions correspond to the center disclination points 23 positioned at the center of the pixel region 22, the center disclination points 23 can be made so that they are hardly seen. In this respect, the display quality of the liquid crystal display device of the present invention can be improved.

(Number of Domains in Pixel)

It is desirable that the number of domains in each pixel is as low as possible. A number of domains present in one pixel causes the disclination lines to be formed between the respective domains and decreases the black level of a display. It is preferred that each liquid crystal region 17, in which the liquid crystal molecules are radially oriented, covers each pixel region 22, as shown in FIG. 3. In this case, as shown in FIG. 4, under the application of a voltage to the pixel region 22, the disclination line 18 is formed at the periphery of the liquid crystal region 17, so that the disclination line 18 is prevented from being formed within the pixel region 22.

Figure 5:
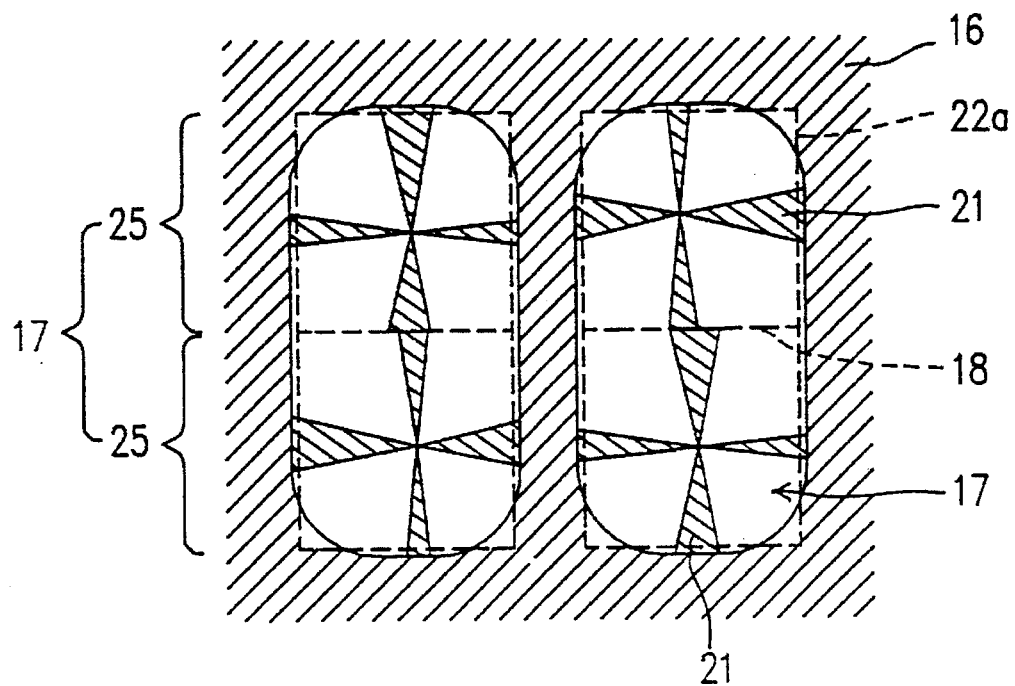
FIG. 5 is a plan view of a liquid crystal display device in a modified example according to the present invention, observed with a polarizing microscope.

As shown in FIG. 5, the liquid crystal display device of the present invention is produced so as to have a rectangular pixel region 22a. In this case, at least two domains 25, each domain having radially oriented liquid crystal molecules, are combined to form the liquid crystal region 17. In such a liquid crystal display device, it is confirmed that the viewing angle characteristics are excellent because of the same principle utilized in the liquid crystal display device 1 of the present example in which each domain constitutes each liquid crystal region 17.

Furthermore, in the structure of FIG. 5, the disclination line 18 can be made so that it is hardly seen under the application of a voltage by matching the direction, in which the disclination line 18 extends between two domains 25, with the polarization axes of the polarizing plates. Alternatively, the liquid crystal region 17 can be formed of a plurality of pixel regions 22. In this case, the liquid crystal molecules can have a radial or concentric orientation.

(Method for Allowing Liquid Crystal Molecules to be Axisymmetrically Oriented)

For allowing the liquid crystal molecules to be axisymmetrically oriented, the above-mentioned mixture containing liquid crystal, photopolymerizable material, and photopolymerization initiator is provided in a display cell, and the display cell is exposed to UV-rays through a photomask, the UV-rays having an irregular light intensity distribution in an irradiating plane. Upon the irradiation of the UV-rays, photopolymerization is effected in regions of the mixture corresponding to the light-transmitting portions other than the light-shielding portions of the photomask. Then, the photopolymerizable material is cured to cause a concentration gradient therein. As a result, polymerization proceeds while the photopolymerizable material moves from the center of the photomask to the ends thereof.

In this case, the conditions for producing a liquid crystal display device are set so that a glass transition temperature Tg of the cured photopolymerizable material (resin) is at room temperature or more, preferably 60° C. or more, and walls, columns, and the like of the polymeric material are not formed in weak light irradiated regions. Thus, a liquid crystal display device, in which the liquid crystal molecules are axisymmetrically oriented with respect to the vicinity of the center of each weak light irradiated region, can be obtained.

The condition for preventing the polymer walls, columns, and the like from being formed in the weak light irradiated regions is a polymerization speed related to the size of a pixel. The polymerization speed is changed by varying the composition of the photopolymerizable material according to the size of a pixel. This prevents the polymer walls or columns from being formed in the weak light irradiated regions. For example, in the case of a pixel with a size of 100 μm or less, the photopolymerizable material is made of a material having a relatively high polymerization speed, such as acrylate. In the case of a pixel with a size of 100 μm or more, by using acrylate mixed with molecules containing a double bond having a resonance system, such as methacrylate and styrene having an effect of suppressing a polymerization speed, a photopolymerization speed is decreased, and a phase separation speed between the liquid crystal and the polymeric material is decreased. In this way, the polymeric material can be prevented from entering the weak light irradiated regions.

Furthermore, the number of photopolymerizable functional groups affects the phase separation speed between the liquid crystal material and the polymeric material. When a multi-functional photopolymerizable material having 2 or 3 functional groups in each molecule is used, the gelation speed of a polymer and the phase separation speed increase. A monofunctional resin material decreases the phase separation speed between the liquid crystal material and the polymeric material, and hence is suitable for a large pixel. These compounds can be used in combination and selected in accordance with the size of a pixel.

A polymeric material to be used is a photopolymerizable material and the like. Examples of the photopolymerizable material include acrylic acid and acrylic acid ester having a long chain alkyl group with 3 or more carbon atoms or a benzene ring, such as isobutyl acrylate, stearyl acrylate, lauryl acrylate, isoamyl acrylate, n-butyl methacrylate, n-lauryl methacrylate, tridecyl methacrylate, 2-ethylhexyl acrylate, n-stearyl methacrylate, cyclohexyl methacrylate, benzyl methacrylate, 2-phenoxyethyl methacrylate, isobornyl acrylate, and isobornyl methacrylate; a multifunctional material having two or more functional groups for enhancing physical strength of a polymer, such as bisphenol A dimethacrylate, bisphenol A diacrylate, 1,4-butanediol dimethacrylate, 1,6-hexanediol dimethacrylate, trimethylol propane trimethacrylate, trimethylol propane triacrylate, tetramethylol methane tetraacrylate, neopentyl diacrylate, and R-684 (manufactured by Nippon Kayaku Co., Ltd.); and materials obtained by halogenation, in particular, compounds obtained by chlorinating and fluorinating these monomers, such as 2,2,3,4,4,4-hexafluorobutyl methacrylate, 2,2,3,4,4,4-hexachlorobutyl methacrylate, 2,2,3,3-tetrafluoropropyl methacrylate, 2,2,3,3-tetrachloropropyl methacrylate, perfluorooctylethyl methacrylate, perchlorooctylethyl methacrylate, perfluorooctylethyl acrylate, and perchlorooctylethyl acrylate.

(Polymerization Inhibitor)

In order to increase the size of a liquid crystal droplet (i.e., the liquid crystal region 17), a compound for inhibiting polymerization is preferably added to the above-mentioned polymerizable material. Examples of the inhibitor include monomers, compounds, and the like which stabilize a radical with a resonance system after the formation of the radical, such as styrene, p-chlorostyrene, p-methylstyrene, p-phenylstyrene, p-fluorostyrene, and nitrobenzene.

(Photopolymerization Initiator)

As the photopolymerization initiator, general photopolymerization initiators such as Irgacure 651, Irgacure 184, Irgacure 907 (manufactured by CIBA-GEIGY Corporation), and Darocure 1173, Darocure 1116, Darocure 2956 (manufactured by E. Merk) can be used. Alternatively, a sensitizer and the like which can be polymerized with visible light can be used for enhancing the holding ratio.

The added amount of these photopolymerization initiators is varied depending upon the reactivity of each compound. According to the present invention, although there is no particular limit, the photopolymerization initiator is added preferably in an amount of 0.01% to 5% by weight based on the total weight of the mixture containing the liquid crystal and the photopolymerizable material (including liquid crystalline photopolymerizable material). In the case where the added amount is more than 5% by weight, the phase separation speed between the liquid crystal and the polymer is too high to be controlled, resulting in small liquid crystal droplets. This requires a high driving voltage. In addition, the aligning force in the homeotropic direction or in the horizontal direction of an alignment film on the substrate becomes weak, and the size of the liquid crystal region 16 in each pixel decreases. That is to say, in the case where a photomask is used, liquid crystal droplets are formed in the regions corresponding to the light-shielding portions of the photomask, decreasing contrast. In the case where the added amount is less than 0.01%, the polymer is not sufficiently cured.

(Liquid Crystal Material)

The liquid crystal to be used in the present invention is an organic mixture exhibiting a liquid crystalline state in the vicinity of room temperature. Examples of such liquid crystals include nematic liquid crystal (including liquid crystal for dual frequency drive, Δε<0), cholesteric liquid crystal (in particular, liquid crystal having selective reflection characteristics with respect to visible light), smectic liquid crystal, ferroelectric liquid crystal, and discotic liquid crystal. These liquid crystals can be mixed, and in particular, nematic liquid crystal or nematic liquid crystal with cholesteric liquid crystal (chiral agent) added is preferred in terms of characteristics. Liquid crystals excellent in chemical reaction resistance are more preferred since photopolymerization is effected during the processing.

The dielectric constant Δε of the liquid crystal is a factor affecting the driving voltage of the device; Δε>3 or more is preferred. When the dielectric constant Δε is less than 3, the response speed of the device decreases with the application of a driving voltage. For lowering the driving voltage so as to drive a TFT element, Δε≧5 is more preferred. The viscosity of the liquid crystal also affects the response speed. For example, liquid crystals having a viscosity of 30 cp (25° C.) or less, more preferably 20 cp or less may be used. Specifically, liquid crystals having a functional group such as a fluorine atom may be used. Examples of such liquid crystal include ZLI-4801-000, ZLI-4801-001, and ZLI-4792 (manufactured by Merck & Co., Inc.).

(Polymerizable Liquid Crystal Material)

For providing the mixture containing the liquid crystal and the photopolymerizable material with liquid crystallinity and for injecting the mixture into a display cell in a nematic state or allowing the orientation to be caused in the polymer walls, a polymerizable liquid crystal material having both of these characteristics is preferably used. These compounds have the effects of decreasing volatility of the photopolymerizable material at the time of vacuum injection and suppressing the change in composition at the time of injection of the mixture containing liquid crystal, photopolymerizable material, and photopolymerization initiator. For selecting these liquid crystal materials and liquid crystalline compounds having a polymerizable functional group in its molecule, it is preferred, from the viewpoint of miscibility, that the respective portions exhibiting liquid crystallinity are similar to each other. In particular, the liquid crystalline compound having a polymerizable functional group is also preferably a fluorine and chlorine type liquid crystal material having specific chemical characteristics.

Although there is no special limit, the compound having a liquid crystalline functional group in its molecule to be used in the present invention refers to a compound represented by the following Formula 1, which hardly disturbs the liquid crystallinity of the liquid crystal molecules of a host.

A-B-LC (monofunctional),

A'-B'-LC' (bifunctional)    (1)

In Formula 1, A and A' are polymerizable functional groups having an unsaturated bond such as $CH_2=CH-$, $CH_2=CH-COO-$, and $CH_2=CH-COO-$, or having a heterocyclic ring structure with distortion such as

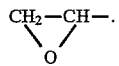

B and B' are connecting groups connecting the polymerizable functional group with the liquid crystalline compound, such as an alkyl chain ($-(CH_2)_n-$), an ester bond ($-COO-$), an ether bond ($-O-$), a polyethylene glycol chain ($-CH_2CH_2O-$), and connecting groups obtained by combining these connecting groups. These connecting groups preferably exhibit liquid crystallinity when mixed with the liquid crystal material. Therefore, a connecting group having a length with 6 or more bonds from the polymerizable functional group to a rigid portion of the liquid crystal molecule is particularly preferred. Furthermore, LC is a liquid crystalline compound which is a compound represented by the following Formula 2 or a cholesterol ring and its derivatives:

D-E-G    (2)

In the case of a monofunctional material, in the above formula, G is a polar group allowing the dielectric constant anisotropy of liquid crystal and the like to be exhibited, such as a benzene ring, a cyclohexane ring, a paradiphenyl ring, and a phenylcyclohexane ring having a functional group such as $-CN-$, $-OCH_3$, $-F$, $-Cl$, $-OCF_3$, $-OCCl_3$, $-H$, and $-R$ (R: alkyl group). E is a functional group connecting D with G, such as a single bond, $-CH_2-$, $-CH_2CH_2-$, $-O-$, $-C\equiv C-$, and $-CH=CH-$. D is a functional group connected to B in Formula 1, which is a portion affecting the level of anisotropy of dielectric constant and anisotropy of refractive index. Examples of such a functional group include a paraphenyl ring, 1,10-diphenyl ring, 1,4-cyclohexane ring, and 1,10-phenylcyclohexane ring.

In the case of a multi-functional liquid crystal material having 2 or more functional groups, LC' in Formula 1 is preferably an oblong rigid material. Examples of the oblong rigid material include molecules such as a diphenyl ring, a terphenyl ring, and a phenylcyclohexane ring. These molecules are not required to be symmetric, and a structure obtained by combining these rings can be used.

(Mixed Ratio Between Liquid Crystal and Polymerizable Material)

The mixing weight ratio between the liquid crystal and the polymerizable compound is varied depending upon the size of a pixel. The weight ratio between the liquid crystal and the polymerizable compound is preferably 50:50 to 97:3, and more preferably 70:30 to 90:10. When the proportion of the liquid crystal material is less than 50% by weight, the effect of the resin walls 16 is enhanced to remarkably increase the driving voltage of a display cell. As a result, the practical application is lost. When the proportion of the liquid crystal material exceeds 97% by weight, the physical strength of the polymer walls 16 decreases, making it impossible to obtain stable performance. Furthermore, regarding the weight ratio between the liquid crystalline compound and the non-liquid crystalline polymerizable compound, the liquid crystalline compound is preferably 0.5% by weight or more as long as the above range of the weight ratio is maintained.

(UV-rays Irradiation Distribution)

For exactly transferring the shape of a photomask to the mixture of liquid crystal and photopolymerizable material, a method for providing a UV-rays irradiation distribution is important. It is desirable that a uniform UV-rays irradiation distribution is provided by using a photomask, a microlens, an interfering plate, and the like. The photomask can be positioned either inside or outside of the cell as long as the uniform UV-rays irradiation distribution can be provided.

The photomask is desirably placed closer to the mixture of liquid crystal and photopolymerizable material. When the photomask is placed far away from the cell, the transferred image of the photomask is blurred to decrease the effect of the present invention. A light source of UV-rays preferably has a structure capable of generating collimated light beams.

According to the experimental results of the present inventors, when a photomask which forms a weak light irradiated region which is 30% or less of a pixel is used, a liquid crystal droplet to be formed also becomes 30% or less of the pixel, and a number of interfaces between the liquid crystal and the polymer are formed within each pixel, resulting in lowered contrast due to light scattering. A photomask, which can form a weak light irradiated region larger than the pixel, that is, which forms very few interfaces between the liquid crystal and the polymer in the pixel, is preferred. More specifically, a photomask which allows UV-rays to be irradiated to only portions other than pixels is preferred.

In a mode of the present invention using no light scattering between the polymer and the liquid crystal material, the weak light irradiating regions of the photomask preferably covers 30% or more of each pixel and locally decreases the intensity of UV-rays. Although there is no special limit according to the present invention, examples of the configuration of the weak light irradiating region include a circle, a square, a trapezoid, a rectangle, a hexagon, a diamond shape, a letter shape, a shape obtained by using a curve and/or a straight line; shapes obtained by deleting a part of these configurations; shapes obtained by combining these configurations; and an assembly of these configurations.

Furthermore, a photomask or the like, which makes a pixel a weak light irradiated region, is preferred, since such a photomask decreases scattering intensity in the pixel and increases contrast of the liquid crystal display device.

In the examples according to the present invention, one kind or more configurations can be used. For improving the uniformity of the size of a liquid crystal droplet, one kind of configuration is preferred.

One of the features of the present invention is that the resin walls 16 are uniformly arranged in the horizontal direction, that is, arranged along the pixels. Thus, the position of the weak light irradiating regions of the photomask plays an important role. The weak light irradiating regions are positioned so as to match with the pitch of the pixels, and desirably positioned so that one weak light irradiating region corresponds to one pixel. One weak light irradiating region can be positioned over a plurality of pixels. The weak light irradiating regions can be positioned per column or over the entire group of a plurality of pixels.

For measuring the configuration of a liquid crystal droplet, a polarization microscope is used. The cell is peeled into two substrates, the liquid crystal molecules are removed with a solvent, and the remaining polymer matrix is measured. Since some liquid crystal droplets are damaged during the production of a sample, 20 liquid crystal droplets maintaining the most excellent configuration are selected for observation. Thus, the same uniformity as that of the liquid crystal droplets is required for the photomask.

The weak light irradiating regions of the photomask are not required to be formed independently and can be connected at the ends thereof, as long as the regions most effectively shielding UV-rays have the above-mentioned configuration and arrangement. A cell fabricated by using this method is combined with polarizing plates to form a liquid crystal display device in which liquid crystal molecules are confined in polymer walls or partially partitioned by the polymer walls. Such a liquid crystal display device can be used as a large screen, a film, and the like. In addition, as a substrate material for the liquid crystal display device, a film and a silicon substrate as well as glass can be used.

(Disclination Line)

In general, in the liquid crystal display device in which liquid crystal molecules are radially oriented, the liquid crystal molecules are not oriented in one direction, so that distortion is caused between the molecules. In particular, disclination lines are formed in the vicinity of the interfaces between the polymer and the liquid crystal regions under the application of a voltage so as to surround liquid crystal domains. According to the present invention, liquid crystal regions larger than the pixel regions are formed, and the interfaces between the polymer and the liquid crystal regions are light-shielded with the black mask 8, as shown in FIG. 1. This results in a liquid crystal display device in which the disclination lines are not present in the pixel regions and which has excellent viewing angle characteristics.

(Driving Method)

The cell thus produced can be driven by a simple matrix drive method, or an active matrix drive method using a switching device such as a TFT and an MIM. According to the present invention, there is no special limit to the driving method.

Figure 6:
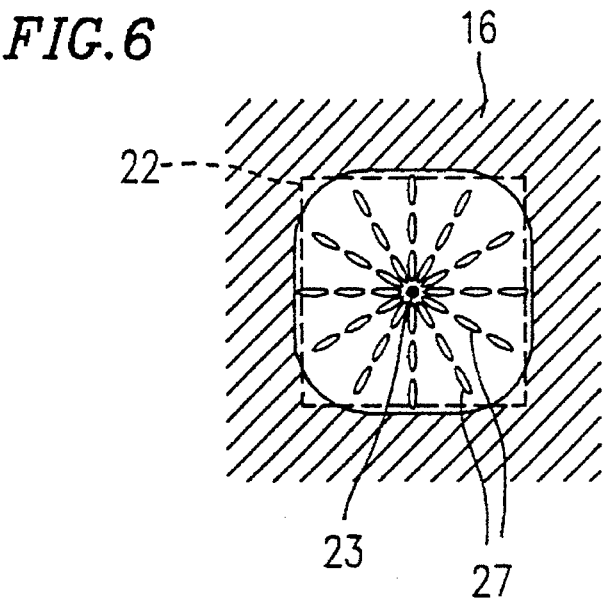
FIG. 6 is a plan view showing an orientation state of liquid crystal molecules in an example according to the present invention.
Figure 7:
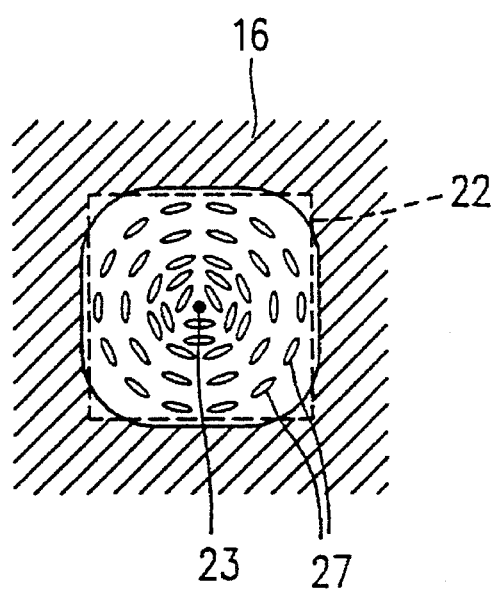
FIG. 7 is a plan view showing another orientation state of liquid crystal molecules in an example according to the present invention.

The liquid crystal display device 1 produced as described above is observed with a polarizing microscope, indicating that almost one liquid crystal domain 25 is present in each pixel and a schlieren texture which is seen when the liquid crystal molecules are radially or concentrically oriented in each liquid crystal domain 25 is observed, as shown in FIGS. 6 and 7. In FIGS. 6 and 7, liquid crystal molecules are denoted by the reference numeral 27.

Figure 8:
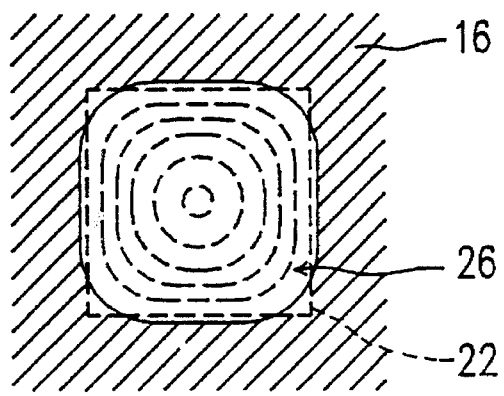
FIG. 8 is a plan view of one pixel of the liquid crystal display device.

The cell is peeled into two substrates in liquid nitrogen, the liquid crystal material is washed with acetone, and the polymeric material remaining on the substrate after being dried is observed with a laser microscope. As shown in FIG. 8, this observation reveals that concentric lines 26 (mountain made of broken lines) are formed with respect to the center. More specifically, the polymeric material has a conical hill-shaped structure, in which one light-shielded portion has thick ends and its thickness becomes smaller toward the center.

This conical hill-shaped structure is obtained as follows.

The photopolymerizable material is cured in each light-transmitted portions, the concentration of the photopolymerizable material is decreased in the light-transmitted portion, the photopolymerizable material moves along a concentration gradient from the center to the ends of the light-shielded portion, and the photopolymerizable material is partially polymerized with light leaked into the light-shielded portion while the photopolymerizable material moves. In the present example, a thin film having such a structure is automatically formed by light irradiation, and thus, the steps are industrially simplified. The cell thus produced is observed with a polarizing microscope under the application of a voltage, indicating that disclination lines are formed at the external periphery of the liquid crystal domains. When the voltage is saturated, the disclination lines disappear.

Figure 9:
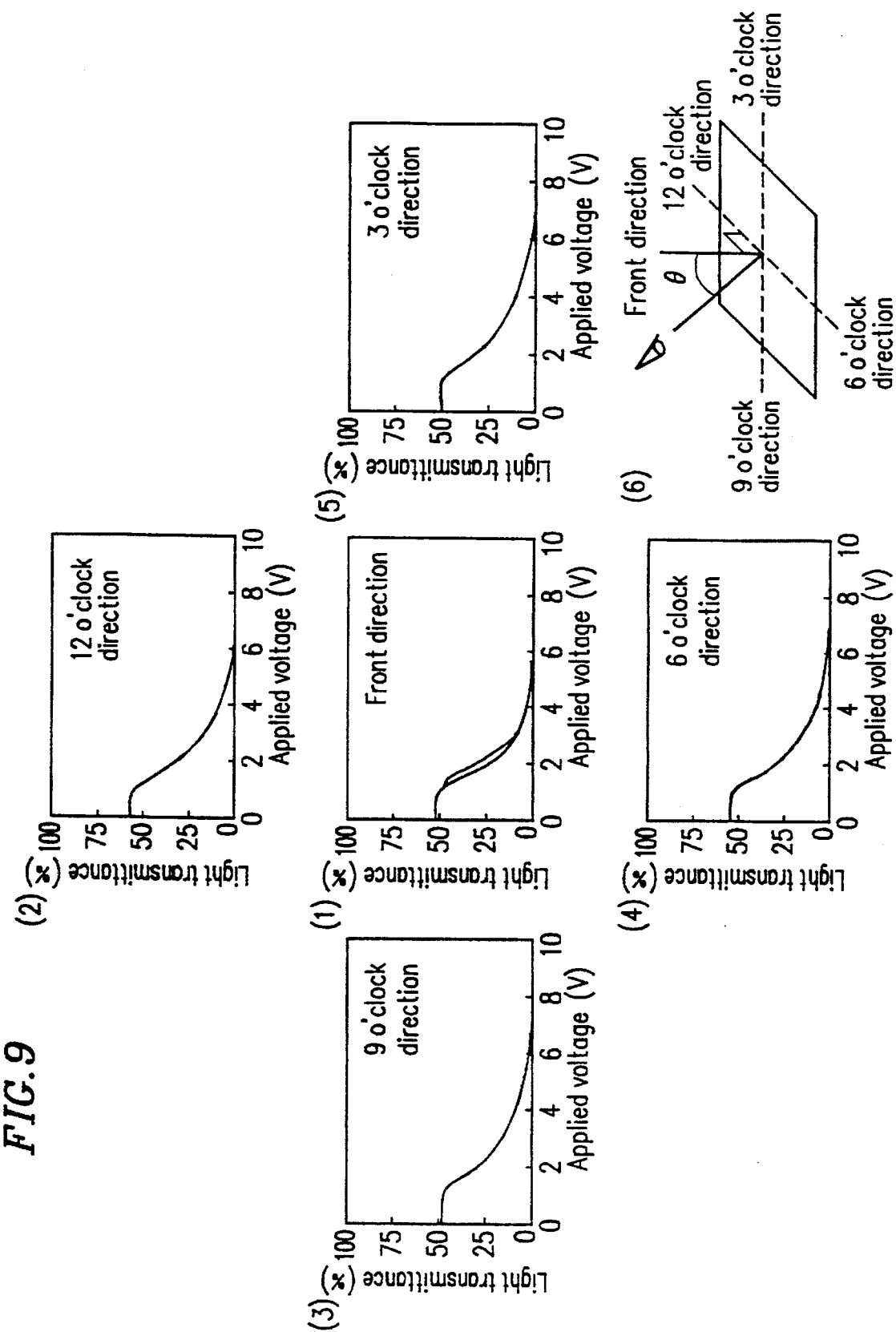
FIG. 9 shows graphs illustrating the viewing angle characteristics of the liquid crystal display device according to the present invention.

The electro-optic characteristics of the cell thus produced are shown in Table 1 and FIG. 9. As understood from the characteristics shown in Table 1 and FIG. 9 and those of Comparative Example 1 shown in FIG. 10 described later, unlike a TN cell of Comparative Example 1, no reverse contrast viewing is observed in the cell of the present invention. In addition, the increase in light transmittance in a high viewing direction at the time of the saturation of a voltage is not observed in the cell of the present invention. In this measurement, it is assumed that light transmittance in the case of using two parallel polarizing plates (i.e., polarizing plates disposed so that the respective polarizing directions are parallel with each other) is 100%.

In Table 1, a state in which the reverse contrast viewing is not observed is represented by ◯; a state in which the reverse contrast viewing is easily observed is represented by χ; and a state in which the reverse contrast viewing is barely observed is represented by Δ. In the other tables, the same marks will be used.

TABLE 1

|  | Example 1 | Comparative Example 1 |
| --- | --- | --- |
| Transmittance under the application of no voltage (%) | 53 | 83 |
| Reverse contrast viewing in gray-scale display | ◯ | X |

COMPARATIVE EXAMPLE 1

The same alignment films as those of Example 1 were formed on the substrates. Both of the substrates were subjected to rubbing treatment with a nylon cloth. Then, the substrates were attached to each other so that the alignment directions were orthogonal to each other in the same way as in Example 1. Liquid crystal material ZLI-4792 (containing 0.4% by weight of S-811) which is the same as that used in Example 1 was injected into the cell thus fabricated. Thereafter, crossed polarizing plates were attached to both sides of the cell to produce a conventional TN cell.

The electro-optic characteristics of the TN cell are shown in Table 1, and the viewing angle characteristics are shown in FIG. 10.

EXAMPLE 2

Another example of the present invention will be described.

Figure 11:
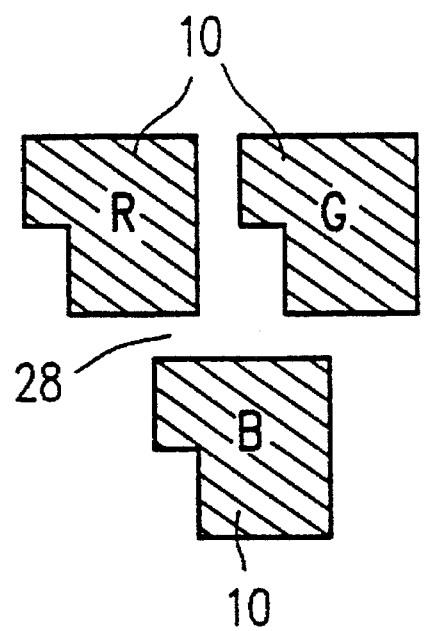
FIG. 11 is a plan view of a counter substrate having a color filter used in Example 2 according to the present invention.
Figure 12:
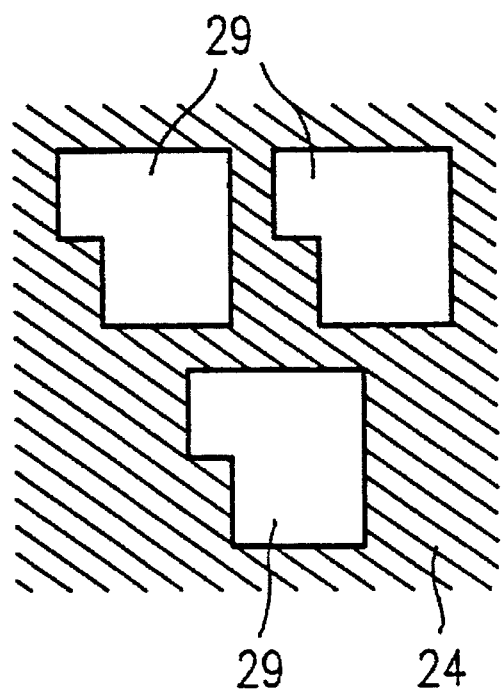
FIG. 12 is a plan view of a TFT substrate having a black mask used in Example 2 according to the present invention.

A cell was fabricated using a counter substrate having a color filter 10 as shown in FIG. 11 and a TFT substrate having a black mask 24 with light-transmitting portions 29 on its surface as shown in FIG. 12 so as to have a cell gap of 5.0 μm.

The same mixture as that of Example 1 was injected into the cell thus fabricated, and the cell was irradiated using the color filter in the cell as a mask with UV-rays in the same way as in Example 1 so that the mixture was cured by self-alignment. The cell was observed with a polarizing microscope, indicating that each entire pixel was occupied with a mono-domain, and liquid crystal molecules were concentrically oriented in each domain.

Two crossed polarizing plates were attached to both sides of the cell thus fabricated to obtain a liquid crystal display device according to the present invention. The light transmittance of the cell under the application of no voltage is shown in Table 2. In this measurement, it is assumed that the light transmittance of a cell using two parallel polarizing plates (cell into which a liquid crystal material is not injected) is 100%.

TABLE 2

|  | Example 2 | Comparative Example 2 |
| --- | --- | --- |
| Transmittance under the application of no voltage | 71 | 20 |
| Inversion phenomenon in gray-scale display | ◯ | X |

COMPARATIVE EXAMPLE 2

A cell was fabricated in the same way as in Example 1. The same mixture as that of Example 1 was injected into the cell, and the cell was irradiated with UV-rays in the same way as in Example 1 without using a photomask. Polarizing plates were attached to both sides of the cell to obtain a polymer-dispersed liquid crystal display device. The electro-optic effects of the cell thus fabricated are shown in Table 2.

In Comparative Example 2, liquid crystal regions in the form of particles were formed, resulting in an entirely rough display.

The inventors of the present invention found that in the liquid crystal display device 1 having the structure in the above-mentioned respective examples, produced by the method for producing in the above-mentioned respective examples, the light transmittance of the device 1 can be remarkably improved by optimizing the twist angle of liquid crystal.

(1) The product Δ n·d of anisotropy of refractive index Δ n of the liquid crystal material and a cell gap d thereof is desirably in the range of 300 nm to 650 nm.

(2) When the display medium layer 14 is formed between the substrates 12 and 13, the twist angle of liquid crystal molecules in the liquid crystal region 17 in the display medium layer 14 is desirably in the range of 45° to 150°.

According to the present invention, in the liquid crystal display device 1 having liquid crystal regions 17 partitioned by the resin walls 16, each liquid crystal region 17 includes the fewest number of liquid crystal domains, and the liquid crystal molecules in each liquid crystal domain are radially or concentrically oriented. Thus, the disclination lines 18 can be prevented from being formed in the pixel regions 22 and 22a as much as possible, and the liquid crystal display device 1 will have excellent viewing angle characteristics with high contrast.

Hereinafter, the liquid crystal display device 1 with the optimized Δ n·d characteristic and twist angle of the liquid crystal region 17 will be described in detail.

(Optimum Conditions of Δ n·d Characteristic)

It was found that by varying the Δ n·d characteristic of the liquid crystal region 17 in the liquid crystal display device 1 of each example, the light transmittance of the device 1 under the application of no voltage is changed and reaches a local maximum value when the Δ n·d characteristic is in the vicinity of 450 nm. In the present example, the liquid crystal regions 17 have a structure of a mono-domain containing no resin walls 16 of a polymeric material or a multi-domain which is not partitioned by the resin walls 16 of a polymeric material.

Figure 13:
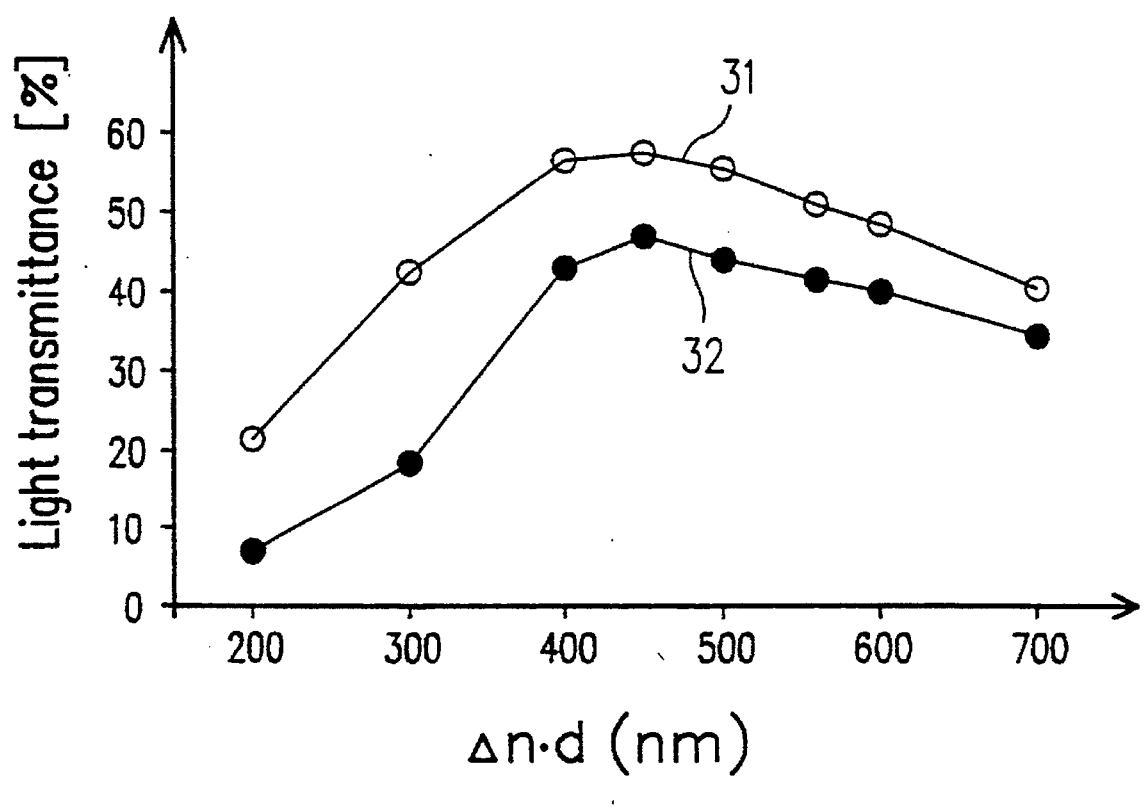
FIG. 13 is a graph showing the relationship between the light transmittance and the $\Delta$ n·d characteristic of the liquid crystal display device in Example 2 according to the present invention.

FIG. 13 shows the relationship between the Δ n·d characteristic and light transmittance. A curve 31 represents light transmittance of the liquid crystal display device 1 of the present example. A curve 32 represents light transmittance of the conventional liquid crystal display device in which the pixel regions contain a plurality of conventional liquid crystal regions partitioned by the polymer walls, a polymer island made of polymer resin is present at the center of each pixel region, and liquid crystal domains are radially or concentrically arranged in the liquid crystal portion.

As shown in FIG. 13, in the present example, the light transmittance is remarkably improved.

For this reason, a wider range of Δ n·d characteristic can be used in the liquid crystal display device 1 of the present example. The Δ n·d characteristic is preferably in the range of 300 nm to 650 nm, and more preferably in the range of 400 nm to 500 nm. As represented by the curve 31 of FIG. 13, in this range, the light transmittance becomes maximum and the curve 31 becomes relatively flat.

Figure 14:
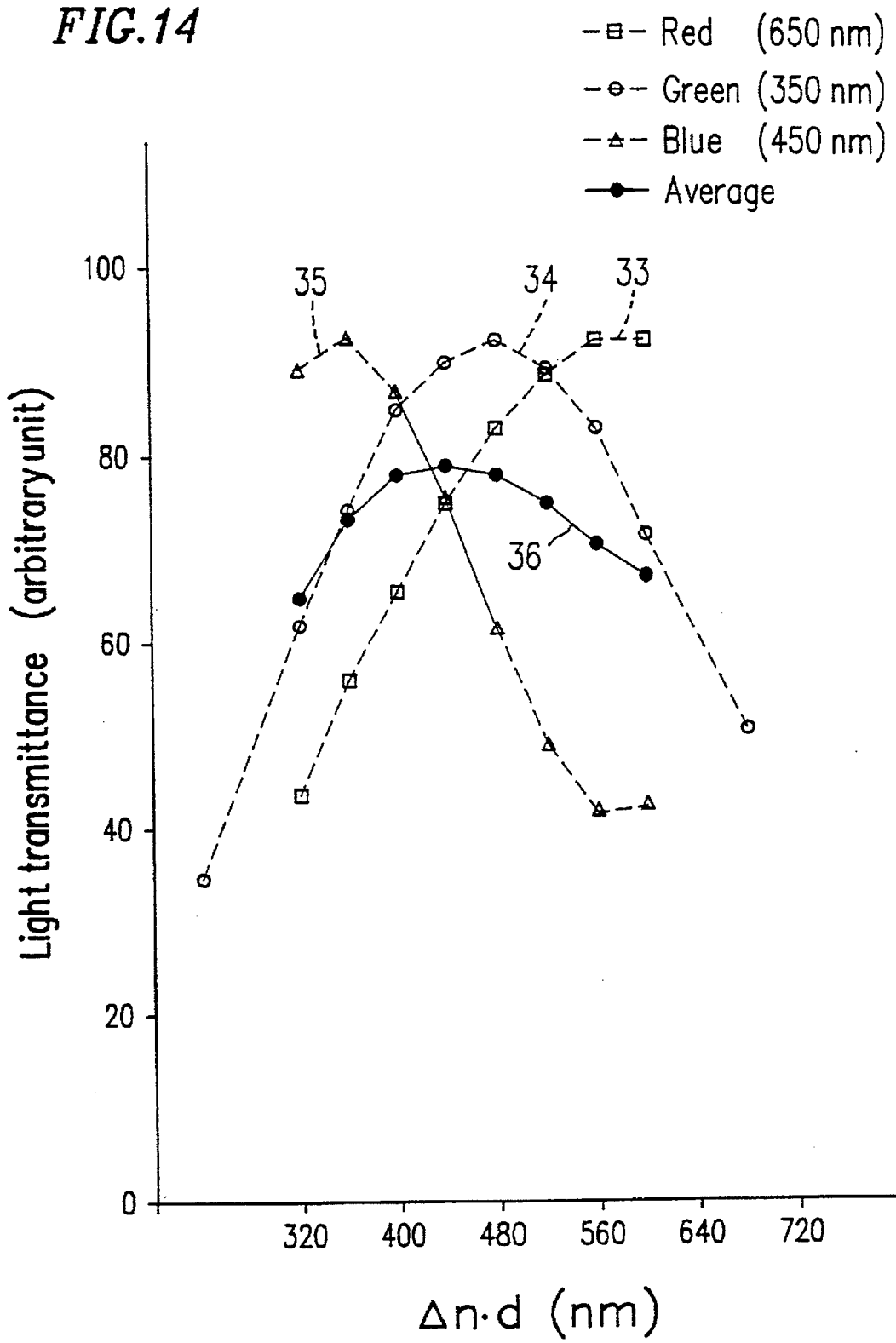
FIG. 14 is a graph showing the dependence of light transmittance with respect to light with 3 wavelengths on the $\Delta$ n·d characteristic in the liquid crystal display device in Example 2 according to the present invention.

According to the experiments of the inventors of the present invention, when the Δ n·d characteristic is less than 300 nm, light transmittance decreases and a bluish display is obtained. When the Δ n·d characteristic is more than 650 nm, light transmittance decreases and a reddish display is obtained. This can be understood from the curves 33, 34, 35, and 36 in FIG. 14. The curves 33, 34, and 35 represent the change in light transmittance in the case where the Δ n·d characteristic is varied for each wavelength of light (Red: 650 nm, Green: 550 nm, Blue: 450 nm). The curve 36 represents the average of light transmittance of the curves 33 to 35. FIG. 14 shows the light transmittance of the liquid crystal display device 1 measured with a light beam with each wavelength, in the case where liquid crystal molecules are radially oriented.

As understood from FIG. 14, when the Δ n·d characteristic decreases, light transmittance of blue color becomes high, and light transmittance of green and red colors becomes low. As a result, an entirely bluish dark display is obtained. When the Δ n·d characteristic is more than 650 nm, a reddish dark display is obtained.

(Optimum Conditions of the Twist Angle of the Liquid Crystal)

When a chiral agent or the like is added to the liquid crystal material of the liquid crystal display device 1 of the present example to twist liquid crystal, light transmission due to the birefringence effect, as well as light transmission due to optical rotatory power, are caused, resulting in the improvement of overall light transmittance of the liquid crystal display device 1.

Figure 15:
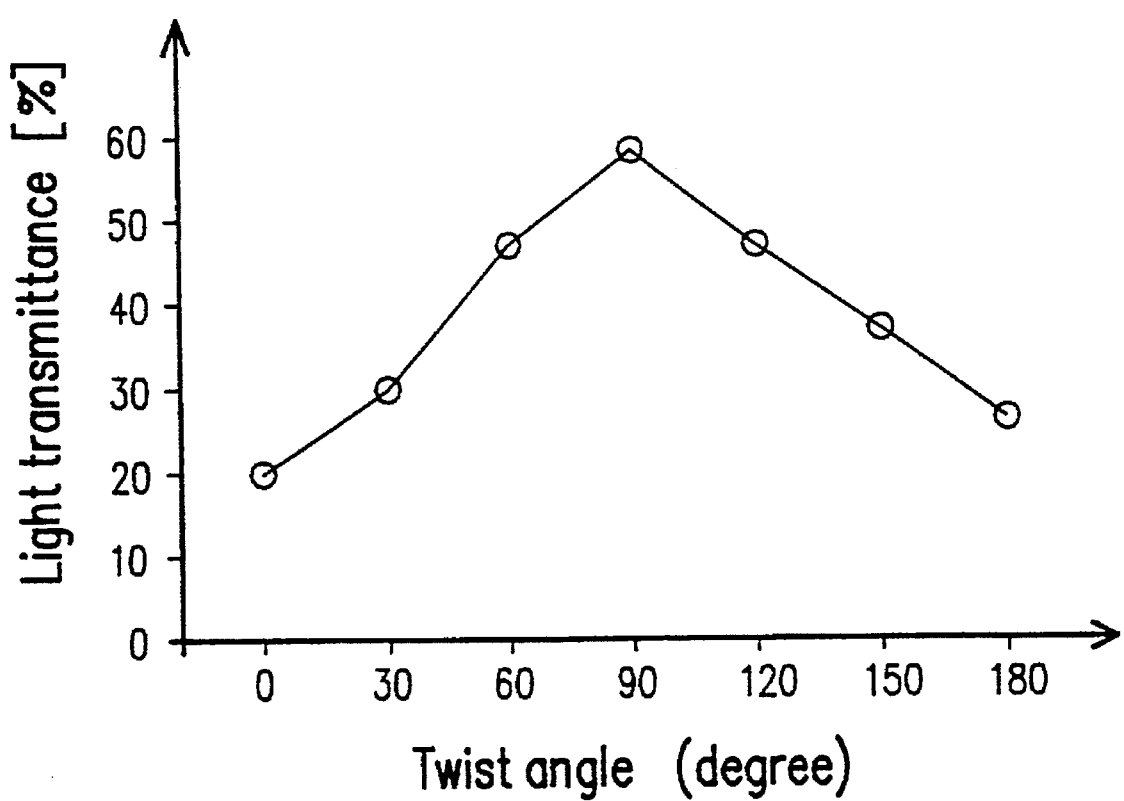
FIG. 15 is a graph showing the dependence of the light transmittance on a twist angle of the liquid crystal display device in Example 2 according to the present invention.

FIG. 15 shows the change in light transmittance between the upper and lower substrates 12 and 13 with the liquid crystal material interposed therebetween. It is understood from FIG. 15 that the light transmittance has the maximum value at a twist angle of 90°.

In the present example, the liquid crystal display device 1 is sandwiched between two polarizing plates arranged in crossed Nicols. Thus, a twist angle of 90° is most suitable for the liquid crystal display device 1, since polarizing axes of the two polarizing plates cross at an angle of 90°. The twist angle is preferably in the range of 45° to 150°. When the twist angle is in the range of 70° to 120°, the liquid crystal display device 1 with a bright display can be obtained.

Hereinafter, construction examples according to the present invention will be described; however, the present invention is not limited to these construction examples.

CONSTRUCTION EXAMPLES 1, 2, 3, AND 4
COMPARATIVE EXAMPLES 3, 4, AND 5

Examples 1 and 2 will be described based on Construction Examples 1 to 4 together with Comparative Examples 3 to 5.

Cells were fabricated respectively using two glass substrates (e.g., each having a thickness of 1.1 mm) each having an ITO transparent electrode (e.g., having a thickness of 50 nm). Spacers were injected into the respective cells so as to obtain a cell gap d of 2.2 μm (Comparative Example 3), 3.1 μm (Comparative Example 4), 4.2 μm (Construction Example 1), 4.8 μm (Construction Example 2), 5.3 μm (Construction Example 3), 6.4 μm (Construction Example 4), and 7.5 μm (Comparative Example 5).

Figure 16:
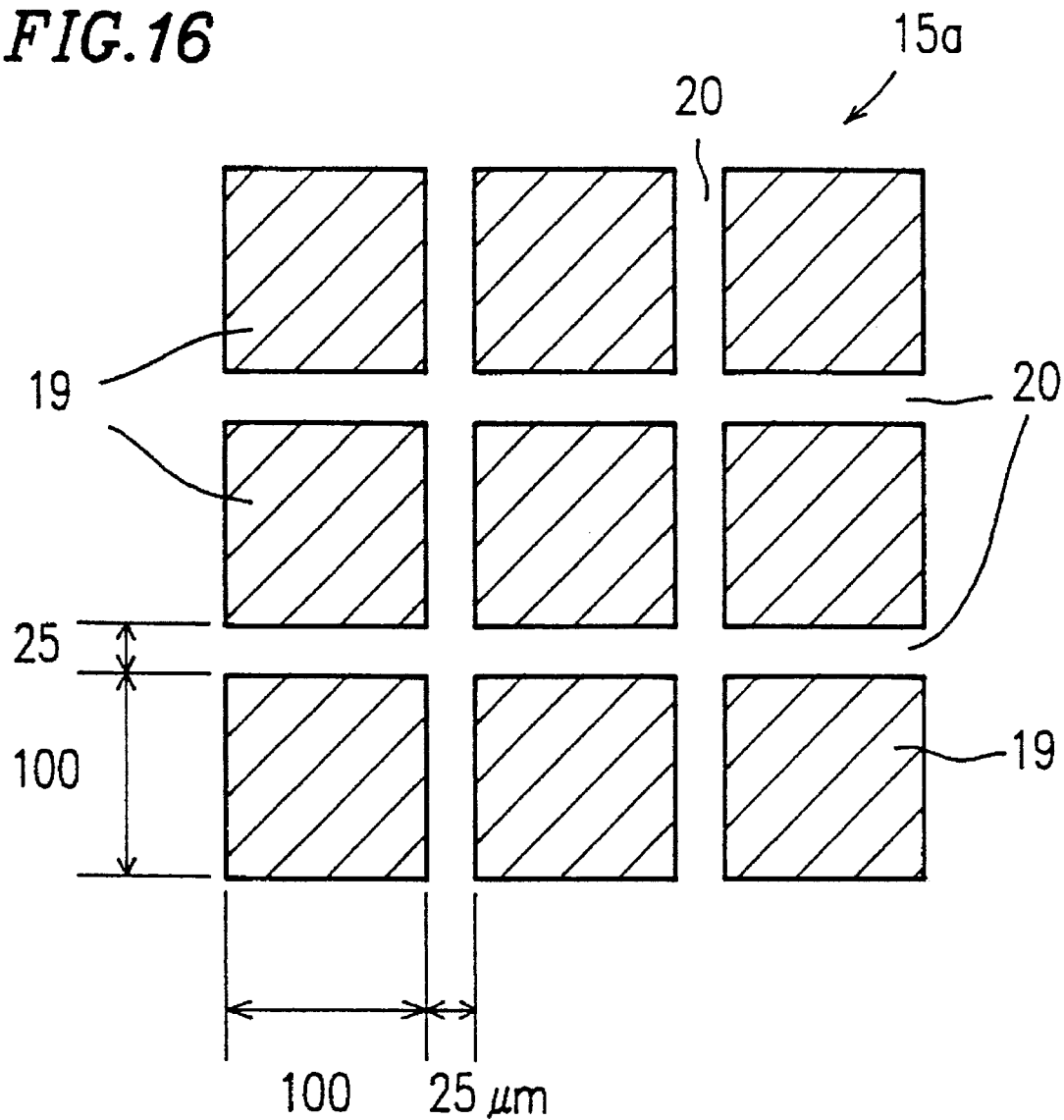
FIG. 16 is a plan view of a photomask used in Example 2 according to the present invention.

A photomask 15a shown in FIG. 16 was placed on each cell thus fabricated, and the following mixture was injected into each cell in a transparent state (35° C.). The mixture was prepared by mixing 0.1 g of R-684 (manufactured by Nippon Kayaku Co., Ltd.), 0.05 g of p-phenylstyrene, 0.425 g of isobornyl methacrylate, 0.425 g of isobornyl acrylate, 4 g of liquid crystal material ZLI-4792 (manufactured by Merck & Co., Inc.: the twist angle of liquid crystal was adjusted to 90°), and 0.025 g of photopolymerization initiator (Irgacure 651).

Under the condition of the same temperature, each cell was irradiated with collimated light beams at 10 mW/cm$^2$ using a high-pressure mercury lamp through a dot pattern of the photomask 15a for one second, and the cell was allowed to stand for 30 seconds without irradiation. This cycle was repeated 20 times. Then, the cell was irradiated with UV-rays for 10 minutes to cure the resin.

After the resin was cured, each cell was observed with a polarizing microscope, indicating that the liquid crystal domains having the same uniform pattern as that of the dot pattern of the photomask 15a, that is, the same uniform pattern as that of the pixels were formed. In Comparative Examples 3 and 4, since the cell gap is small, when the liquid crystal material and the polymeric material are phase-separated from each other, the polymeric material cannot move to the light-irradiated portions. Because of this, the polymeric material remains in the pixel regions 22. This causes problems as described in the background section of the specification.

Figure 17:
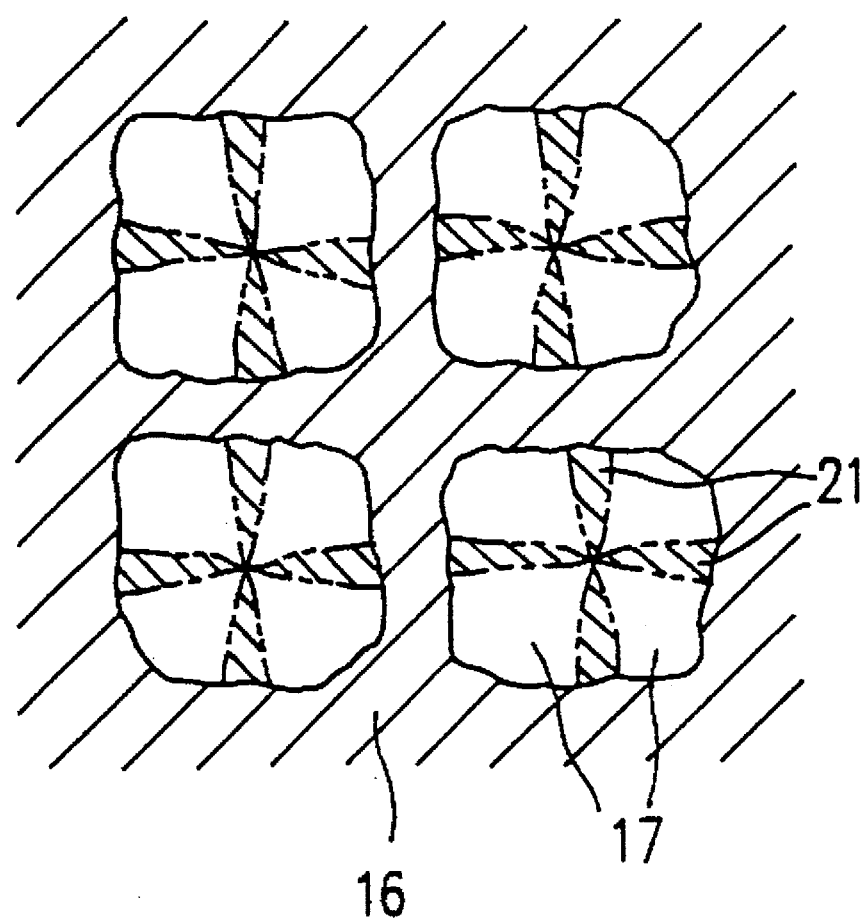
FIG. 17 is a plan view of pixel electrode regions of the liquid crystal display device in Example 2 according to the present invention.

Next, two crossed-polarizing plates were attached to both sides of the display cell to fabricate a liquid crystal display device having a plurality of liquid crystal regions 17 in each pixel region 22 partitioned by the resin walls 16. The liquid crystal display device thus produced was observed with a polarizing microscope, indicating that almost one liquid crystal domain was present in each pixel, and a schlieren pattern of FIG. 17, which was seen in the case where the liquid crystal molecules were radially or concentrically oriented in each liquid crystal domain, was formed. The electro-optic characteristics of the cell are shown in FIG. 13. In this measurement, it is assumed that light transmittance in the case of using two parallel polarizing plates is 100%.

The above-mentioned cells in Construction Examples 1 to 4 and Comparative Examples 3 to 5 have excellent viewing angle characteristics and have no problem of reverse contrast viewing caused in the TN cell.

CONSTRUCTION EXAMPLES 5, 6, 7, AND 8
AND COMPARATIVE EXAMPLES 6 TO 8

Examples 1 and 2 will be described based on Construction Examples 5 to 8 together with Comparative Examples 6 to 8.

In Construction Examples 5, 6, 7, and 8 and Comparative Examples 6, 7, and 8, cells were fabricated in the same way as in the above-mentioned examples, except that a cell gap between the two substrates 12 and 13 was set to be 4.8 μm. As shown in Table 3, the twist angles of liquid crystal molecules in the liquid crystal region 17 were changed by varying the amount of chiral liquid crystal to be added to the liquid crystal material.

were attached to each other so that the electrode lines 3 and 4 faced each other with a spacer having a particle size of 6 μm interposed therebetween.

TABLE 3

|  | Comparative example 6 | Comparative example 7 | Construction example 5 | Construction example 6 | Construction example 7 | Construction example 8 | Comparative example 8 |
| --- | --- | --- | --- | --- | --- | --- | --- |
| Twist angle (degree) | 0 | 30 | 60 | 90 | 120 | 150 | 180 |

Liquid crystal display devices 1 were produced by using the same material and method for production as those in Construction Examples 1 to 4. Light transmittance of the liquid crystal display devices 1 was plotted with respect to a twist angle in FIG. 15. For practical use of the liquid crystal display devices 1, the light transmittance is required to be about 40% or more, considering the ability of a back light. As understood from FIG. 15, the light transmittance in Comparative Examples 6 to 8 is less than 40%, while that in Construction Examples 5 to 8 is 40% or more. Thus, the liquid crystal display devices 1 in Construction Examples 5 to 8 are excellent in contrast.

The above-mentioned liquid crystal display devices 1 in Construction Examples 5 to 8 and Comparative Examples 6 to 8 have excellent viewing angle characteristics and have no problems of reverse contrast viewing caused in the TN cell.

Figure 18:
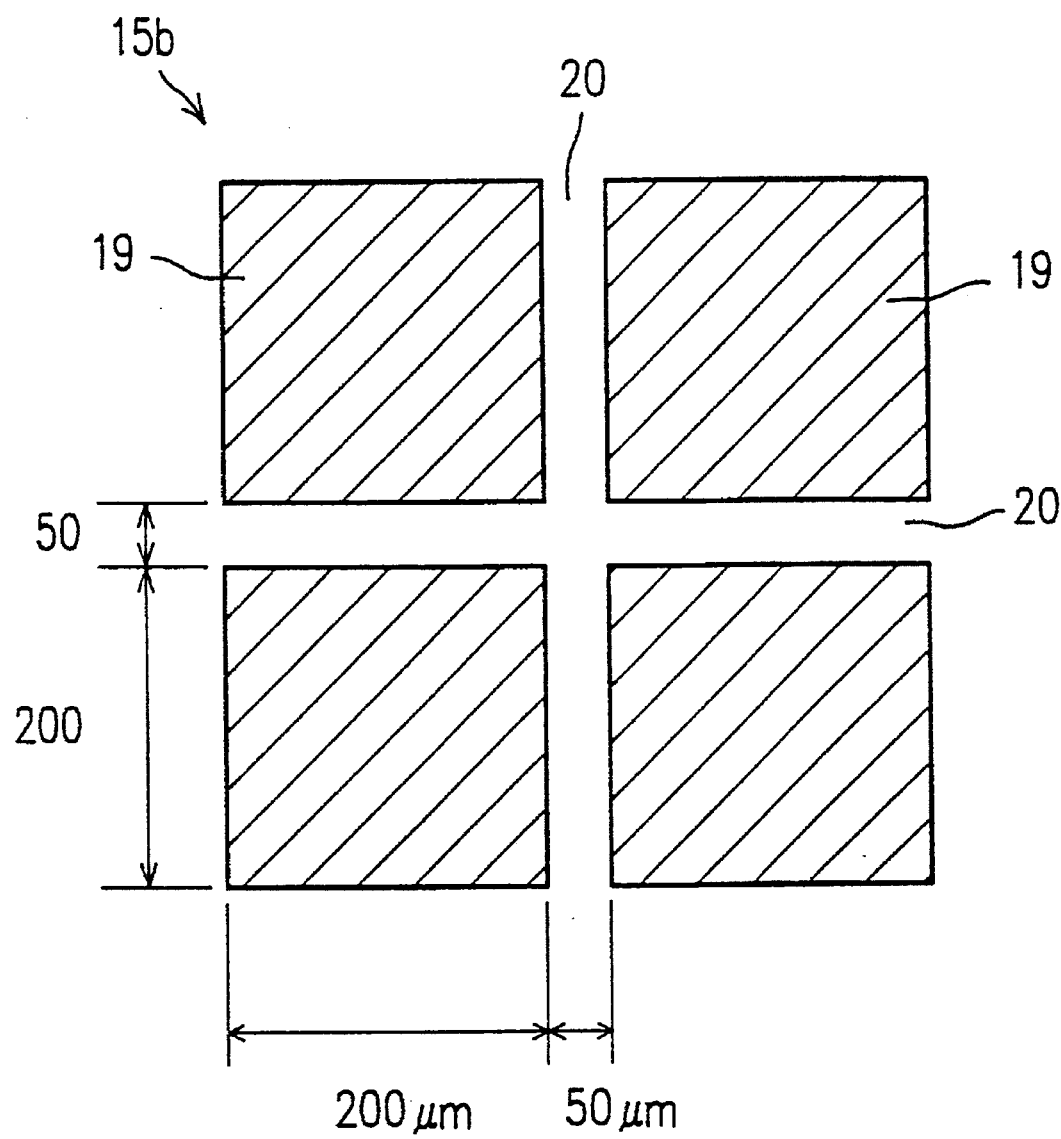
FIG. 18 is a plan view of a photomask used in Comparative Example 2.
Figure 19:
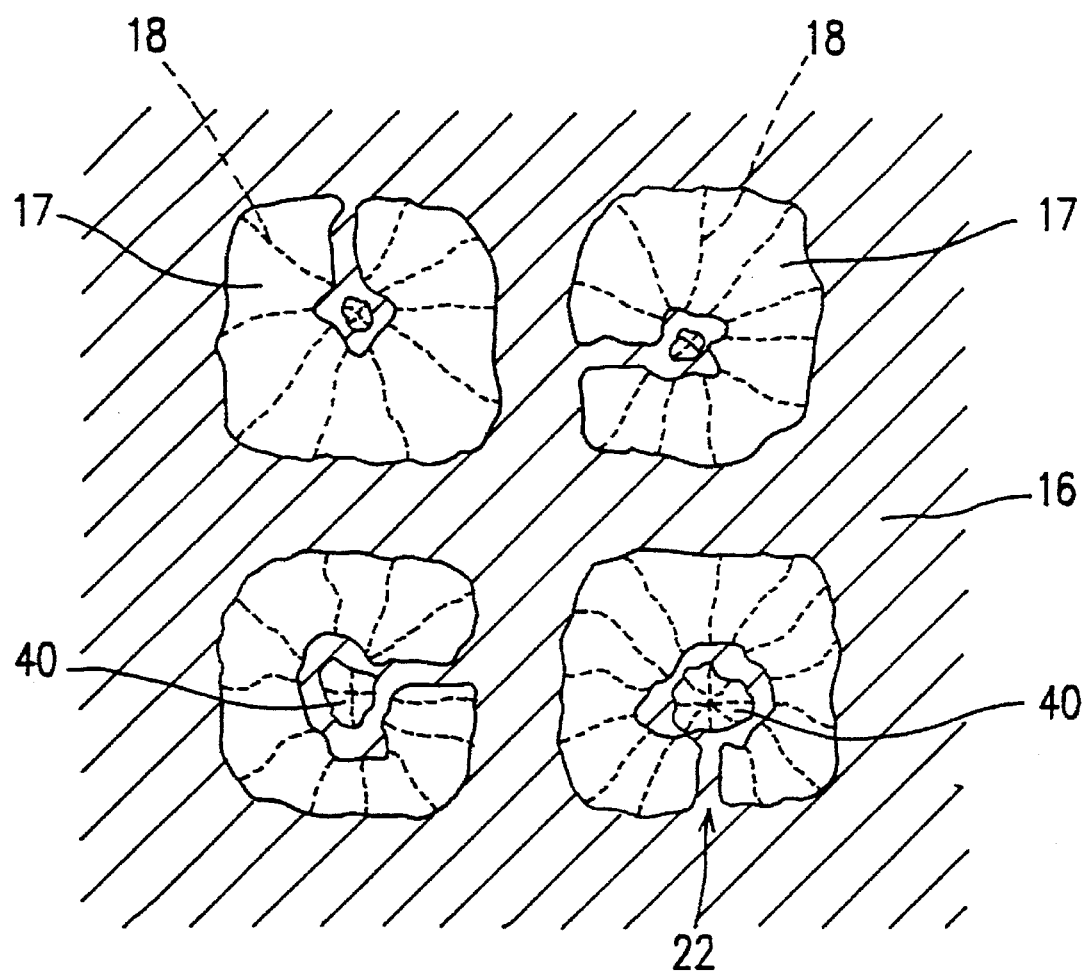
FIG. 19 is a plan view of pixel electrode regions of the liquid crystal display device produced in Comparative Example 2.

Separately, liquid crystal display devices 1 were produced in the same way as in Construction Examples 1 to 4 and Comparative Examples 3 to 5, except that a photomask 15b as shown in FIG. 18 was used. The liquid crystal display devices thus produced were observed in crossed Nicols with a polarizing microscope, indicating that a polymer island 40 made of a polymeric material remained at the center of each pixel region 22 and each pixel region 22 is partitioned by a resin wall 16, as shown in FIG. 19.

Then, two crossed polarizing plates were attached to both sides of each liquid crystal display device. Light transmittance of the liquid crystal display devices is represented by a curve 32 in FIG. 13.

As understood from FIG. 13, when the polymeric material enters each pixel region 22 as the polymer island 40 or the like, the suitable range of Δ n·d becomes narrow.

EXAMPLE 3

The present example shows a liquid crystal display device capable of being driven at a low voltage. In the liquid crystal display device, it is desirable that a liquid crystal material to be driven has a low viscosity and a large dielectric constant anisotropy. The viscosity μ is preferably 50 mPa.s or less at 20° C., more preferably 20 mPa.s or less. In addition, the dielectric constant anisotropy Δε at 20° C. is preferably +3(1 kHz), more preferably +5(1 kHz) or more.

CONSTRUCTION EXAMPLE 9

Example 3 will be described based on Construction Example 9.

First, 200 electrode lines 3 and 4 made of ITO were formed on substrates 1 and 2 made of flint glass (manufactured by Nippon Sheet Glass Co., Ltd.) each having a thickness of 1.1 mm. The electrode lines 3 and 4 were formed with a thickness of 50 nm and a width of 200 μm at a distance of 50 μm from each other. The substrates 1 and 2

As a photopolymerizable compound, a mixture containing 0.1 g of trimethylol propane trimethacrylate, 0.4 g of 2-ethylhexyl acrylate, and 0.5 g of isobornyl acrylate was used. As a liquid crystal, a mixture obtained by adding 0.3% CN (cholesteric nonalate) to ZLI-4792 (manufactured by Merck & Co., Inc.) having a viscosity μ of 15 mPa.s at 20° C. and a dielectric constant anisotropy Δε of +5.2 was used. The photopolymerizable compound, the liquid crystal, and 0.1 g of photopolymerization initiator (Irgacure 184) were injected into the cell.

Figure 20:
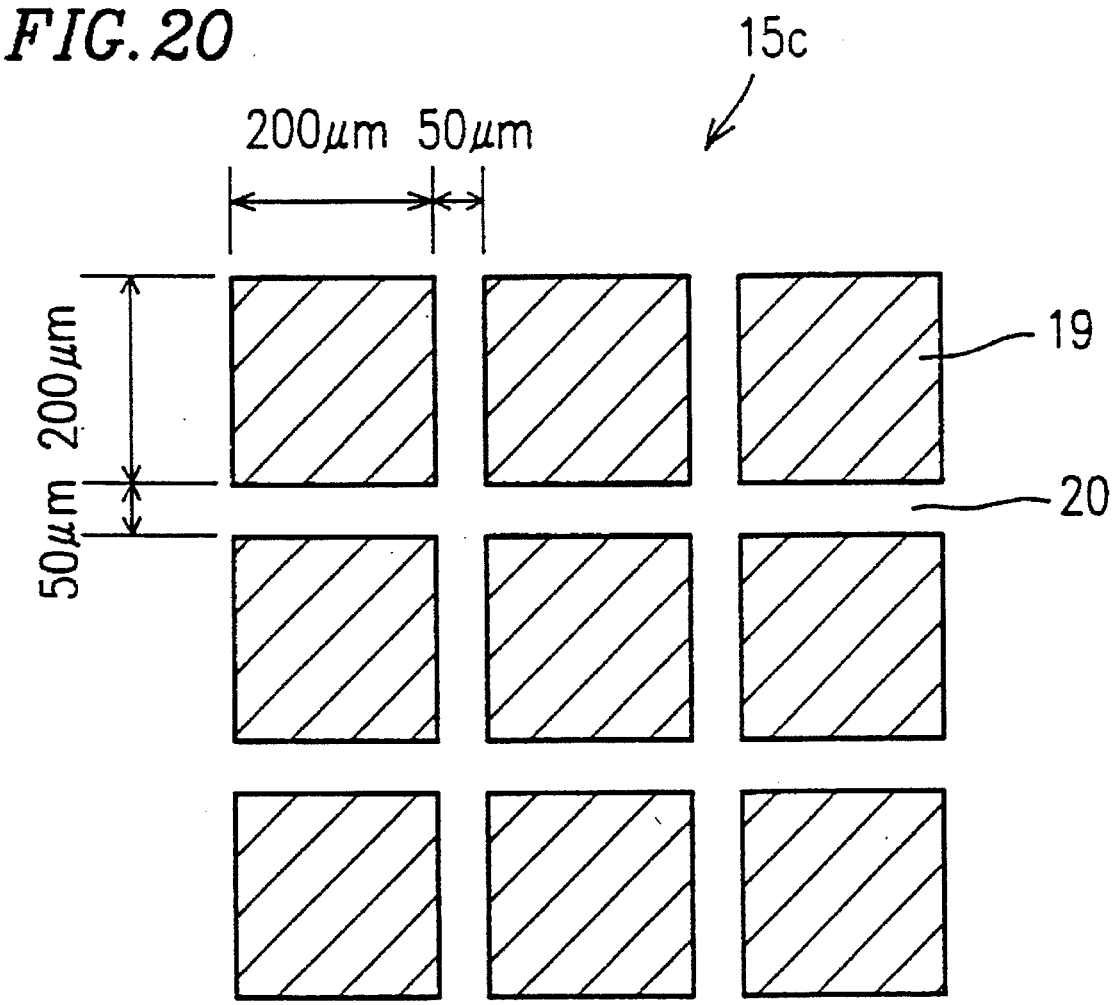
FIG. 20 is a plan view of a photomask used in Construction Example 10.

The photomask 15c shown in FIG. 20 was placed on the cell, and the cell was irradiated with collimated UV-rays by a high-pressure mercury lamp at 10 mW/cm$^2$ for 10 minutes to cure the photopolymerizable compound.

Finally, crossed polarizing plates were attached to both sides of the cell, resulting in a liquid crystal display device which is excellent in viewing angle characteristics and is capable of being driven at a low voltage. The driving voltage is shown in Table 4 together with that of Comparative Example 9.

COMPARATIVE EXAMPLE 9

A cell and a photopolymerizable compound were produced in the same way as in Construction Example 9. As the liquid crystal, 4 g of a mixture obtained by adding 0.4% CN to ZLI-2244-100 (Merck & Co., Inc.) having a viscosity μ of 31 mPa.s at 20° C. and a dielectric constant anisotropy Δε of +2.4 was used. The photopolymerizable compound, the liquid crystal, and 0.1 g of photopolymerization initiator (Irgacure 184) were mixed and injected into the cell. The cell thus obtained was irradiated with UV-rays through a photomask under the same conditions as above. Thereafter, crossed polarizing plates were attached to both sides of the cell.

TABLE 4

| | Driving voltage of display device and viscosity μ, dielectric constant anisotropy Δε of liquid crystal to be used | | |
| --- | --- | --- | --- |
| | Driving voltage (V) | μ (mPa · s (20° C.)) | Δε (20° C., 1 kHz) |
| Construction example 9 | 4.6 | 15 | +5.2 |
| Comparative example 9 | 7.9 | 31 | +2.4 |

The driving voltage used herein refers to a voltage required for light transmittance of the liquid crystal display device to be 10% of light transmittance obtained under the application of no voltage.

CONSTRUCTION EXAMPLE 10

Example 3 will be described based on Construction Example 10. A liquid crystal display device was produced as follows.

A cell and a photopolymerizable compound were produced in the same way as in Construction Example 9. As liquid crystal, 4 g of mixture obtained by adding 0.3% CN to ZLI-5091 (Merck & Co., Inc.) having $V_{10}$ of 1.83 V was used. The photopolymerizable compound, the liquid crystal, and 0.1 g of photopolymerization initiator (Irgacure 651) were mixed and injected into the cell. The cell thus obtained was irradiated with UV-rays through a photomask under the same conditions as above. Thereafter, crossed polarizing plates were attached to both sides of the cell. As a result, a liquid crystal display device having excellent viewing angle characteristics, which is capable of being driven at a low voltage was obtained. The driving voltage is shown in Table 5 together with the result of Comparative Example 10.

COMPARATIVE EXAMPLE 10

A cell and a photopolymerizable compound were produced in the same way as in Construction Example 9. As liquid crystal, 4 g of mixture obtained by adding 0.3% CN to ZLI-4749 (manufactured by Merck & Co., Inc.) having $V_{10}$ of 2.23 V was used. The photopolymerizable compound, the liquid crystal, and 0.1 g of photopolymerization initiator (Irgacure 651) were mixed and injected into the cell. The cell was irradiated through a photomask with UV-rays under the same conditions as the above. Thereafter, crossed polarizing plates were attached to both sides of the cell.

TABLE 5

| Driving voltage of liquid crystal display device and $V_{10}$ of liquid crystal to be used | | |
|---|---|---|
| | Driving voltage (V) | $V_{10}$ (V) |
| Construction Example 10 | 4.3 | 1.83 |
| Comparative Example 10 | 6.1 | 2.23 |

The driving voltage used herein refers to a voltage required for light transmittance of the liquid crystal display device to be 10% of light transmittance obtained under the application of no voltage. In Table 5, $V_{10}$ refers to a value obtained by measuring as follows.

An ITO film was formed on two 7059 glasses (manufactured by Corning Co., Ltd.) to a thickness of 100 nm so that overlapped ITO film portion be 1 cm×1 cm when two 7059 glasses were attached to each other. Then, an alignment film optomer AL-1051 (manufactured by Japan Synthetic Rubber Co., Ltd.) was coated onto the electrode side of the respective substrates. The alignment films thus formed were subjected to rubbing treatment with a nylon cloth. The substrates were attached to each other so that the rubbed surfaces faced each other in an orthogonal relationship. At this time, the substrates were attached to each other with plastic beads interposed therebetween so as to have a cell gap of 5.5 µm. Thereafter, a sample of the liquid crystal was injected into the cell, and crossed polarizing plates were attached to both sides of the cell. The cell thus obtained was measured for voltage-light transmittance (V-T) characteristic by using Photal (IMCU-7000) manufactured by Ohtsuka Denshi Co., Ltd. at 25° C. At this time, a voltage at which the light transmittance became 90% of that of the initial state was assumed to be $V_{10}$.

As described above, when a liquid crystal display device using polarizing plates is produced by using a liquid crystal satisfying the conditions described in the present example to uniformly phase-separate the liquid crystal and the polymer material, the liquid crystal display device can be driven with a low driving voltage.

At present, the voltage which can be applied to a generally used IC for driving a TFT is up to 7 V. Under this circumstance, in the display devices in Comparative Examples 9 and 10, a sufficient black level cannot be obtained, resulting in low contrast. However, when the liquid crystal used in the present example is used, a relatively sufficient black level can be obtained with a driving voltage of 7 V, thus resulting in satisfactory contrast.

EXAMPLE 4

A liquid crystal display device with remarkably improved light transmittance will be described.

In the present example, it was found that by varying the Δ n·d characteristic in the range of 700 nm to 1500 nm with a twist angle of the liquid crystal material kept at 90°, light transmittance is changed to reach a local maximum value at 1250 nm.

Likewise, it was found that by varying the Δ n·d characteristic in the range of 200 nm to 1000 nm with a twist angle of the liquid crystal material kept at 270°, light transmittance is changed to reach a local maximum value at 650 nm.

Likewise, it was found that by varying the twist angle of the liquid crystal material in the range of 180° to 360° with the Δ n·d characteristic kept at 650 nm, light transmittance is changed to reach a local maximum value at 270°.

CONSTRUCTION EXAMPLES 11, 12, 13, AND 14 AND COMPARATIVE EXAMPLES 11, 12, 13, AND 14

Example 4 will be described based on Construction Examples 11 to 14. Comparative Examples 11 to 14 will be described together.

Cells were fabricated respectively using two glass substrates (e.g., each having a thickness of 1.1 mm) each having an ITO transparent electrode (e.g., having a thickness of 50 nm). Spacers were injected into the respective cells so as to obtain a cell gap d of 7.4 µm (Comparative Example 11), 9.5 µm (Comparative Example 12), 10.6 µm (Construction Example 11), 11.7 µm (Construction Example 12), 13.2 µm (Construction Example 13), 14.6 µm (Construction Example 14), 15.4 µm (Comparative Example 13), and 15.9 µm (Comparative Example 14).

Then, 0.1 g of R-684 (manufactured by Nippon Kayaku Co., Ltd.), x g of p-phenylstyrene, 0.425 g of isobornyl methacrylate, y g of isobornyl acrylate, 4 g of liquid crystal material ZLI-4792 (with S-811 added so that a twist angle of liquid crystal between the substrates be 90° in accordance with the respective cells), and 0.025 g of photopolymerization initiator (Irgacure 651) were mixed. These mixtures were injected into the respective cells in a transparent state at 35° C. Then, the photomask 15a shown in FIG. 16 was placed on each cell.

Under the condition of the same temperature, each display cell was irradiated with collimated light beams at 10 mW/cm² using a high-pressure mercury lamp through the photomask 15a for one second, and the display cell was allowed to stand for 30 seconds without the irradiation. This cycle was repeated 20 times. Then, the display cell was irradiated with UV-rays for 10 minutes to cure the resin. The amount of x and y were determined as follows:

TABLE 6

|  | x [g] | y [g] |
| --- | --- | --- |
| Comparative Example 11 | 0.050 | 0.425 |
| Comparative Example 12 | 0.050 | 0.425 |
| Construction Example 11 | 0.025 | 0.450 |
| Construction Example 12 | 0.025 | 0.450 |
| Construction Example 13 | 0.025 | 0.450 |
| Construction Example 14 | 0.025 | 0.450 |
| Comparative Example 13 | 0.013 | 0.462 |
| Comparative Example 14 | 0.013 | 0.462 |

As shown in Table 6, when the proportion of p-phenylstyrene is reduced as the cell gap becomes larger, the phase separation between the liquid crystal material and the polymer is smoothly effected and liquid crystal regions having the uniformity close to that of the photomask are formed.

The cell thus produced was observed with a polarizing microscope, indicating that liquid crystal domains with the same uniformity as that of the photomask were formed. In addition, the same schlieren texture as that shown in FIG. 3 was observed. In Construction Examples 11 to 14, and Comparative Examples 11 to 14, liquid crystal domains with more satisfactory uniformity were observed, compared with Construction Examples 1 to 4, and Comparative Examples 3 to 5 in the case where Δ n·d characteristic was set to be 300 to 650 μm. The reason for this is as follows.

The cell gaps in Construction Examples 11 to 14, and Comparative Examples 11 to 14 are larger compared with those in Construction Examples 1 to 4, and Comparative Examples 3 to 5. Therefore, the resin easily disperses during the phase separation between the liquid crystal and the resin, caused by the UV-rays curing of resin, and the uniformity of the polymer walls was in better agreement with the uniformity of the photomask.

Figure 21:
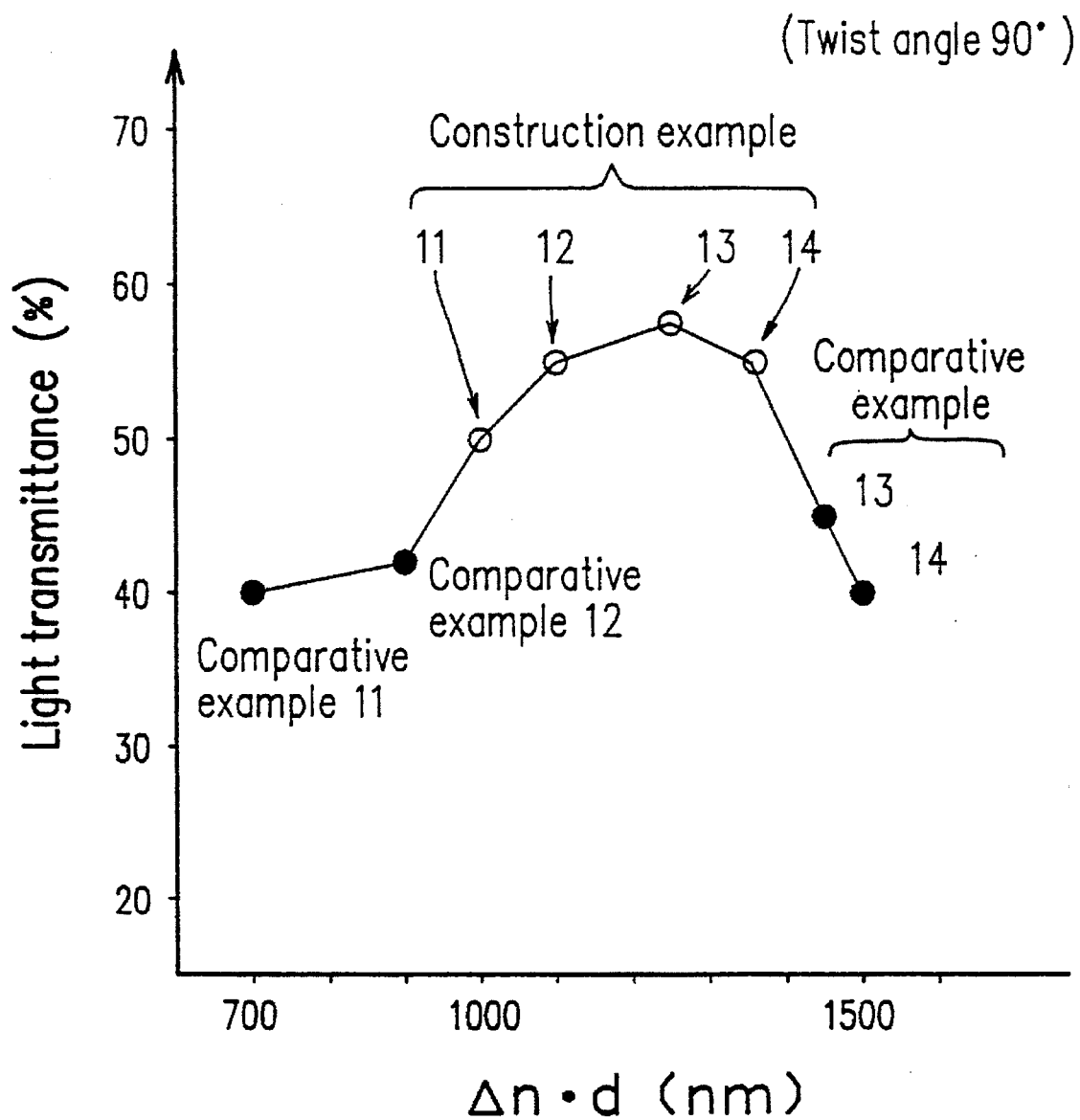
FIG. 21 is a graph showing the dependence of light transmittance on the Δ n·d characteristic of the liquid crystal display device in Example 4 according to the present invention.

Light transmittance of each cell under the application of no voltage is shown in FIG. 21. In FIG. 21, the twist angle of each cell was set to be 90°. In this measurement, it is assumed that light transmittance in the case of using two parallel polarizing plates is 100%.

Each cell in Construction Examples 11 to 14, and Comparative Examples 11 to 14 was excellent in viewing angle characteristics and had no reverse contrast viewing problems caused in the TN cell.

As understood from FIG. 21, the liquid crystal display devices of Construction Examples 11 to 14 have the following relationship between light transmittance and the Δ n·d characteristic. In the case where the twist angle of the liquid crystal material in the cell is 90°, light transmittance decreases at the Δ n·d characteristic of more than 650 nm, and increases at the Δ0 n·d characteristic in the range of 700 nm to 1500 nm. In the case of optimizing the value Δ n·d in this range, when the Δ n·d characteristic is 1,000 nm or less or 1400 nm or more, light transmittance decreases, and reddish (700 nm to 800 nm, 1400 nm to 1500 nm), bluish (800 nm to 900 nm), and greenish (900 nm to 1000 nm) displays are obtained. Thus, this range is not suitable for the liquid crystal display device.

For the above reasons, in the case where the Δ n·d characteristic is in the range of 700 nm to 1500 nm, the Δ n·d characteristic to be used for the liquid crystal display device is preferably in the range of 1000 nm to 1400 nm, more preferably in the range of 1100 nm to 1300 nm.

Thus, in the liquid crystal display device having the liquid crystal regions partitioned by the resin walls, it is preferred that the product of the anisotropy of refractive index Δ n and the cell gap d is set to be in the range of 1000 nm to 1400 nm, and the twist angle of liquid crystal between the substrates when the liquid crystal material is injected into the cell is set to be in the range of 45° to 150°.

CONSTRUCTION EXAMPLES 15, 16, 17, AND 18, AND COMPARATIVE EXAMPLES 15, 16, 17, AND 18

Example 4 will be described based on Construction Examples 15 to 18.

A mixture containing liquid crystal and a polymerizable material was prepared using the following composition by the methods in Construction Examples 11 to 14 and Comparative Examples 11 to 14.

TABLE 7

| | Liquid crystal | Polymerizable material | | | | Photopolymerization initiator |
| --- | --- | --- | --- | --- | --- | --- |
| | ZLI-4792 + S811 | p-phenylstyrene | Isobornyl methacrylate | Isobornyl acrylate | R684 | Irgacure 651 |
| Weight (g) | 4.00 | 0.050 | 0.425 | 0.425 | 0.10 | 0.025 |

The proportion of a chiral agent (S811) in the liquid crystal was determined in accordance with each cell gap so that the twist angle of liquid crystal be 270°.

Each cell was produced in the same way as in Construction Examples 11 to 16 and Comparative Examples 11 to 14. The cell gap of each example was determined as shown in Table 8. As a result, the Δ n·d characteristic of each cell was obtained as shown in Table 8.

TABLE 8

|  | Comparative example 15 | Comparative example 16 | Construction example 15 | Construction example 16 | Construction example 17 | Construction example 18 | Comparative example 17 | Comparative example 18 |
| --- | --- | --- | --- | --- | --- | --- | --- | --- |
| Cell gap (μm) | 2.1 | 4.2 | 5.8 | 6.9 | 7.6 | 8.5 | 9.5 | 10.6 |
| Δn · d (nm) | 198 | 396 | 548 | 651 | 717 | 802 | 897 | 1001 |

Thereafter, the mixture was injected into each cell and exposed to UV-rays through a photomask to cure the polymerizable material in the same way as in Construction Examples 11 to 14 and Comparative Examples 11 to 14.

The respective cells thus fabricated were observed with a polarizing microscope, indicating that liquid crystal domains

CONSTRUCTION EXAMPLES 19, 20, AND 21 AND COMPARATIVE EXAMPLES 19, 20, 21, AND 22

A mixture of liquid crystal and a polymerizable material was prepared using the composition shown in Table 9 by the methods in Construction Examples 11 to 14 and Comparative Examples 11 to 14.

TABLE 9

|  | Liquid crystal | Polymerizable material | | | | Photopolymerization initiator |
| --- | --- | --- | --- | --- | --- | --- |
|  | ZLI-4792 + S811 | p-phenylstyrene | Isobornyl methacrylate | Isobornyl acrylate | R684 | Irgacure 651 |
| Weight (g) | 4.00 | 0.050 | 0.425 | 0.425 | 0.10 | 0.025 | with the same uniformity as that of the photomask were formed. In addition, a schlieren texture as shown in FIG. 3 was observed. In Comparative Example 15, since the cell gap was small, the polymerizable material did not move from the non-irradiated regions to the irradiated regions, and the polymer remained in each pixel.

The proportion of a chiral agent (S811) in the liquid crystal was determined in accordance with each cell gap (6.9 μm) so that the twist angle of liquid crystal was as shown in Table 10.

TABLE 10

|  | Comparative example 19 | Comparative example 20 | Construction example 19 | Construction example 20 | Construction example 21 | Comparative example 21 | Comparative example 22 |
| --- | --- | --- | --- | --- | --- | --- | --- |
| Twist angle (degree) | 180 | 210 | 240 | 270 | 300 | 330 | 360 |

Figure 22:
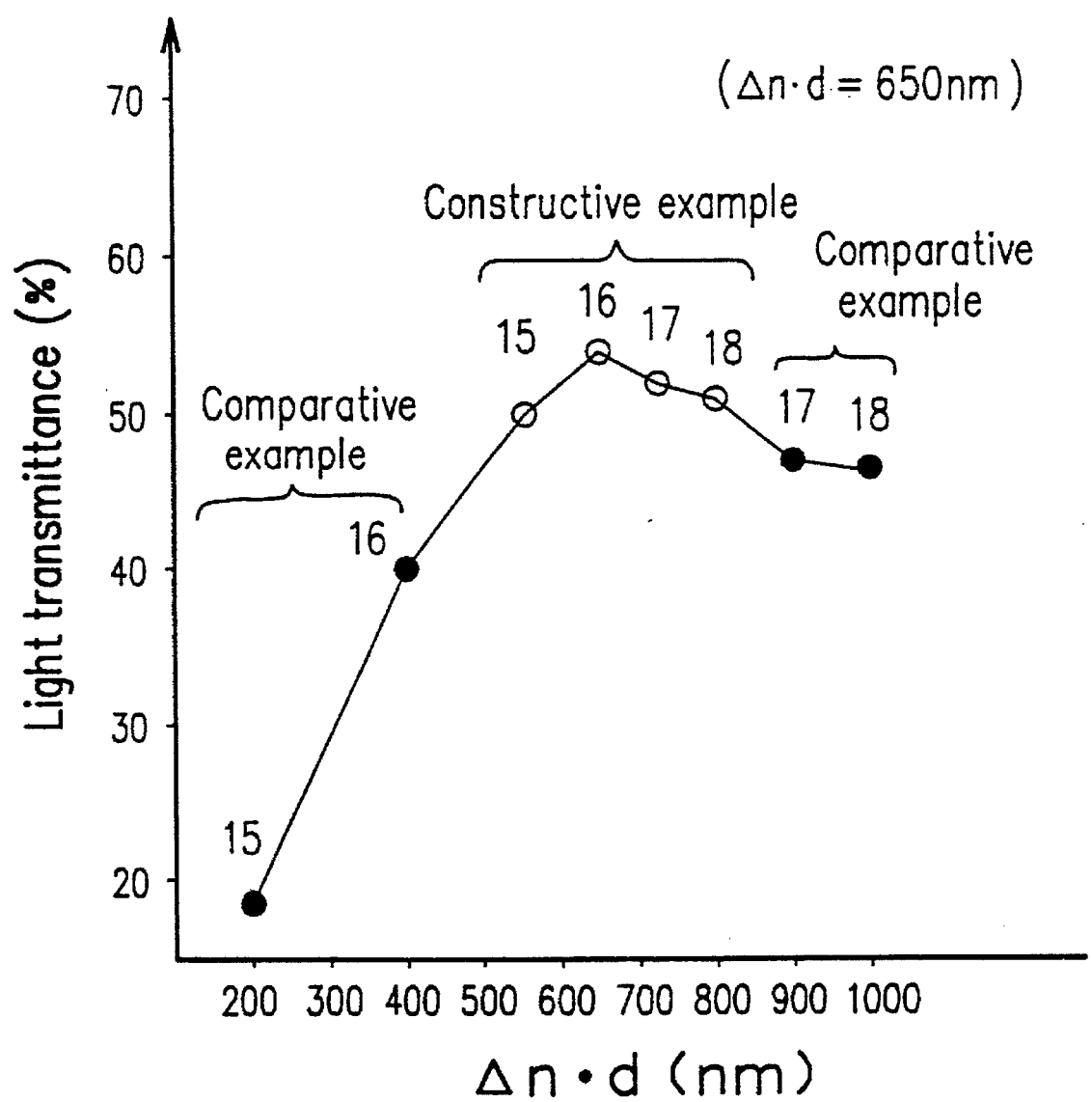
FIG. 22 is a graph showing the dependence of light transmittance on the Δ n·d characteristic of the liquid crystal display device in Example 4 according to the present invention.

Furthermore, the dependence of light transmittance on the Δ n·d characteristic was measured as shown in FIG. 22 by the same method as that of Construction Examples 11 to 14, and Comparative Examples 11 to 14. The twist angle of each cell in FIG. 22 was set to be 270°. Each cell had excellent viewing angle characteristics and had no problems of reverse contrast viewing caused in the TN cell.

As understood from FIG. 22, in each of the liquid crystal display devices having a twist angle of the liquid crystal material of 270° in the cell, when the Δ n·d characteristic was varied in the range of 200 nm to 1000 nm, light transmittance decreased at 550 nm or less or 800 nm or more, and bluish (200 nm to 550 nm), and reddish (800 nm to 1000 nm) displays were obtained. Thus, this range is not suitable for the liquid crystal display device.

For this reason, in the case where the twist angle is in the vicinity of 270°, and the Δ n·d characteristic is in the range of 200 nm to 1000 nm, the Δ n·d characteristic to be used for the liquid crystal display device is preferably in the range of 550 nm to 800 nm, more preferably in the range of 600 nm to 750 nm.

Each cell was produced in the same way as in Construction Examples 11 to 14 and Comparative Examples 11 to 14. The cell gap of each cell was determined to be 6.9 μm. As a result, the Δ n·d characteristic of each cell was determined to be 650 nm.

Thereafter, the mixture was injected into each cell and exposed to UV-rays through a photomask to cure the polymerizable material in the same way as in Construction Examples 11 to 14 and Comparative Examples 11 to 14.

The respective cells thus fabricated were observed with a polarizing microscope, indicating that liquid crystal domains with the same uniformity as that of the photomask were formed. In addition, a schlieren texture as shown in FIG. 3 was observed.

Figure 23:
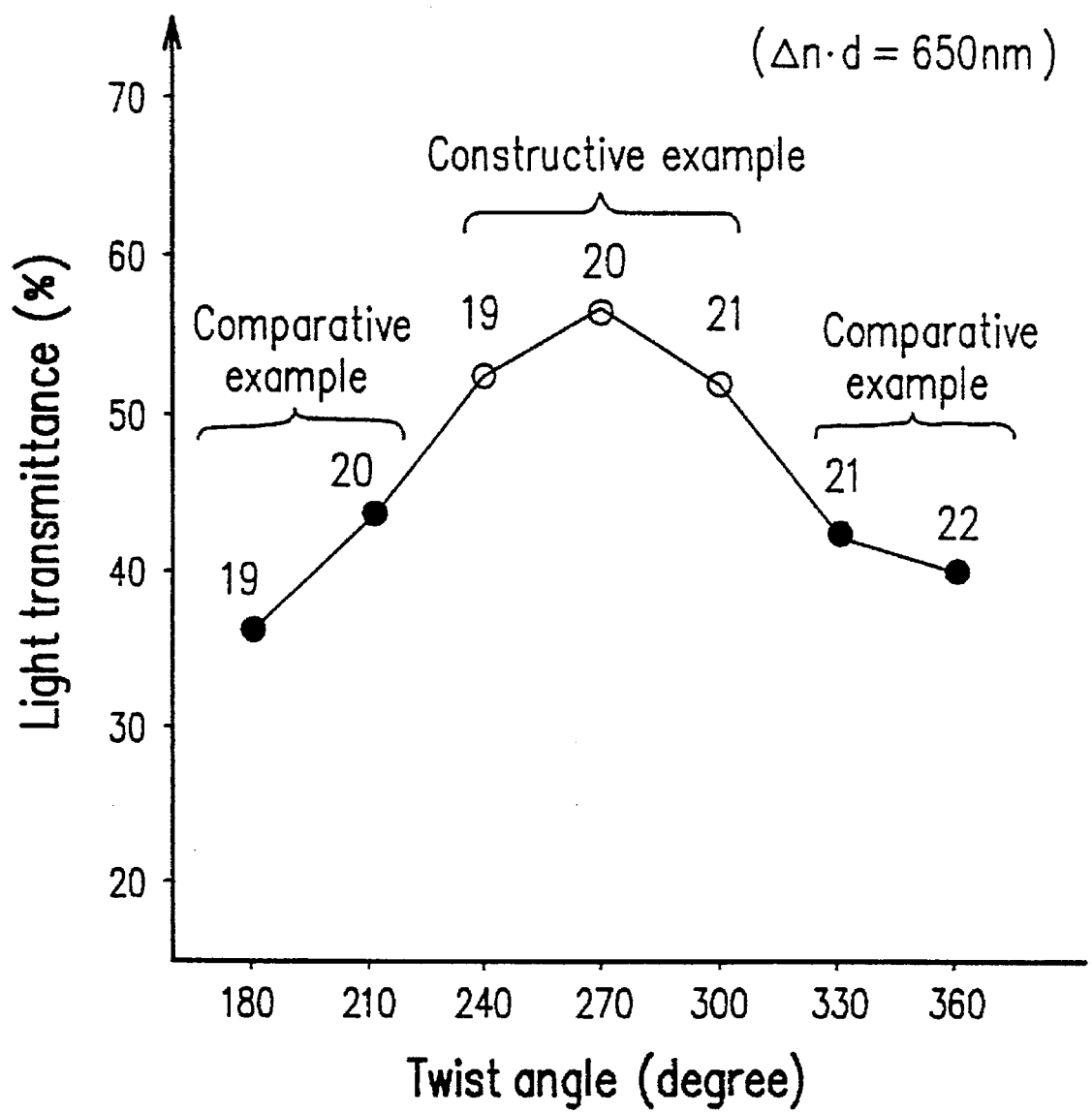
FIG. 23 is a graph showing the dependence of light transmittance on the twist angle of the liquid crystal display device in Example 4 according to the present invention.

Furthermore, the dependence of the light transmittance on the twist angle was measured as shown in FIG. 23 by the same method as that of Construction Examples 11 to 14, and Comparative Examples 11 to 14. In FIG. 23, the Δ n·d characteristic of each cell was set to be 650 nm. Each cell had excellent viewing angle characteristics and had no problems of reverse contrast viewing caused in the TN cell.

As understood from FIG. 23, in each of the liquid crystal display devices, when the twist angle was varied in the range of 180° to 360° under the condition that the Δ n·d characteristic was 650 nm, light transmittance decreased at 240° or less or 300° or more, and yellowish (180° to 210°) and bluish (330° to 360°) displays were obtained. Thus, this range is not suitable for the liquid crystal display device.

For this reason, in the case where the twist angle is in the range of 180° to 360°, and the Δ n·d characteristic is in the vicinity of 650 nm, the twist angle to be used for the liquid crystal display device is preferably in the range of 240° to 300°, more preferably in the range of 255° to 285°.

As understood from Construction Examples 15 to 21, it is preferred that the product of the anisotropy of refractive index Δ n of the liquid crystal material and the cell gap d is in the range of 550 nm to 800 nm and the twist angle of the liquid crystal between the substrates when the liquid crystal material is injected into the cell is in the range of 240° to 300°.

EXAMPLE 5

According to the present example, for preventing the aging of a liquid crystal panel and improving the reliability thereof, if required, a cut filter or the like for shielding UV-rays having a short wavelength of 300 nm or less is placed on the light source side. More specifically, light including no deep UV-rays with high energy (wavelength: 300 nm or less) is irradiated to a liquid crystal cell to effect light phase separation.

Conventionally, as described above, photopolymerization phase separation has been utilized in a method for producing a polymer-dispersed liquid crystal device. According to this method, the phase separation is easily controlled, which is very important for producing a simplified device with high precision. However, this method involves the deterioration of display characteristics caused by the irradiation of electromagnetic wave such as UV-rays containing a high energy component with a short wavelength. For solving this problem, Japanese Laid-Open Patent Publication No. 4-188105 discloses the use of UV-rays including no short wavelength light.

However, Japanese Laid-Open Patent Publication No. 4-188105 fails to provide clear definitions of short wavelength UV-rays regions with respect to UV-rays absorbing characteristics varied depending upon the kind of liquid crystal materials. Furthermore, the invention disclosed in this publication fails to describe the limitation of the wavelength of UV-rays with respect to: a color liquid crystal display device having a color filter involving the deterioration due to fading and discoloring caused by high-energy UV-rays; a film liquid crystal device having a plastic substrate with spectral transmission characteristics different from those of a glass substrate; and the like. Thus, according to the invention disclosed in this publication, it is difficult to produce a liquid crystal device having excellent reproducibility and satisfactory reliability.

The method for producing a liquid crystal display device according to the present invention uses light with a uniform distribution of irradiation degree, having no UV-rays component with a short wavelength such as 300 nm or less. Because of this, light in a high energy region can be shielded, a side-reaction of the liquid crystal material and the photopolymerization initiator having an absorption band in a UV-rays portion is suppressed, and the deterioration such as fading and discoloring of a color filter having an absorption band in a UV-rays portion and a visible light portion can be remarkably decreased. In particular, in the case of producing a color liquid crystal display device, the deterioration of a color filter is a serious problem. This phenomenon is considered to be primarily caused by the action of energy such as heat and light with respect to a radical reaction of pigment molecules in the color filter, impurity metal ions, and oxygen. According to the method of the present invention, this phenomenon can be eliminated by shielding short wavelength UV-rays with high energy.

In addition, according to the method of the present invention, the above-mentioned side reaction can be suppressed by the photolysis and the like of the photopolymerization initiator mixed in the liquid crystal material and the polymerizable material. Thus, a decrease in the charge holding ratio of the liquid crystal material can be prevented, and a liquid crystal display device having excellent reliability with respect to the reproducibility and the display characteristics can be obtained.

CONSTRUCTION EXAMPLE 22

Hereinafter, Example 5 will be described based on Construction Example 23.

Figure 24:
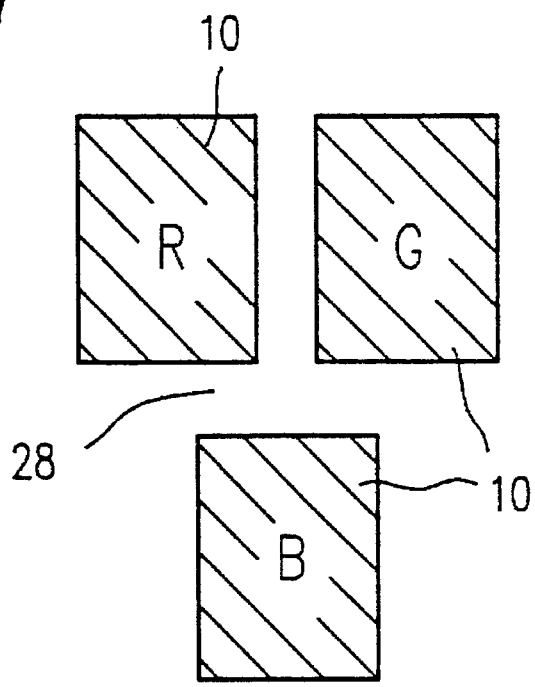
FIG. 24 is a schematic view of a counter substrate having a color filter used in Example 5 according to the present invention.
Figure 25:
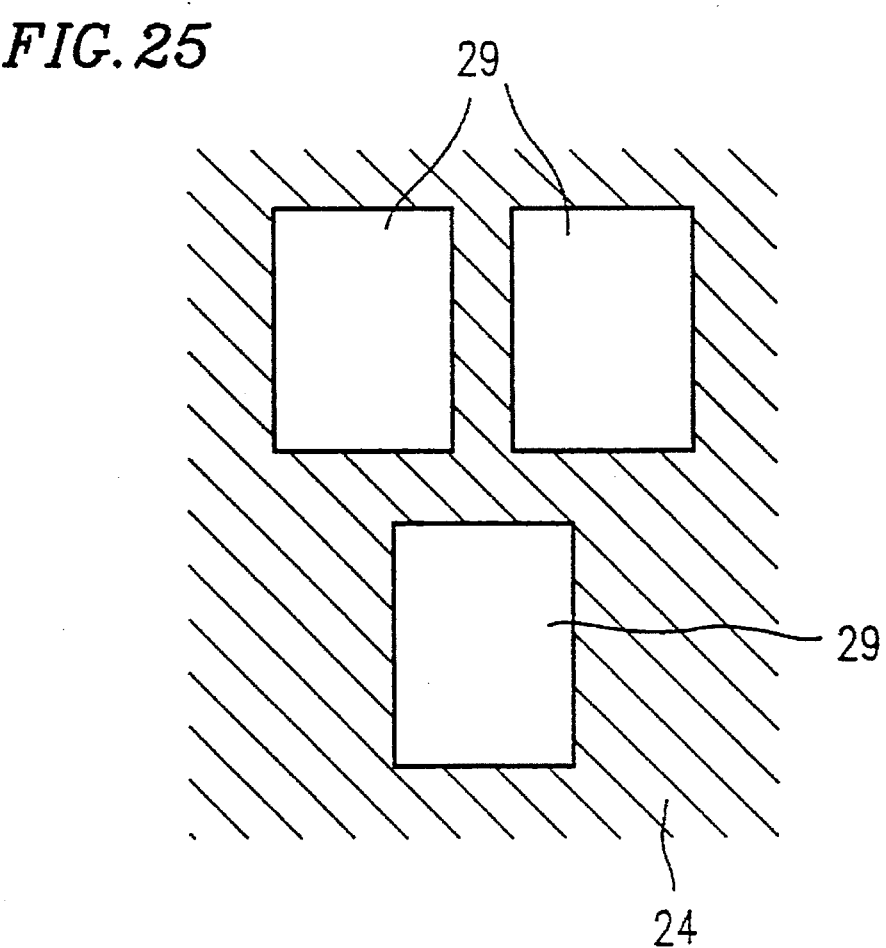
FIG. 25 is a schematic view of a substrate having a black mask used in Example 5.

A counter substrate having a color filter 10 and light-transmitting portions 28 as shown in FIG. 24 and a TFT substrate having a black mask 24 with transparent portions 29 as shown in FIG. 25 were attached to each other so as to produce a liquid crystal cell having a cell gap of 5.5 µm.

Figure 26A:
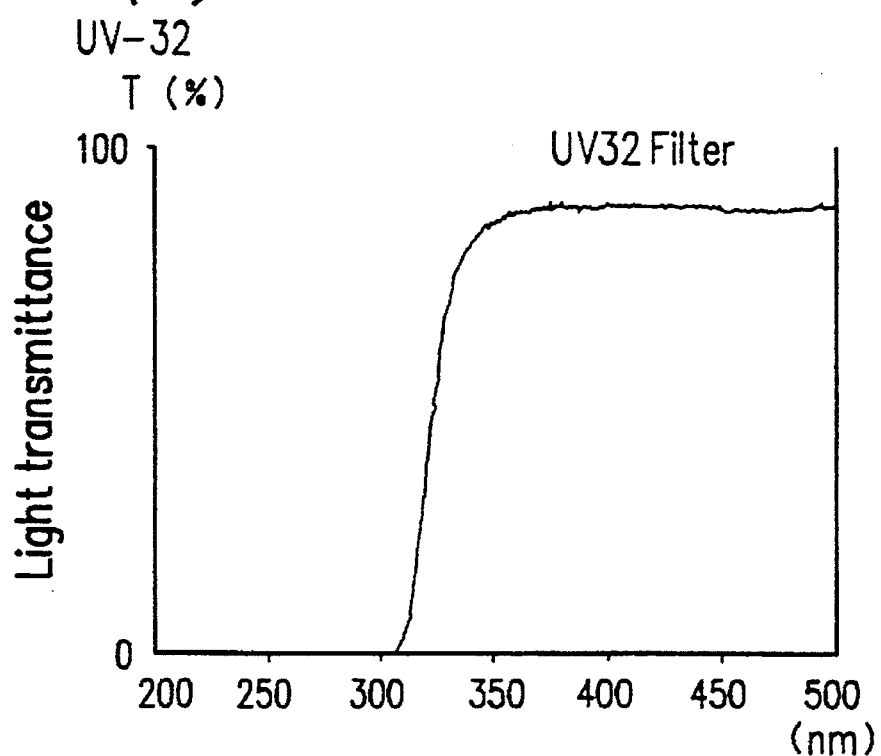
FIGS. 26(a) and 26(b) are graphs showing a spectral transmission characteristic of a UV-rays cut filter used in Example 5 according to the present invention.

The same mixture as that of Example 1 was injected into the cell thus produced. The cell was irradiated with UV-rays by the same light source as that of Example 1, using the color filter 10 as a mask. At this time, a UV-rays cut filter "UV-32" (manufactured by HOYA Corporation) having spectral transmission characteristics shown in FIG. 26(a) was attached to the light source so as to shield UV-rays with a wavelength of 300 nm or less. Thus, the cell was irradiated in the same way as in Example 1 so that resin is optically cured in a self-aligned manner. When the cell was observed with a polarizing microscope, each pixel was almost entirely occupied with a mono-domain and the liquid crystal molecules in each domain were concentrically oriented.

Thereafter, crossed polarizing plates were attached to both sides of the cell to produce a liquid crystal display device of the present invention. The light transmittance and charge holding ratio of the cell under the application of no voltage are shown in Table 11. Here, the charge holding ratio is defined as $C_S/C_T \times 100$ (%), where $C_S$ is a charge amount held in the cell for 16.7 ms, and $C_T$ is a charge amount in the case that charge is not theoretically moved for 16.7 ms.

TABLE 11

| | Construction Example 22 | Comparative Example 23 |
|---|---|---|
| Light transmittance under application of no voltage (%) | 73 | 70 |
| Change holding ratio (%) | 98.1 | 92.2 |

Figure 27A:
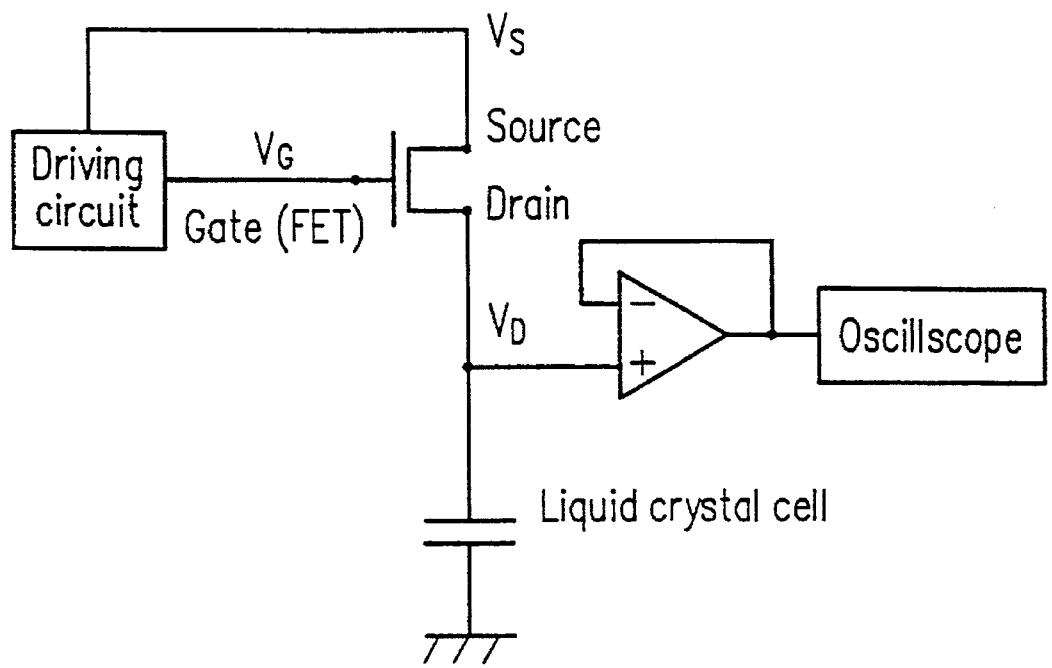
FIG. 27(a) is a block diagram of a measurement device for measuring a charge holding ratio.

In this measurement, it is assumed that light transmittance in the case of using two parallel polarizing plates is 100%. The charge holding ratio was measured by a charge holding ratio measurement apparatus shown in FIG. 27(a). This measurement apparatus includes a switching field effect transistor for applying a voltage $V_D$ across electrodes forming a liquid crystal cell, a driving circuit, and an oscilloscope for measuring the charge discharged from the liquid crystal layer.

Figure 27B:
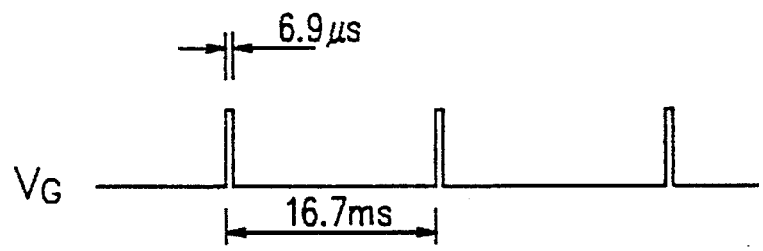
FIGS. 27(b) to 27(d) are diagrams showing signals.
Figure 27C:
Figure 27D:
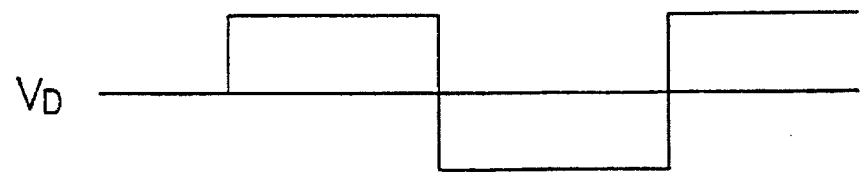

FIG. 27(b) shows a gate signal $V_G$ generated by the measurement apparatus; FIG. 27(c) shows a source signal $V_S$ generated by the measurement apparatus; and FIG. 27(d) shows a voltage $V_D$ applied to the liquid crystal cell.

COMPARATIVE EXAMPLE 23

The same mixture as that of Construction Example 22 was injected into the TFT liquid crystal cell as used in Construction Example 22. Then, the cell thus obtained was irradiated with UV-rays by the same high-pressure mercury lump as that of Example 1, using a color filter in the cell as a mask. At this time, photopolymerization was effected in a self-aligned manner under the same irradiation conditions as those in Example 1. The cell was observed with a polarizing microscope, revealing that each pixel was almost entirely occupied with a mono-domain in the same way as in Construction Example 22 and liquid crystal molecules in each domain were concentrically oriented. Light transmittance and charge holding ratio of the cell under the application of no voltage are shown in Table 11. As understood from Table 11, the cell in Construction Example 22 has more excellent charge holding ratio, compared with the cell in Comparative Example 23.

CONSTRUCTION EXAMPLE 23

Figure 28:
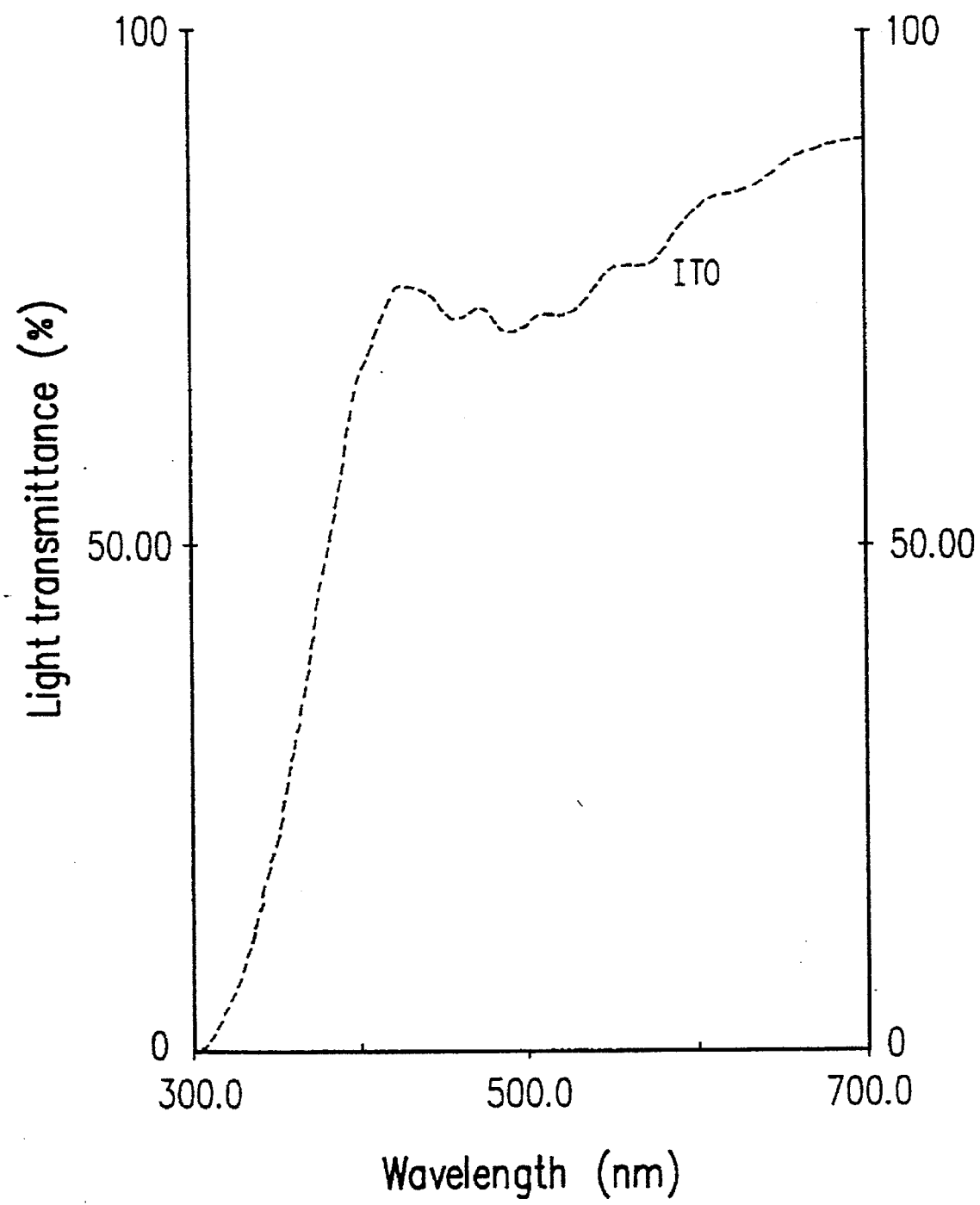
FIG. 28 is a graph showing an optical characteristic of a plastic substrate used in Construction Example 24.

A pair of acrylic plastic substrates with a thickness of 400 μm, having optical characteristics shown in FIG. 28 were attached to each other using a spacer to fabricate a liquid crystal cell with a cell gap of 5.5 μm.

A homogeneous mixture was vacuum-injected into the cell. The mixture was obtained by homogeneously mixing 0.10 g of R-684 (Manufactured by Nippon Kayaku Co., Ltd.), 0.05 g of styrene, 0.85 g of isobornyl acrylate, 4 g of liquid crystal material ZLI-4792 (containing 0.4% by weight of S-811: Manufactured by Merck & Co., Inc.), and 0.025 g of photopolymerization initiator (Lucirin TPO (Manufactured by CIBA-GEIGY Corporation)) which can absorb visible light in the near ultraviolet region. When the vacuum injection was conducted, the substrates and injection plate were heated to 60° C. right after the commencement of the injection at 100 Pa and 30° C.

Figure 26B:
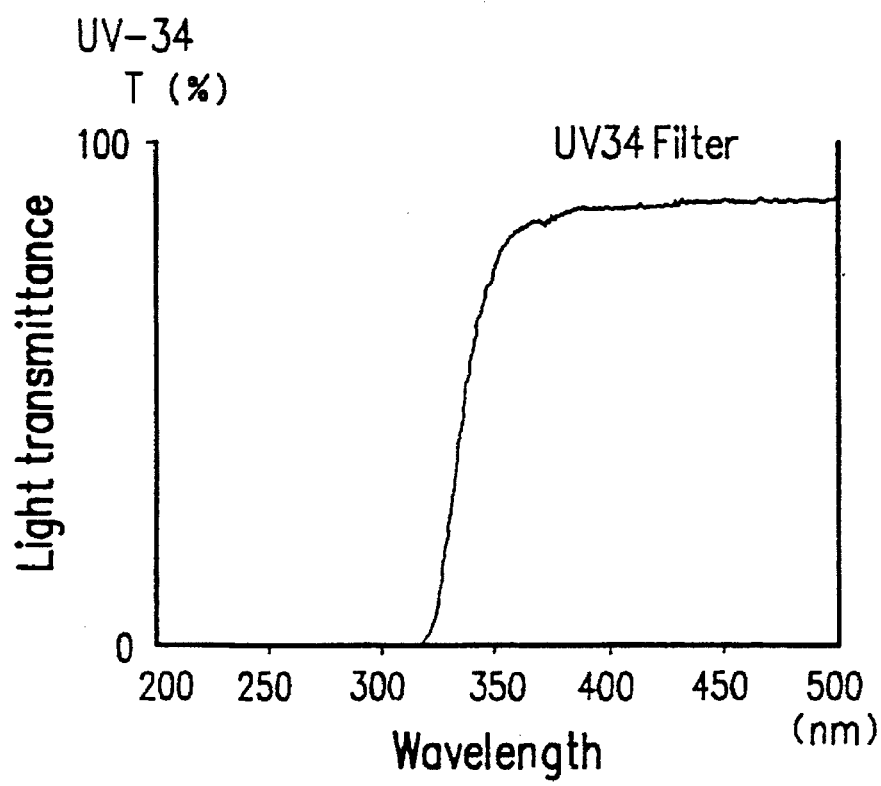

Next, the photomask 15 (FIG. 2) used in Example 1 was placed on the cell, and the cell was irradiated with UV-rays through a dot pattern of the photomask 15 in the same way as in Example 1. At this time, a UV-rays cut filter "UV-34" (manufactured by HOYA Corporation) having spectral transmission characteristics shown in FIG. 26(b) was attached to the light source so as to shield UV-rays with a wavelength of 320 nm or less.

Then, crossed polarizing plates were attached to both sides of the cell to produce a liquid crystal display device of Construction Example 23.

In the liquid crystal display cell produced in Construction Example 23, each pixel was almost entirely occupied with a mono-domain in the similar manner to that of Construction Example 22, and liquid crystal molecules in each domain were concentrically oriented. In addition, the cell thus produced had excellent electrooptical characteristics, i.e., disclination lines were prevented from being formed within the pixel regions, and excellent viewing angle characteristics with high contrast were obtained. Light transmittance and charge holding ratio of the cell under the application of no voltage are shown in Table 12.

TABLE 12

|  | Construction Example 23 | Comparative Example 24 |
| --- | --- | --- |
| Light transmittance under application of no voltage (%) | 65 | 55 |
| Change holding ratio (%) | 96.1 | 87.2 |

COMPARATIVE EXAMPLE 24

A cell was fabricated in the same way as in Construction Example 23, except that the irradiation was conducted through a reflective plate without shielding UV-rays. Then, crossed polarizing plates were attached to both sides of the cell to fabricate a liquid crystal cell. Light transmittance and charge holding ratio of the liquid crystal cell under the application of no voltage are shown in Table 12.

Light transmittance of the cell in Construction Example 23 and Comparative Example 24 under the application of no voltage were measured 100 hours after the fabrication of the cell. In the liquid crystal cell of Construction Example 23, no difference in light transmittance was found between the cell right after fabrication and the cell 100 hours after the fabrication. On the other hand, in the liquid crystal panel of Comparative Example 24, light transmittance was partially changed 100 hours after the fabrication, revealing that the contrast was decreased. Moreover, the light transmittance under the application of no voltage in Construction Example 23 is more excellent than that in Comparative Example 24.

According to Construction Example 23, the wavelength of UV-rays to be irradiated to the cell is controlled during the fabrication of a liquid crystal display device. Thus, the deterioration of the liquid crystal material caused by light is prevented. In addition, light in a high energy region affecting members of the liquid crystal display device such as a color filter and substrates can be shielded, thereby preventing the fading and discoloring of the color filter from adversely affecting display characteristics. As a result, a liquid crystal display device excellent in reliability with respect to reproducibility and display characteristics can be obtained.

(UV-Rays Irradiation With Short Wavelength Light Shielded)

Light in a short wavelength region can be effectively shielded in various manners. For example, light is transmitted through a UV-rays cut filter. Alternatively, light is transmitted through an inorganic or an organic material which makes the transmittance of light (300 nm) 10% or less and which makes the transmittance of light (350 nm) 40% or more, assuming that light is transmitted through the air at 100%.

In the case where a neutral boro-silicated glass substrate such as Corning 7059F or a boro-silicated glass substrate onto which ITO is coated is used, the transmittance of light (300 nm) with respect to the air is about 20%, the transmittance of light (320 nm) with respect to the air is about 40%, and the transmittance of light (340 nm) with respect to the air is about 50%. For this reason, according to the present invention, the range of near ultraviolet light with a short wavelength to be shielded is preferably 300 nm or less, more preferably 320 nm or less. It is very effective to shield light with a wavelength of 340 nm or less.

More specifically, as the range of UV-rays to be shielded is enlarged, the deterioration of a liquid crystal display device caused by UV-rays with a short wavelength and high energy can be more effectively prevented. However, for allowing the photopolymerization phase separation to proceed using the method of the present invention, it is important to utilize a local maximum wavelength of 365 nm of a high-pressure mercury lamp, a metal halide, and the like to be used as a light source, so that light transmittance of about 65% or more at a wavelength of at least 350 nm is desired. Thus, the above-mentioned UV-rays region is preferably shielded.

In the case where a plastic substrate having optical characteristics shown in FIG. 28 is used for the purpose of making the substrate light-weight and providing a substrate with diversity, a component of near ultraviolet light with a short wavelength of 320 nm or less is preferably shielded. More preferably, light with a wavelength of 340 nm or less is shielded. The same reason as that of the glass substrate can be applied to this case.

As the UV-rays cut filter used in the present invention, inorganic glass materials or organic materials are used. Examples of the organic materials include plastic excellent in optical characteristics satisfying the above-mentioned wavelength region, utilizing flexibility and bending properties. Alternatively, inorganic materials or organic materials satisfying the optical conditions described herein can be used alone or in combination in a solid state or in a liquid state. In particular, commercially available UV-rays cut filters including the above-mentioned "UV-32, UV-34, etc." (manufactured by HOYA Corporation) can be used.

EXAMPLE 6

According to the present example, in a liquid crystal display device having liquid crystal regions, each including one or a plurality of liquid crystal domains and being partitioned by a polymer wall, each liquid crystal region is composed of the fewest number of liquid crystal domains, liquid crystal molecules in each domain are coaxially oriented, and the pole of the orientation of liquid crystal molecules faces a cell surface. Thus, a liquid crystal display device having the fewest number of disclination lines, high contrast, and excellent viewing angle characteristics can be provided.

In order to provide such a liquid crystal display device, an electric field and a magnetic field are applied to the mixture in the cell when the mixture is exposed to UV-rays. Alternatively, a polymerizable material for forming the mixture includes a fluorinated compound.

(Orientation State of Liquid Crystal Molecules in Domains)

Figure 29A:
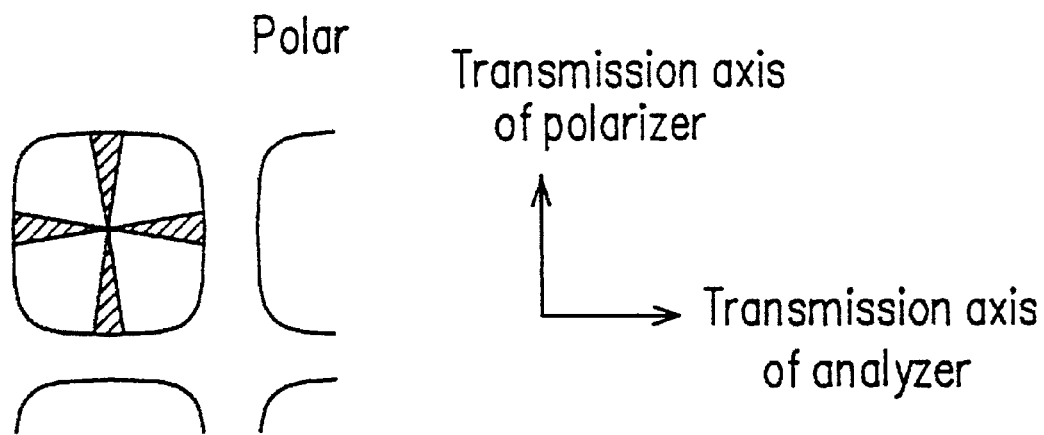
FIG. 29(a) is a diagram of a pixel portion of the liquid crystal display device in Example 6 according to the present invention.
Figure 29B:
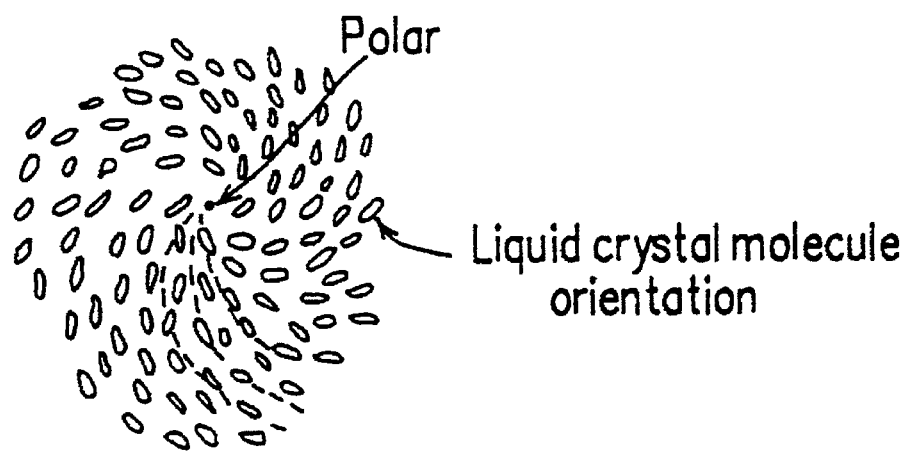
FIG. 29(b) is a diagram illustrating the structure of the pixel portion.

In the liquid crystal domain of the liquid crystal display device according to Example 6, a cross-shaped extinction pattern is observed with a polarizing microscope in the polarizing axis direction of polarizer and an analyzer as shown in FIG. 29(a). In the extinction pattern, the orientation direction of liquid crystal molecules are concentrated at one portion as shown in FIG. 29(b). Herein, this concentrated portion is defined as the polar of the orientation of the liquid crystal molecules (hereinafter, referred to as an orientation polar). FIG. 29(b) shows the interface between the upper substrate and the liquid crystal region seen in the normal line direction of the cell.

In the liquid crystal display device produced by the method of Example 6, each liquid crystal region is arranged so that the orientation polar faces at least one of the two substrates. Furthermore, each orientation polar is formed so as to substantially correspond to each weak light irradiating region of a photomask during a production process described later. In a liquid crystal domain having such an arrangement, disclination lines are formed at the periphery of the domain under the application of a voltage and will not be formed within the domain.

Thus, by controlling light irradiating portions of the photomask, the disclination lines can be intentionally formed outside of each pixel. Also, by forming the disclination lines under the light-shielding portions of the photomask, a black level of the liquid crystal display device is enhanced, and hence, contrast thereof is improved. Furthermore, the orientation polar faces the substrate surface, so that liquid crystal molecules in one liquid crystal droplet are oriented in an omnidirection. This brings about the same effect as that of the case where the liquid crystal molecules in one pixel are oriented in an omnidirection in the conventional TN cell. Consequently, the reverse contrast viewing, which is caused when the observer observes the conventional TN cell in the non-vertical direction under the application of a voltage, can be eliminated. Compared with the cell produced under no application of an electric field or a magnetic field, the variation of optical characteristics in each pixel is decreased, and roughness of a display can be reduced.

FIGS. 30(a) to 30(d) and 31(a) to 31(d) show schematic views of three-dimensional orientation states of each portion of the liquid crystal regions. In these figures, a disk-shaped liquid crystal region 17 is exemplified.

Figure 30A:
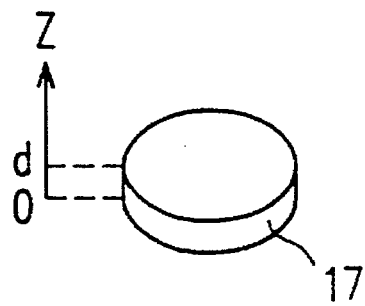
FIGS. 30(a) to 30(d) are schematic views showing an orientation state in each part of the liquid crystal region of the liquid crystal display device in Example 6 according to the present invention.
Figure 30B:
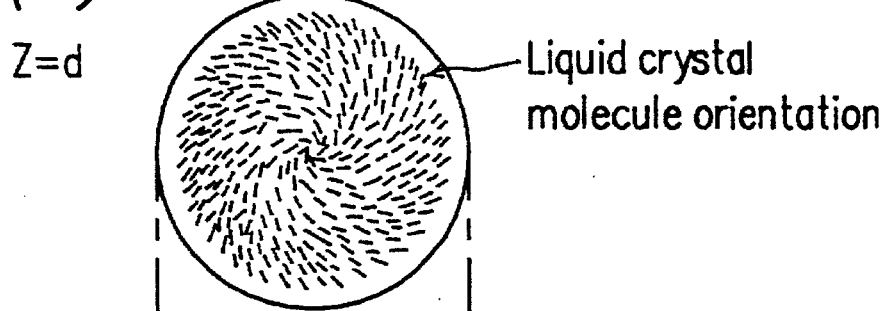
Figure 30C:
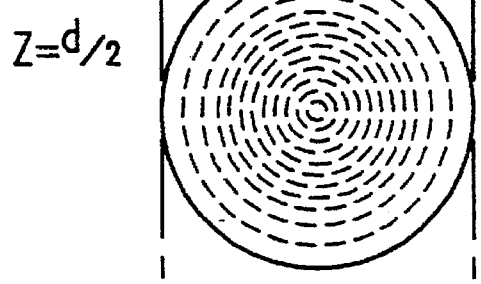
Figure 30D:
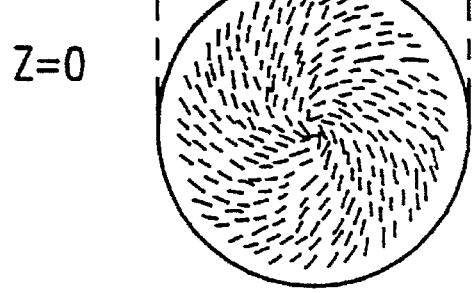

FIGS. 30(a) to 30(d) show the case where the liquid crystal molecules are oriented in a twisted state. FIGS. 30(b) to 30(d) respectively show the orientation of liquid crystal molecules in each round piece cut from the liquid crystal region. More specifically, FIG. 30(b) shows a portion in the vicinity of the upper substrate surface (Z=d); FIG. 30(c) shows a middle portion (Z=d/2); and FIG. 30(d) shows a portion in the vicinity of the lower substrate surface (Z=0).

As understood from these figures, the liquid crystal molecules are symmetrically oriented with respect to an axis of the center portion of the liquid crystal region 17. When the cell is observed from the upper substrate side, it is expected that each portion is oriented as in the TN liquid crystal and the TN orientation rotates while keeping an axial symmetry.

Figure 31A:
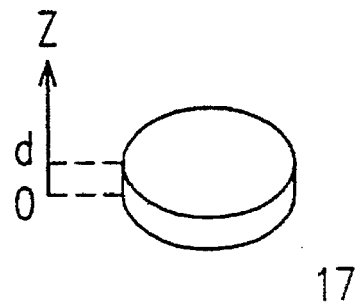
FIGS. 31(a) to 31(d) are schematic views showing an orientation state in each part of the liquid crystal region of the liquid crystal display device in Example 6 according to the present invention.
Figure 31B:
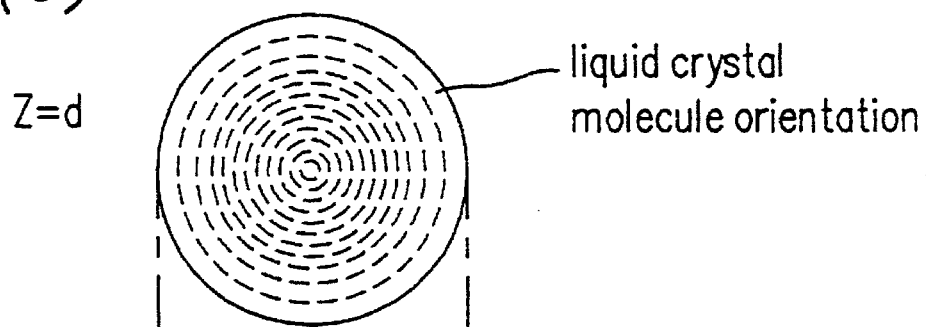
Figure 31C:
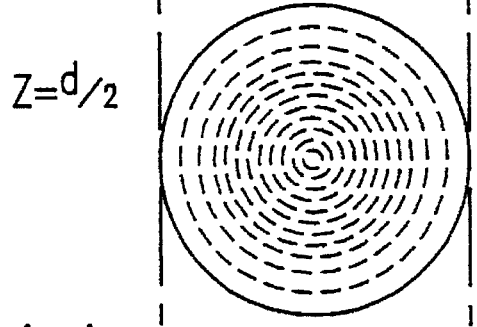
Figure 31D:
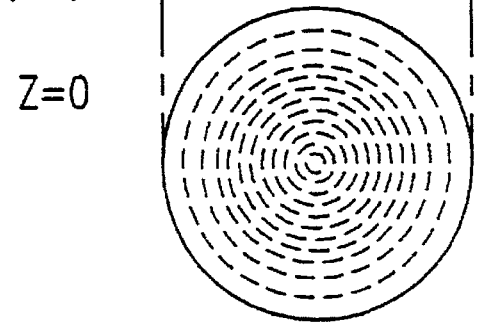

FIGS. 31(a) to 31(d) show the case where the liquid crystal molecules are oriented without twist. FIGS. 31(b) to 31(d) correspond to FIGS. 30(b) to 30(d). As understood from these figures, since the liquid crystal molecules are oriented without twist, the same orientation is obtained in a portion in the vicinity of the upper substrate surface (Z=d), a middle portion (Z=d/2), and a portion in the vicinity of the lower substrate surface (Z=0). Moreover, it is expected that the liquid crystal molecules are symmetrically oriented with respect to the center axis in the same way as in FIGS. 30(b) to 30(d).

(Method for Allowing Liquid Crystal Molecules to be Oriented Axisymmetrically and for Allowing Orientation Polar to Face Cell Surface)

For allowing liquid crystal molecules to be oriented axisymmetrically and for allowing orientation polar to face cell surface, a mixture containing a liquid crystal, a photopolymerizable material, and if required, a photopolymerization initiator is injected into the cell, and the mixture is exposed to UV-rays through a photomask under the application of an electric field or a magnetic field. The electric field and the magnetic field can be applied at the same time.

During the UV-rays irradiation, photopolymerization is effected in the regions of the mixture which are not light-shielded by the photomask. Then, the photopolymerizable material is consumed to form a concentration gradient; as a result, the photopolymerization is effected while the photopolymerizable material moves and disperses from the center of the photomask to the ends thereof. On the other hand, as the consumption of the photopolymerizable material in the mixture proceeds, it gets difficult for the liquid crystal material to dissolve in the mixture. Then, the liquid crystal material starts being phase-separated from the mixture in the weak light irradiated regions to aggregate.

At this time, the orientation of the liquid crystal molecules inside of the liquid crystal regions is determined by the balance of three energies: (1) elastic energy of liquid crystal; (2) orientation energy on the interface between the liquid crystal region and the isotropic phase; and (3) orientation energy caused by an electric field and/or a magnetic field (hereinafter, referred to as an external field).

Figures 32A, 32B:
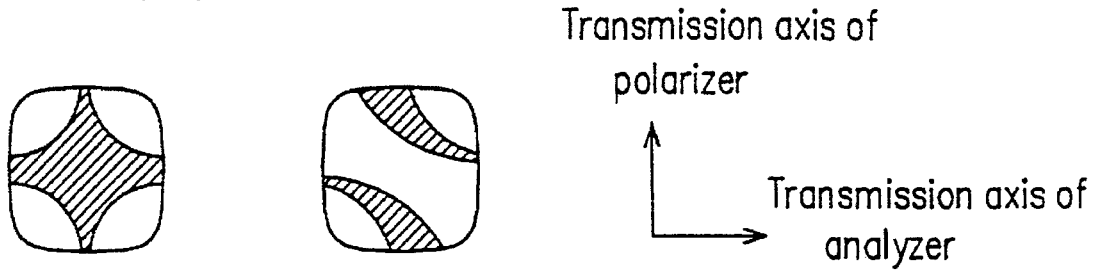
FIGS. 32(a) and 32(b) show the liquid crystal region of the liquid crystal display device in Example 6 according to the present invention, observed with a polarizing microscope.

In the case where the external field of (3) is not applied, the energy determining the orientation of the liquid crystal molecules changes from (2) to (1) with the increase in size of the liquid crystal droplet during the phase separation. At this time, the orientation of each liquid crystal droplet after being grown is determined. Since the external field is not applied, the uniformity of the orientation of liquid crystal molecules in each liquid crystal droplet decreases. As a result, observation with a polarizing microscope reveals that liquid crystal regions, including liquid crystal molecules whose orientation axis is not aligned, are formed, as shown in FIGS. 32(a) and 32(b).

(Effects of External Field During Photopolymerization)

In Example 6, during the phase separation step, an external field such as an electric field and a magnetic field is applied for controlling orientation. Herein, the case where an electric field is applied and the dielectric anisotropy of the liquid crystal molecules is positive will be considered.

Figure 33A:
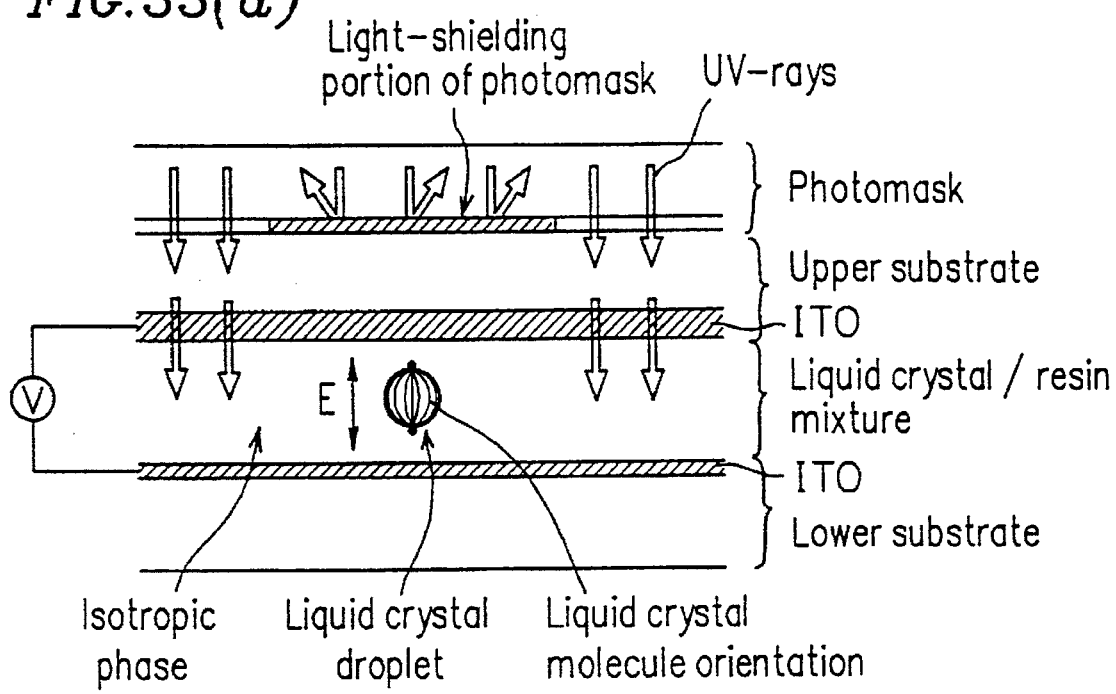
FIGS. 33(a) to 33(c) are diagrams illustrating the effect of an external field during a polymerization step of a method according to the present invention.
Figure 33B:
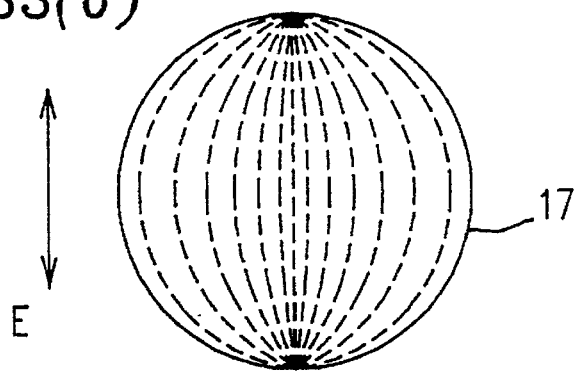

As shown in FIG. 33(a), when an electric field E is applied to the substrates substantially in the vertical direction thereof, the liquid crystal molecules are oriented in the vertical direction of the substrates, and hence the orientation polar faces the substrate surface. FIG. 33(b) shows the orientation state of the liquid crystal molecules on the surface of the liquid crystal region 17.

Figure 33C:
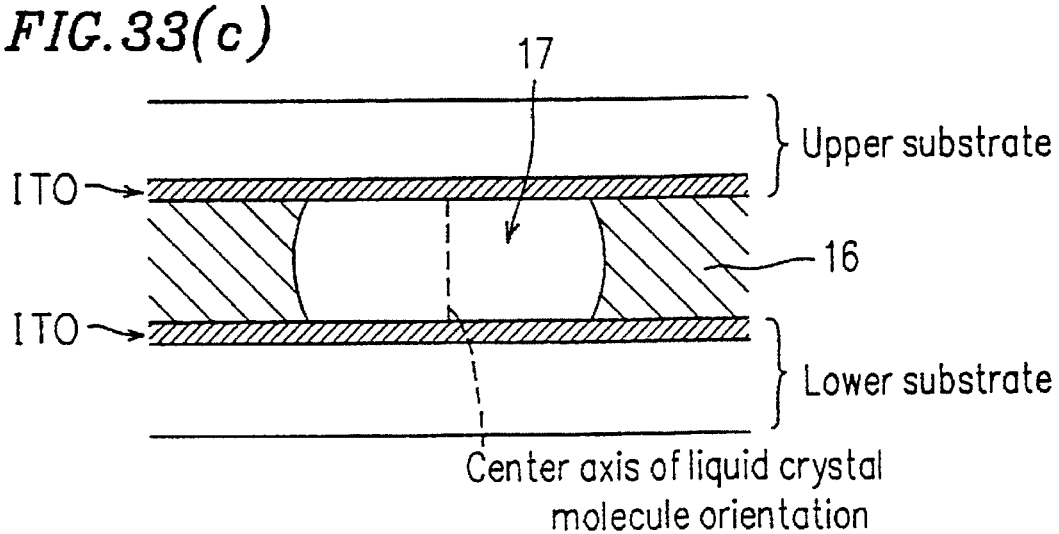

When the photopolymerization of a photopolymerizable material proceeds, the liquid crystal molecules in the liquid crystal region 17 are arranged in accordance with the above-mentioned orientation. This results in a liquid crystal region in which the liquid crystal molecules are oriented so as to be symmetric with respect to a center axis, i.e., the orientation polar of the liquid crystal droplet at the initial stage of the phase separation, as shown in FIG. 33(c). It is appreciated that this effect can be obtained even when a magnetic field is used instead of an electric field.

As described above, when the electric field or magnetic field is applied during light irradiation, the orientation polar of the liquid crystal region is regulated to be vertical to the substrate surface. For this reason, the electric field can be easily applied to the mixture in the vertical direction of the substrate surface, using the substrate on which segmented electrodes are formed. The electric field is preferably applied at $V_{10}$ (voltage at which light transmittance in a normally white mode becomes 10%)×3 or less in the electro-optic characteristics after the fabrication of the liquid crystal cell.

It is preferred to determine the frequency of the electric field so that the liquid crystal molecules are easily oriented upon application of the electric field. More specifically, about 0 (DC)–1 $MH_z$ is preferred. In the case where an average value from the start of the photopolymerization to the end thereof exceeds $V_{10} \times 3$, the liquid crystal molecules are strongly oriented in a homeotropic direction under the application of no voltage. This results in a black state in crossed Nicols, decreasing light transmittance. In the case of applying a magnetic field, the average value is $H_{10} \times 3$ or less is preferred for the same reason as that of the electric field. Herein, $H_{10}=V_{10} \times (\Delta\epsilon/\Delta\chi)^{1/2}/d$, where $\Delta\epsilon=\epsilon_e-\epsilon_o$: difference in dielectric constant between the long axis direction and the short axis direction of the liquid crystal molecules, $\Delta\chi=\chi_e-\chi_o$: difference in magnetic susceptibility between the long axis direction and the short axis direction, and d: cell gap.

The method for applying an electric field or a magnetic field to the mixture has already been discussed in "Liquid Crystal Vol. 5, No. 5, pp. 1477–1489 (1989)". However, the present invention relates to a birefringence mode, and a method for controlling the polarization of light transmitted through the liquid crystal region. In addition, according to the present invention, each liquid crystal region is regulated to the size of each pixel, or light having irradiation degree distribution is used for providing the liquid crystal regions with the same uniformity as that of the pixels. These structures, as well as physical phenomena used for a display, are completely different from those described in the above book. In particular, the size of each liquid crystal region of the present invention is completely different from that in a light scattering mode. Thus, the influence of the electric field applied during the polymerization on the liquid crystal regions formed by polymerization is different between the transmission mode and the light scattering mode. More specifically, in the light scattering mode, a value obtained by dividing a surface area of a liquid crystal region by a volume of the liquid crystal region is much larger than that of the present invention, and the orientation during the polymerization strongly remains in each liquid crystal region. However, according to the present invention, the size of the liquid crystal region is large, so that the elastic energy of liquid crystal dominates more than the surface orientation energy. Because of this, although the application of an external field during polymerization enhances the uniformity of orientation of liquid crystal molecules, it does not have an effect of fixing orientation.

(Physical Property of Resin Material Suitable for Example 6)

In Example 6, the liquid crystal display device is produced under the condition that the glass transition temperature Tg of the photopolymerizable material after being cured (resin) is kept at room temperature or more, preferably 60° C. or more, and polymer walls, columns, and the like are not formed in the weak light irradiated regions. In the liquid crystal display device thus produced, liquid crystal molecules are radially oriented with respect to the vicinity of the center of each weak light irradiated region.

The conditions for preventing the formation of polymer walls, columns, and the like in the weak light irradiated regions are determined by the photopolymerization speed, the size of each pixel, and a cell gap. In the case where the cell gap is constant, the conditions are determined by changing the composition of resin depending upon the size of each pixel and the polymerization speed.

In the case where the size of each pixel is less than 100 μm, the resin is preferably composed of a material having a relatively high polymerization speed such as acrylate. In contrast, in the case where the size of each pixel is more than 100 μm, it is preferred that by using acrylate mixed with molecules containing a double bond having a resonance system, such as methacrylate and styrene having the effect of suppressing polymerization speed, photopolymerization speed is decreased, and phase separation speed between the liquid crystal and the polymeric material is decreased. In this way, the polymeric material can be prevented from entering the weak light irradiated regions.

Furthermore, the number of photopolymerizable functional groups in a molecule affects the phase separation speed between the liquid crystal material and the polymer. In the photopolymerizable material having 2 to 3 functional groups in its molecule, both of the gelation speed of a polymer and phase separation speed are high. A monofunctional material decreases the phase separation speed between the liquid crystal material and the polymer, so that such a material is suitable for a large pixel. These compounds can be mixed and selected depending upon the size of a pixel.

CONSTRUCTION EXAMPLE 24

Hereinafter, Example 6 will be described based on Construction Example 24. The present invention is not limited thereto.

Glass substrates (1.1 mm in thickness) having a transparent electrode made of ITO (50 nm in thickness) were attached to each other with a spacer (6 μm in diameter) interposed therebetween to fabricate a cell.

Figure 34:
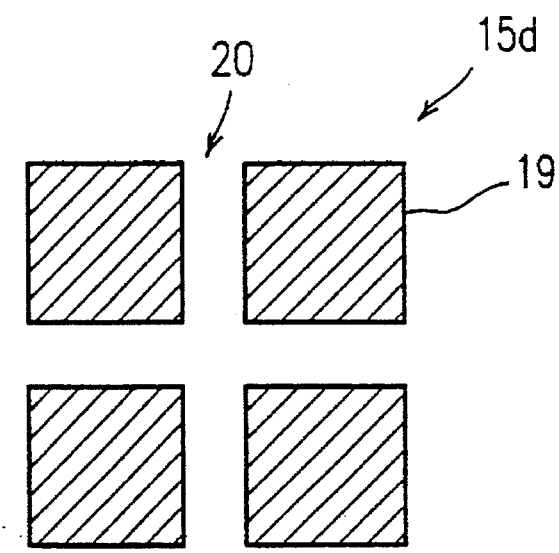
FIG. 34 is a plan view of a photomask used in Construction Example 25.

A photomask 15d shown in FIG. 34 was placed on the cell thus fabricated, and a mixture was injected into the cell in a transparent state at 35° C. The mixture was obtained by mixing 0.1 g of R-684 (manufactured by Nippon Kayaku Co., Ltd.), 0.05 g of styrene, 0.85 g of isobornyl methacrylate, 4 g of liquid crystal material ZLI-4792 (containing 0.4% by weight of S-811: manufactured by Merck & Co., Inc.), and 0.0025 g of photopolymerization initiator (Irgacure 651).

Under the condition of the same temperature, the display cell was irradiated with collimated light beams at 10 mW/cm$^2$ using a high-pressure mercury lamp through a dot pattern of the photomask 15d while applying an AC voltage of 60 Hz (effective value of 3 V) for one second, and the display cell was allowed to stand for 30 seconds without the irradiation. This cycle was repeated 20 times. Then, the display cell was irradiated with UV-rays for 10 minutes to cure the polymerizable material. After the polymerizable material was cured, the display cell was observed with a polarizing microscope, indicating that liquid crystal domains having the same size and arrangement pitch as those of the dot pattern of the photomask 15d were formed.

Next, two crossed-polarizing plates were attached to both sides of the display cell to fabricate the liquid crystal display device in which the liquid crystal regions are partitioned by the polymer walls.

Figure 35:
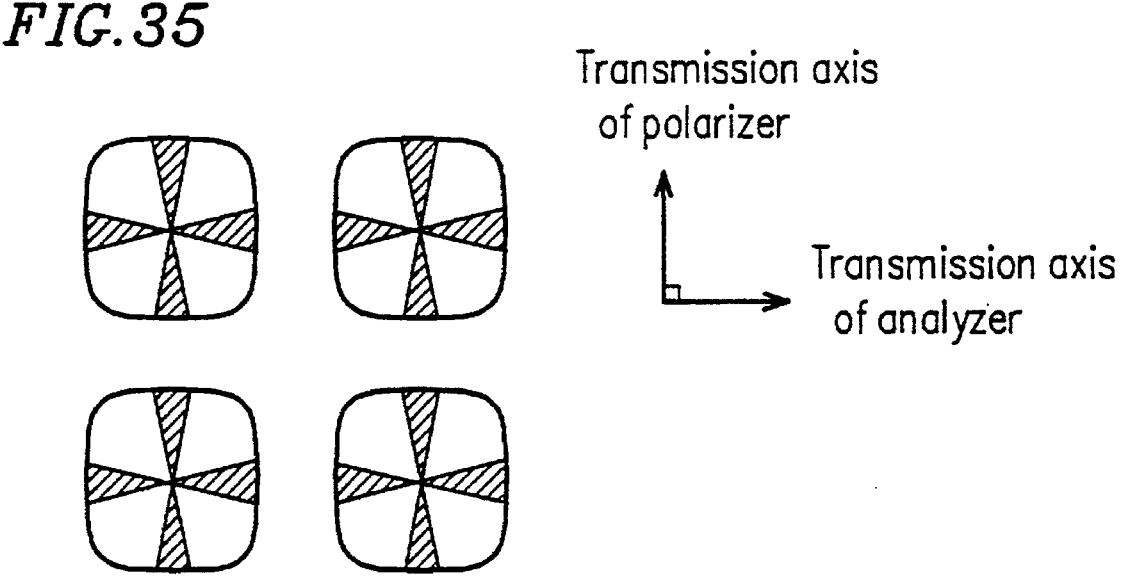
FIG. 35 is a diagram of a schlieren texture of a liquid crystal display device produced in Construction Example 25.

The cell thus obtained was observed with a polarizing microscope, as shown in FIG. 35, indicating that each pixel was occupied with almost one liquid crystal domain, the polar of the liquid crystal orientation was vertical to the substrate surface, and a schlieren texture in which the liquid crystal molecules were radially or concentrically oriented in each liquid crystal domain was formed. Also, the cell was observed with a polarizing microscope under the application of a voltage, revealing that disclination lines were formed at the periphery of each liquid crystal domain with the application of a voltage, and these disclination lines were eliminated when the voltage was saturated. The electro-optic characteristics of the cell thus obtained are shown in Table 13 and FIG. 36.

TABLE 13

|  | Construction Example 24 | Construction Example 25 |
| --- | --- | --- |
| Light transmittance under application of no voltage (%) | 72 | 70 |
| Reverse contrast viewing in gray-scale display | ◯ | ◯ |

Figure 36:
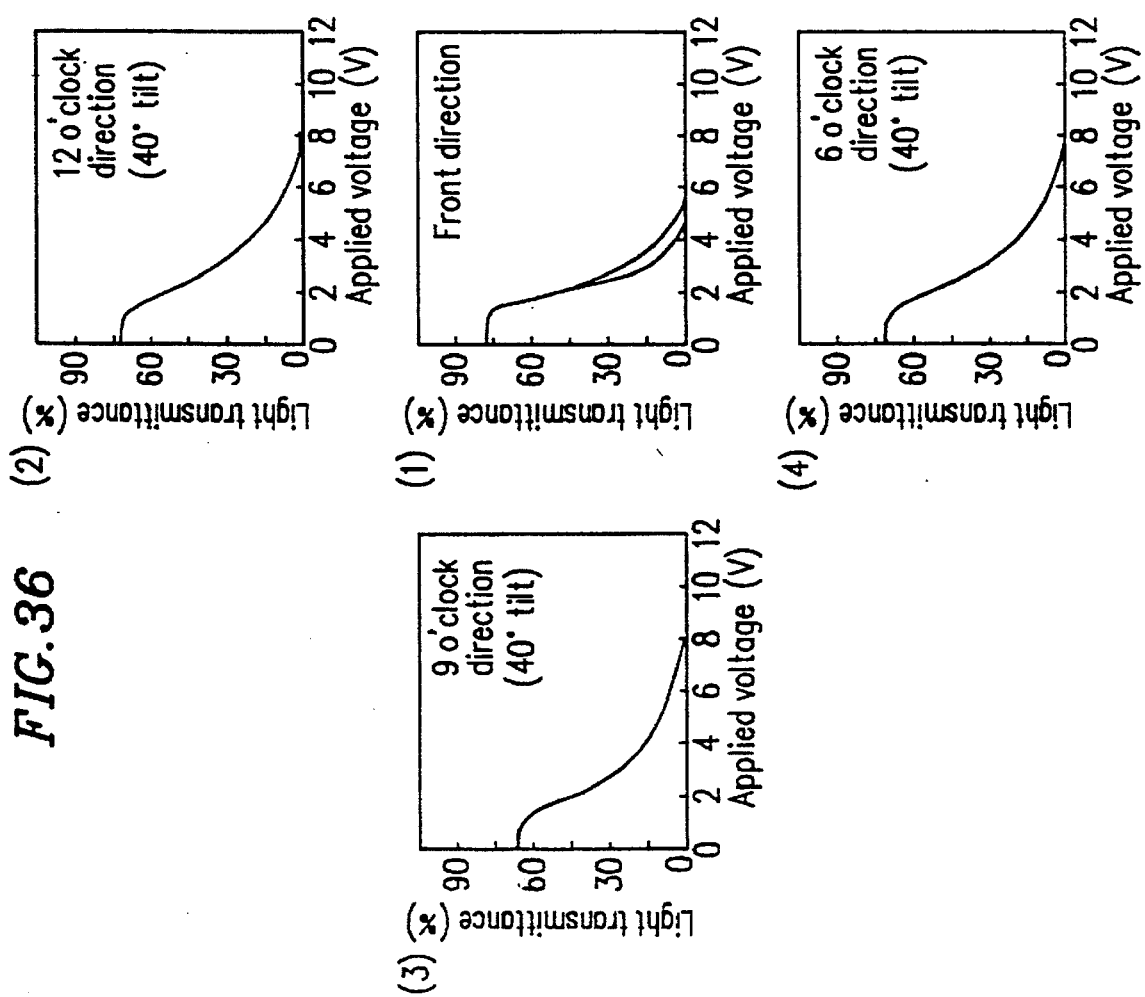
FIG. 36 shows graphs showing electro-optic characteristics of the liquid crystal display device produced in Construction Example 25.

As understood from Table 13 and FIG. 36, the cell of Construction Example 24 has no problem of reverse contrast viewing caused in the TN cell of Comparative Example 1 shown in FIG. 10. In addition, in the cell of Construction Example 24, the increase in light transmittance in a high viewing angle direction (direction largely apart from the normal line to the panel) at the time of saturation of a voltage is not observed. In this measurement, it is assumed that light transmittance in the case of using two parallel polarizing plates is 100%.

CONSTRUCTION EXAMPLE 25

Example 6 will be described based on Construction Example 25.

A cell was fabricated in the same way as in Construction Example 24, except that a magnetic field of 0.3 T is applied in the vertical direction of the cell during the UV-rays irradiation.

Crossed polarizing plates were attached to both sides of the cell to produce a conventional TN display device.

The electrooptical characteristics of the cell thus obtained are shown in Table 13. In this case, the same effects as those of Construction Example 24 are obtained.

As described above, according to Example 6, the liquid crystal molecules are axisymmetrically oriented in an omnidirection in one pixel. Therefore, problems caused in the conventional liquid crystal display device, such as poor viewing angle characteristics and reverse contrast viewing, can be solved. That is, wider viewing angle characteristics can be realized.

In particular, the polymer is prevented from entering the pixels, each pixel includes the fewest number of liquid crystal domains, and the liquid crystal molecules are axisymmetrically oriented to suppress the formation of disclination lines. Thus, the viewing angle characteristics as well as light transmittance under the application of no voltage are improved.

EXAMPLE 7

In Example 7, the disclination lines between the respective liquid crystal domains are suppressed. In the present example, even under the application of a voltage, the disclination lines can be eliminated, resulting in high contrast.

The inventors have found that in a liquid crystal display device in which liquid crystal regions are partitioned by a polymer, the liquid crystal molecules are radially oriented in each liquid crystal region, and each liquid crystal region is occupied substantially by a mono-domain (or a plurality of domains), contrast can be improved. Furthermore, by controlling the orientation state of polymer walls and aligning the orientation direction of the liquid crystal material under the application of a voltage with that of the polymer walls, the inventors have achieved a liquid crystal display device with excellent viewing angle characteristics having a high contrast in which disclination lines are not formed at all, and the liquid crystal molecules are axisymmetrically oriented.

Hereinafter, Example 7 will be described in detail.

(Principle of Suppressing Disclination Lines)

A liquid crystal display device having liquid crystal regions partitioned by polymer walls has the following features.

Figure 37:
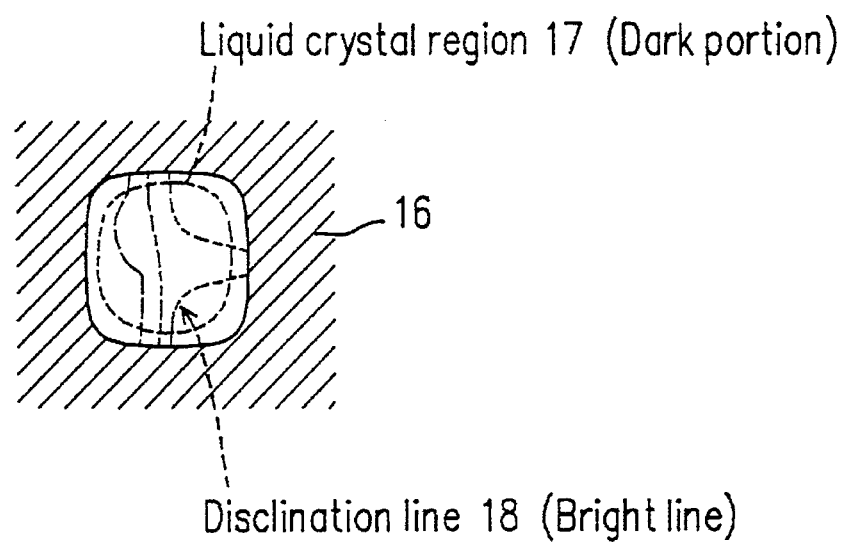
FIG. 37 is a view illustrating the principle of suppressing disclination lines.

(1) In a cell having a plurality of liquid crystal domains in each liquid crystal region, discontinuous orientation of liquid crystal molecules is caused between the respective domains, forming disclination lines 18 (line-shaped orientation defects) as shown in FIG. 37. The disclination lines 18 remain as bright lines under the application of a voltage, instead of being eliminated, resulting in low contrast.

Figure 38A:
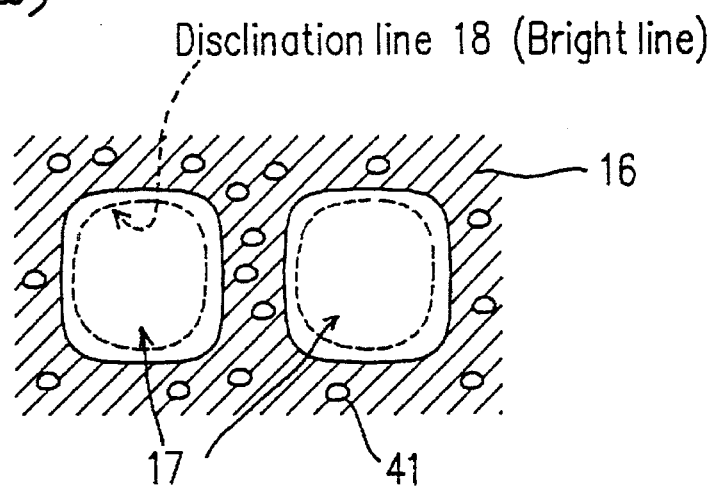
FIGS. 38(a) and 38(b) are views showing a state where disclination lines are formed.

(2) In a cell having axisymmetric liquid crystal molecules (including spiral shaped liquid crystal molecules) in each liquid crystal region 17, disclination lines other than center disclination points are not formed in the liquid crystal region 17. However, as shown in FIG. 38(a), the disclination lines 18 are formed in the vicinity of the interfaces between the liquid crystal regions 17 and the resin walls 16 under the application of a voltage. More specifically, under the application of no voltage, the liquid crystal molecules in each liquid crystal region 17 are oriented in a twist state while keeping the horizontal relationship with respect to the substrate. When a voltage is applied, the liquid crystal molecules rise in the vertical direction to the cell. During this step, the rising direction of the liquid crystal molecules strongly affected by the alignment regulating force of the resin walls 16 surrounding the liquid crystal regions 17 and the rising direction of the liquid crystal molecules at the center of the liquid crystal regions 17 become different. This causes the formation of reverse tilt disclination lines, i.e., discontinuous lines. In the same way as in (1), the reverse tilt disclination lines become bright lines under the application of a voltage, resulting in low contrast.

(3) In the case where the liquid crystal molecules on the interfaces between the liquid crystal regions and the resin walls are oriented so as to stabilize the orientation of the liquid crystal molecules in the liquid crystal regions under the application of a voltage, disclination lines as formed in (2) such as those formed at the periphery of the liquid crystal regions under the application of a voltage are not formed. This is because the rising direction of the liquid crystal molecules at the center of the liquid crystal regions under the application of a voltage is identical with the orientation direction of the liquid crystal molecules supported by the resin walls. However, in this case, discontinuous points are still formed at the center of the liquid crystal regions in the same way as in item (2).

For realizing the orientation of the liquid crystal molecules on the interfaces between the liquid crystal molecules and the polymer, the following is conducted.

In the case where a monofunctional polymerizable liquid crystal material is used, the polymer in the polymer walls is made axisymmetrically oriented with respect to the center of the liquid crystal regions. Alternatively, the polymer on the upper and lower substrates at the center of the liquid crystal regions is made oriented so as to have a pretilt axisymmetric with respect to the center of the liquid crystal droplet.

Furthermore, in the case where a bifunctional polymerizable liquid crystal material is used, there is little possibility that a liquid crystalline site jumps out of the polymer surface, as in the case of using a monofunctional liquid crystal material. Therefore, a pretilt can be suppressed on the interfaces between the liquid crystal and the polymer, and orientation of the liquid crystal molecules on the polymer walls can be controlled in the same way as in the case of using the monofunctional material. Thus, disclination lines can be prevented from being formed under the application of a voltage. Since the bifunctional polymerizable liquid crystal material can control a pretilt, it is not required to increase the $\Delta$ n·d characteristic more than an optimum value. In addition, this material can prevent the degradation of the viewing angle characteristics in the direction at an angle of 45° from the polarizing axis under the application of a voltage (in particular, at the time of saturation of a voltage). Furthermore, these polymerizable liquid crystal materials can be used alone, or the combination of a monofunctional material and a bifunctional material can be used.

(Method for Controlling Orientation of Polymeric Material)

For effectively aligning the polymer in the polymer walls in the orientation direction of the liquid crystal molecules under the application of a voltage, it is preferred to add a liquid crystalline photopolymerizable material, having in its molecule a functional group exhibiting liquid crystallinity, to a mixture of liquid crystal and a photopolymerizable material. Furthermore, by irradiating UV-rays to the mixture through a uniform pattern of a photomask under the application of an electric field or a magnetic field, the polymer in the polymer walls can be partially oriented in the vertical direction to the substrates, while the orientation axis of the liquid crystal regions are aligned in the vertical direction to the substrates.

In the above method, if the irradiation is conducted at not less than a temperature at which the liquid crystal material exhibits an isotropic phase, the liquid crystal is perfectly phase-separated from the polymer and the orientation of the liquid crystal and the polymer are made uniform. In this case, during the irradiation, the liquid crystal is in a uniform state without being phase-separated. Thereafter, the cell is cooled to allow the liquid crystal to be gradually phase-separated from the polymer. Under this condition, an electric field and/or a magnetic field is applied. In this way, the center axis of the orientation of liquid crystal droplets is aligned in the electrical field direction or the magnetic field direction, and the liquid crystal molecules are symmetrically oriented with respect to the center axis of the orientation of the liquid crystal regions. If the irradiation is conducted again after cooling, the polymerization is more perfectly effected. (UV-rays can be irradiated either through a photomask or without a photomask.)

Figure 38B:
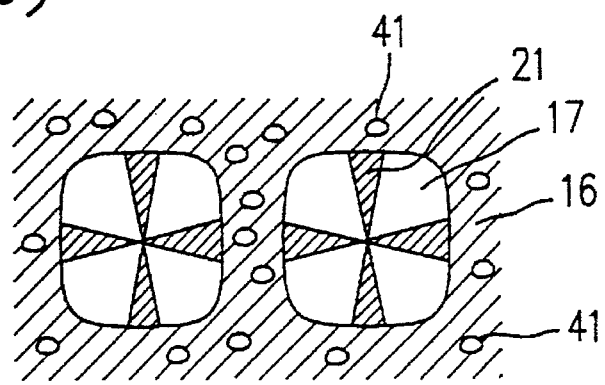

As described above, in the case where the irradiation of light is conducted at not less than the temperature at which the liquid crystal material exhibits an isotropic phase, as shown in FIG. 38(b), the presence of liquid crystal droplets 41, caused when the irradiation is conducted at a temperature lower than that temperature, can be prevented, resulting in more excellent contrast.

In the above case, a liquid crystal material having $\Delta\epsilon>0$ is used. However, in the case of using a liquid crystal material having $\Delta\epsilon<0$, the polymer material is oriented in the horizontal direction to the substrates along the orientation direction of the liquid crystal molecules.

CONSTRUCTION EXAMPLE 26

Hereinafter, Example 7 will be described based on Construction Example 26. It is noted that the present invention is not limited thereto.

Glass substrates (1.1 mm in thickness) having a transparent electrode made of ITO (50 nm in thickness) were attached to each other with a spacer (5.5 μm in diameter) interposed therebetween to fabricate a cell.

Figure 39:
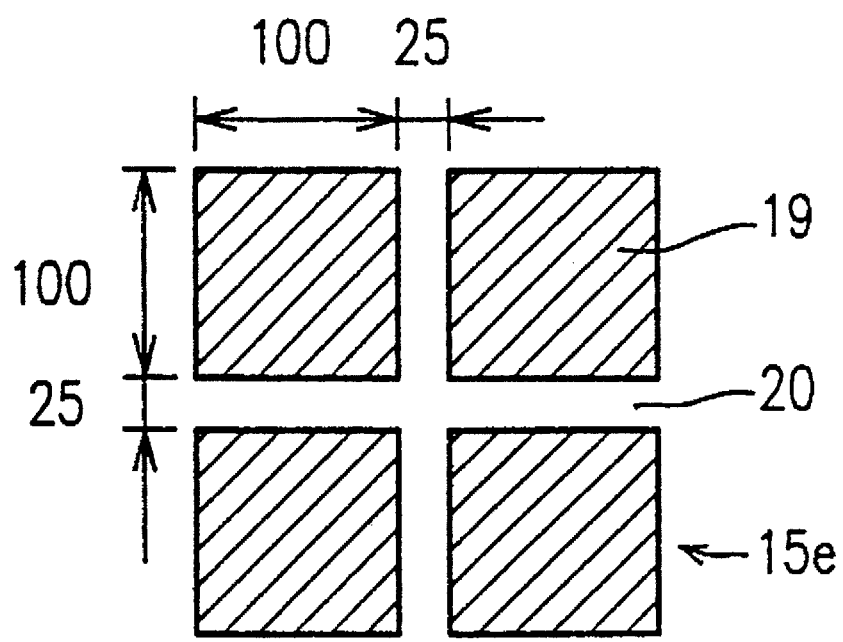
FIG. 39 is a plan view of a photomask used in Construction Example 27.

A photomask 15e shown in FIG. 39 was placed on the cell thus fabricated, and a mixture was injected into the cell in a transparent state at 35° C. The mixture was obtained by mixing 0.1 g of R-684 (manufactured by Nippon Kayaku Co., Ltd.), 0.05 g of styrene, 0.65 g of isobornyl methacrylate, 0.15 g of perfluorooctyl acrylate, 0.1 g of liquid crystalline photopolymerizable material represented by the following Formula 3:

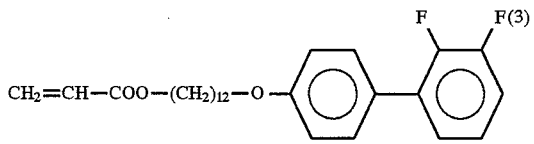

4 g of liquid crystal material ZLI-4792 (containing 0.4% by weight of S-811: manufactured by Merck & Co., Inc.), and 0.0025 g of photopolymerization initiator (Irgacure 651).

Under the condition of the same temperature, the display cell was irradiated with collimated light beams at 10 mW/cm$^2$ using a high-pressure mercury lamp through a dot pattern of the photomask 15e while applying an AC voltage of 60 Hz (effective value of 3 V) for one second, and the display cell was allowed to stand for 30 seconds without the irradiation. This cycle was repeated 20 times. Then, the display cell was irradiated with UV-rays for 10 minutes to cure the polymerizable material. After the polymerizable material was cured, the display cell was observed with a polarizing microscope, indicating that liquid crystal domains having the same size and arrangement pitch as those of the dot pattern of the photomask 15e were formed.

Next, two crossed-polarizing plates were attached to both sides of the display cell to fabricate the liquid crystal display device in which the liquid crystal regions are partitioned by the polymer walls.

The cell thus obtained was observed with a polarizing microscope, indicating that each pixel was occupied with almost one liquid crystal domain, the polar of the liquid crystal orientation was vertical to the cell surface, and a schlieren texture in which the liquid crystal molecules were radially or concentrically oriented in each liquid crystal domain was formed. Also, the cell was observed with a polarizing microscope under the application of a voltage, revealing that the liquid crystal droplets became dark with the application of a voltage, but disclination lines were not formed. The electrooptical characteristics of the cell thus obtained are shown in Table 14.

TABLE 14

|  | Construction example 26 | Construction example 27 | Construction example 28 |
| --- | --- | --- | --- |
| Light transmittance at voltage of 5 volts | 0.3 | 0.8 | 0.3 |
| Formation of disclination lines | None | Formed | None |
| Reverse contrast viewing in gray-scale display | ◯ | ◯ | ◯ |

As understood from Table 14, the cell of Construction Example 26 has no problem of reverse contrast viewing caused in the conventional TN cell of Comparative Example 1 shown in FIG. 10. In addition, in the cell of Construction Example 26, the increase in light transmittance in a direction, largely apart from the normal line to the panel, at the time of saturation of a voltage is not observed. In this measurement, it is assumed that light transmittance in the case of using two parallel polarizing plates is 100%.

Furthermore, while being tilted, the cell was observed with a polarizing microscope under the application of no electric field, whereby orientation of the liquid crystal molecules was expected. This makes it possible to expect the distribution of tilt of the liquid crystal molecules in the cell gap direction.

Figures 40A, 40B:
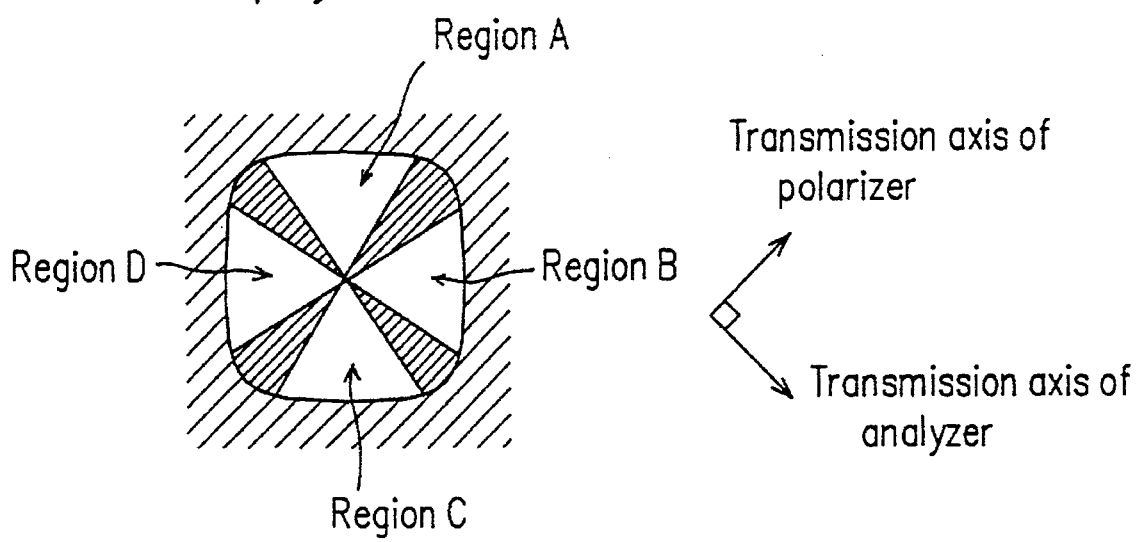
FIGS. 40(a) and 40(b) are diagrams showing observation results of a liquid crystal display device produced in Construction Example 27.

The observation results are shown in FIGS. 40(a) and 40(b). FIG. 40(a) shows observed regions A, B, C, and D. FIG. 40(b) shows the brightness of the respective regions A, B, C, and D. It is noted that the distortion of an image and out-of-focus caused by observing the cell at 40° in the 6 o'clock direction is corrected. While observing the cell at 40° in the 6 o'clock direction, the cell was rotated in its plane with respect to the center of the observed regions, the extinction pattern was not rotated. This shows that the liquid crystal molecules in each liquid crystal droplet were symmetrically oriented with respect to its axis.

The respective regions A, B, C, and D surrounded by the transmission axes of the polarizer and the analyzer of FIG. 40 had their brightness changed depending upon the tilt of the cell. The distribution of the brightness was not changed by the above rotation. This shows that the cell has axisymmetric pretilt in the liquid crystal orientation. The liquid crystal orientation was expected by using the polarizing microscope observation. The results are shown in FIGS. 41(a) to 42(c).

(Results of Expecting Orientation)

Figure 41A:
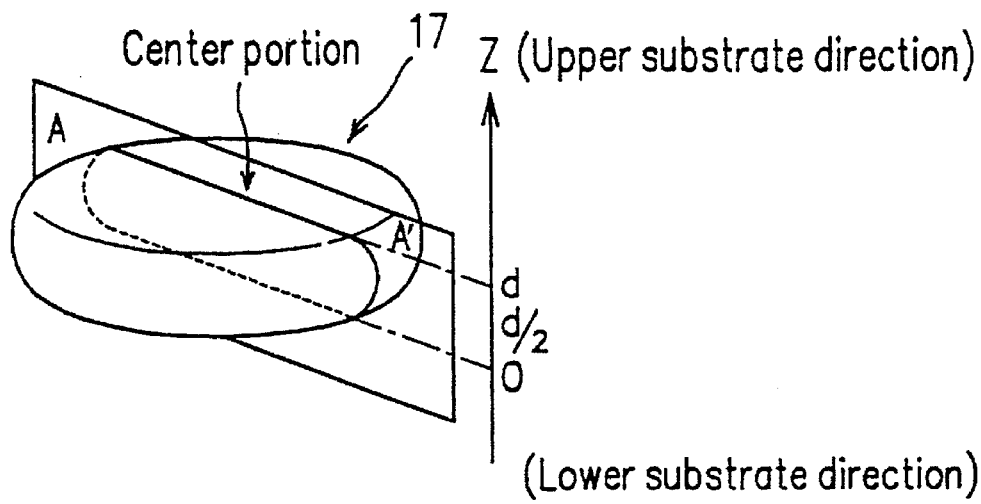
FIGS. 41(a) to 41(c) are diagrams used for expecting the orientation of liquid crystal molecules of a liquid crystal display device.
Figure 41B:
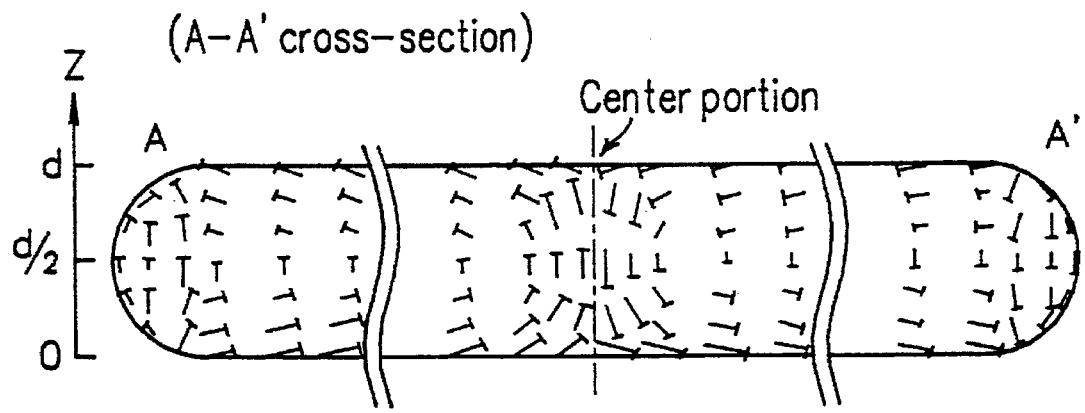
Figure 41C:
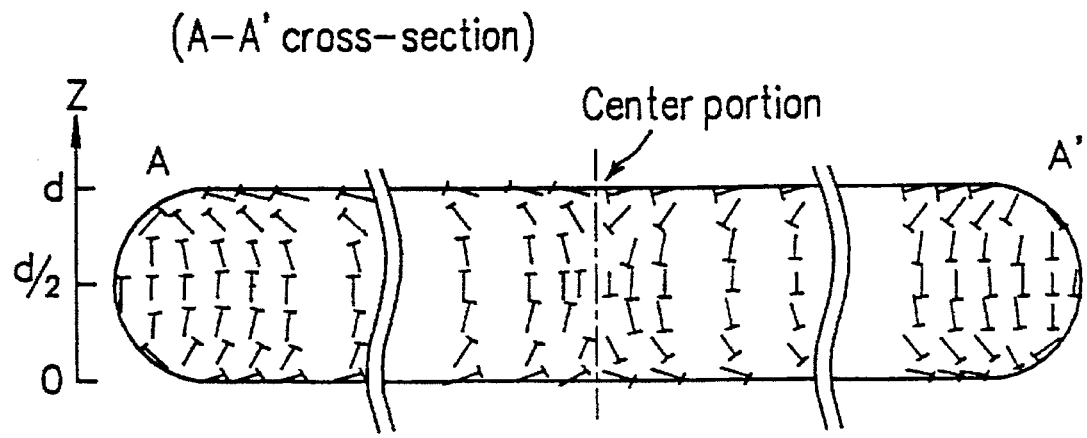

FIGS. 41(b) and 41(c) are cross-sections taken along an A—A' plane of FIG. 41(a). The A—A' plane passes through a center axis of the orientation of the liquid crystal region 17 and includes a normal line to the cell. Since the liquid crystal molecules in the liquid crystal region 17 are axisymmetrically oriented, cross-sections of the liquid crystal region 17 taken along the center axis in any direction are the same. Here, the orientation of the liquid crystal molecules is represented by a mark "-"; and the liquid crystal molecules other than those oriented in the vertical direction or parallel direction to the drawing surface are represented by a nail-shaped mark, the head of the nail-shaped mark representing the front side of the drawing surface. The size of the liquid crystal molecules shown in FIGS. 41(b) and 41(c) is enlarged or omitted for simplicity of the description.

FIGS. 41(b) and 41(c) respectively show the orientation state at a voltage of 0 V and $V_{90}$. Based on these orientation states, the above-mentioned observation results will be described. For example, a region whose light transmittance is decreased when observed at a tilt under the application of no voltage (i.e., region D of FIG. 40) is considered to correspond to the case where the liquid crystal orientation in the TN cell is observed in the 6 o'clock direction under the application of a voltage. More specifically, the front side of the Z=d/2 surface with respect to the direction of the drawing surface is tilted in the positive direction of a z-axis. This corresponds to a portion of the A—A' cross-section excluding the vicinity of a wall surface on the left side and the vicinity of the center portion. The orientation of this portion is identical with the observation results. Thus, based on the observation results and the axisymmetry of the orientation, the orientation of a portion of the A—A' cross-section of FIG. 41(b) excluding the vicinity of the wall surfaces on the right and left sides and the vicinity of the center portion can be expected.

Furthermore, based on the fact that the tilt of the A—A' cross-section, as shown in FIG. 41(c), is obtained without fail under the application of a voltage, the orientation of the center portion can be expected. The orientation of the vicinity of the wall surfaces on the right and left sides are expected based on the fact that the disclination lines are not formed at all therein. Here, it is expected that the discontinuous lines are formed on surfaces vertical to the z-axis, passing through the 0 and d faces of the z-axis in the vicinity of the wall surfaces in the right and left sides. However, as understood from FIG. 41(c), no disclination lines are formed within the liquid crystal droplets, and hence, light scattering, rotation of polarization, and the like are not strongly exhibited.

One feature of the above-mentioned orientation is that there is no substantial difference in orientation between the application of a voltage and the application of no voltage except for the rise in the z-axis direction. Thus, the orientation under the application of a voltage is partially retained under the application of no voltage, so that large distortion of the orientation due to the application of a voltage can be prevented. This is an essential mechanism in which disclination lines are not formed.

CONSTRUCTION EXAMPLE 27

Hereinafter, Example 7 will be described based on Construction Example 27.

The same substrates as that of Construction Example 26 were produced, and the photomask 15e shown in FIG. 39 was placed thereon. Then, a mixture was injected into the cell in the same way as in Example 1. The mixture was obtained by mixing 0.1 g of R-684 (manufactured by Nippon Kayaku Co., Ltd.), 0.05 g of styrene, 0.70 g of isobornyl methacrylate, 0.15 g of perfluorooctyl acrylate, 4 g of liquid crystal material ZLI-4792 (containing 0.4% by weight of S-811: manufactured by Merck & Co., Inc.), and 0.0025 g of photopolymerization initiator (Irgacure 651).

The cell was exposed to UV-rays with the same intensity through the same pattern of the photomask under the same voltage application conditions as those of Construction Example 26.

The cell thus obtained was observed with a polarizing microscope in the same way as in Construction Example 26, indicating that liquid crystal domains having the same size and arrangement pitch as those of the dot pattern of the photomask 15e were formed.

Then, two crossed-polarizing plates were attached to both sides of the display cell to fabricate the liquid crystal display device in which the liquid crystal regions are partitioned by the polymer walls.

(Observation of Cell and Method for Expecting Orientation State)

The cell thus obtained was observed with a polarizing microscope, indicating that each pixel was occupied with almost one liquid crystal domain, the polar of the liquid crystal orientation was vertical to the cell surface, and a schlieren texture in which the liquid crystal molecules were radially or concentrically oriented in each liquid crystal domain was formed. The electrooptical characteristics of the cell and the observation results are shown in Table 14. Also, the cell was observed with a polarizing microscope under the application of a voltage, indicating that the liquid crystal droplets became dark with the application of a voltage, and disclination lines were formed at the periphery of each liquid crystal droplet.

As understood from Table 14, the cell of Construction Example 27 has no problem of reverse contrast viewing caused in the conventional TN cell. In addition, in the cell of Construction Example 27, the increase in light transmittance in a direction, largely apart from the normal line to the panel, at the time of saturation of a voltage is not observed. In this measurement, it is assumed that light transmittance in the case of using two parallel polarizing plates is 100%.

Furthermore, while being tilted, the cell was observed with a polarizing microscope under the application of no electric field in the same way as in Construction Example 26, whereby orientation of the liquid crystal molecules was expected.

Figures 42A, 42B:
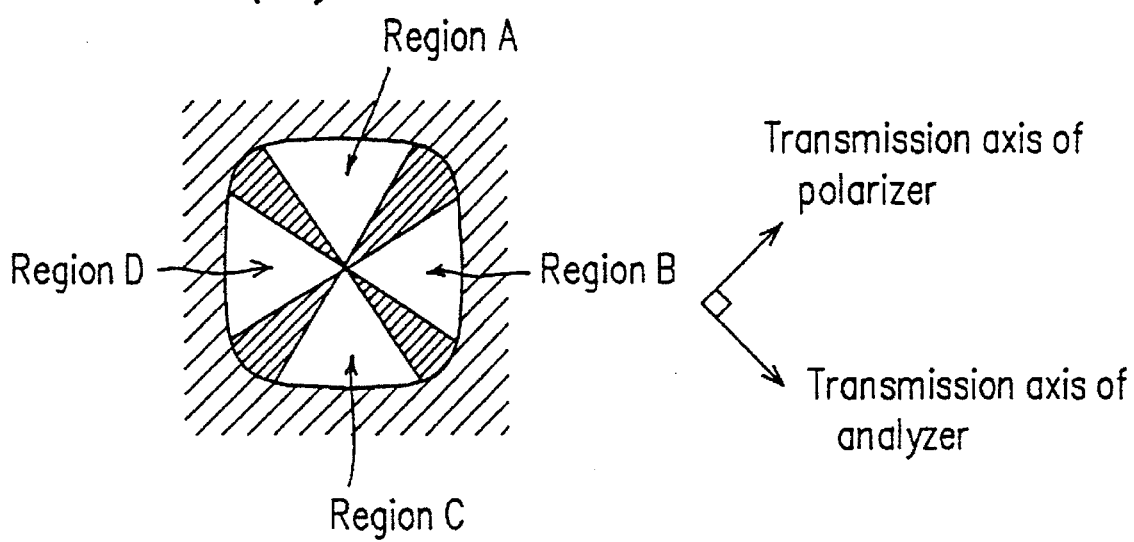
FIGS. 42(a) and 42(b) are diagrams showing observation results of a liquid crystal display device produced in Construction Example 28.

The observation results are shown in FIGS. 42(a) and 42(b). FIGS. 42(a) and 42(b) are obtained in the same way as in FIGS. 40(a) and 40(b).

While being tilted, the cell was rotated in its plane with respect to the center of the observed regions, the extinction pattern was not rotated. This shows that the liquid crystal molecules in each liquid crystal region were symmetrically oriented with respect to its axis in the same way as in Construction Example 26.

However, unlike Construction Example 26, the respective regions A, B, C, and D surrounded by the transmission axes of the polarizer and the analyzer did not have their brightness changed depending upon the tilt of the cell. This shows that the cell has no axisymmetric pretilt in the liquid crystal orientation.

Figures 43A, 43B, 43C:
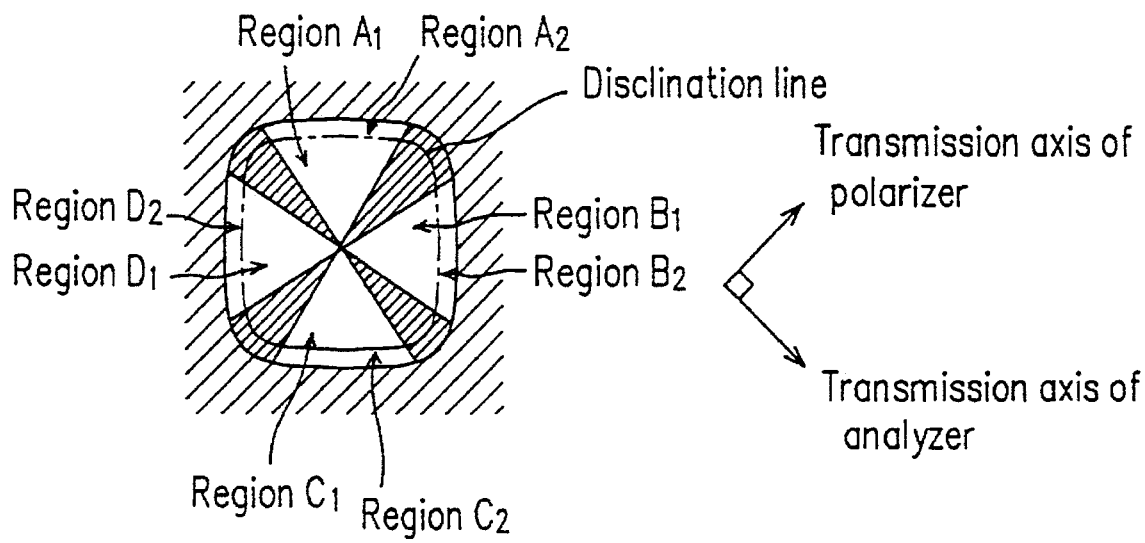
FIGS. 43(a) to 43(c) are diagrams showing observation results of the liquid crystal display device produced in Construction Example 28.

The cell was observed under the application of a voltage having a rectangular wave of 60 Hz and 3 $V_{p-p}$. The results are shown in FIGS. 43(a) to 43(c). FIG. 43(a) shows observed regions $A_1$, $A_2$, $B_1$, $B_2$, $C_1$, $C_2$, $D_1$, and $D_2$; FIG. 43(b) shows the brightness of the regions $A_1$, $B_1$, $C_1$, and $D_1$; and FIG. 43(c) shows the brightness of the regions $A_2$, $B_2$, $C_2$, and $D_2$. The observation results make it possible to expect the distribution of tilt of the liquid crystal molecules in the liquid crystal droplet under the application of a voltage.

The respective regions $A_1$, $A_2$, $B_1$, $B_2$, $C_1$, $C_2$, $D_1$, and $D_2$ surrounded by the transmission axes of the polarizer and the analyzer of FIG. 43(a) had their brightness changed depending upon the tilt of the cell. The distribution of the brightness was not changed by the above rotation. This shows that the cell has axisymmetric pretilt in the liquid crystal orientation under the application of a voltage. The distribution of brightness inside and outside of the disclination line is inverted in the right and left sides of the liquid crystal region. This shows that the disclination line partitions regions having different tilts, i.e., this disclination line is a reverse tilt disclination line or Helfrich wall. The liquid crystal orientation was expected by using this polarizing microscope observation. The results are shown in FIGS. 44(a) and 44(b).

(Results of Expecting Orientation)

Figure 44A:
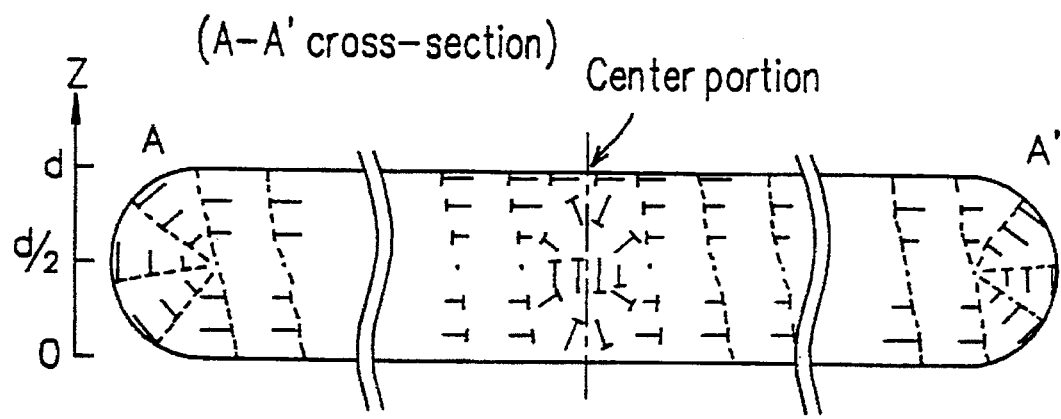
FIGS. 44(a) and 44(b) are diagrams used for expecting the orientation of liquid crystal molecules of the liquid crystal display device produced in Construction Example 28.
Figure 44B:
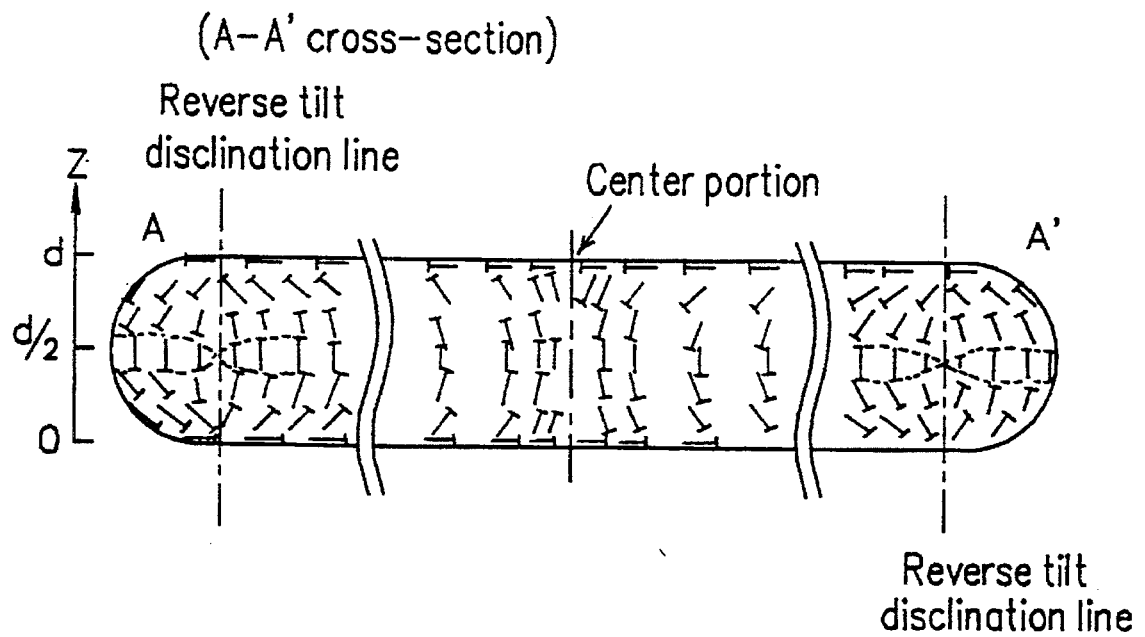

FIGS. 44(a) and 44(b) correspond to FIGS. 41(b) and 41(c), respectively, using the same marks.

FIGS. 44(a) and 44(b) respectively show the orientation state at a voltage of 0 V and $V_{90}$. Based on these orientation states, the above-mentioned observation results will be described. For example, regions whose light transmittance is decreased when observed at a tilt under the application of a voltage (i.e., regions $D_1$ and $B_2$ of FIG. 43(a)) is considered to correspond to the case where the liquid crystal orientation in the TN cell is observed in the 6 o'clock direction under the application of a voltage. More specifically, the front side of the Z=d/2 surface with respect to the direction of the drawing surface is tilted in the positive direction of a z-axis. This corresponds to a portion of the A—A' cross-section excluding a region surrounded by a wall surface on the left side and the reverse tilt disclination line, and a portion of the A—A' cross-section excluding a region surrounded by a wall surface on the right side and the reverse tilt disclination line. The orientation of these portions is identical with the observation results. Thus, based on the observation results and the axisymmetry of the orientation, the orientation of a portion of the A—A' cross-section of FIG. 44(b) excluding the vicinity of the wall surfaces on the right and left sides and the vicinity of the center portion can be expected.

Furthermore, when a voltage is decreased to 0 under this condition, since the same light transmittance is obtained in the regions B and D of FIG. 42(a), it is considered that there is almost no tilt on the z=d/2 face. Because of this, the orientation in the portions other than the center portion and the vicinity of the wall surfaces on the right and left sides of FIG. 44(a) can be expected. Furthermore, based on the fact that the tilt of the A—A' cross-section, as shown in FIG. 44(b), is obtained without fail under the application of a voltage, the orientation of the center portion can be expected. The orientation in the vicinity of the wall surfaces on the right and left sides is expected based on the continuity on the interfaces during the formation of the liquid crystal droplets and fact that the reverse tilt disclination lines are formed.

One feature of the above-mentioned orientation is that under the application of no voltage, the rising direction of liquid crystal molecules in the z-axis direction of the center portion and that of the vicinity of the wall surfaces are inverted. Because of this orientation, the boundary, of regions in which the rising directions of the liquid crystal molecules, are different under the application of no voltage, causes a rapid change in spatial distribution of refractive index. As a result, the scattering of transmitted light or depolarization is caused to form a polarization component different from that of incident light. This component is observed as a bright line.

CONSTRUCTION EXAMPLE 28

Hereinafter, Example 7 will be described based on Construction Example 28.

A cell was fabricated and exposed to UV-rays at 95° C. (temperature at which ZLI-4792 is changed to an isotropic phase: 91° C.) in the same way as in Construction Example 26.

Figure 45:
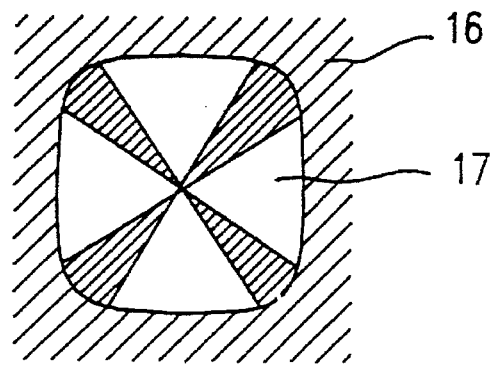
FIG. 45 is a plan view of a pixel portion of a liquid crystal display device produced in Construction Example 29.

The orientation of the cell was similar to that of Construction Example 26. However, the phase separation between the liquid crystal and the polymer material was gradually effected, resulting in a decreased amount of liquid crystal contained in the polymer material. Furthermore, the liquid crystal was completely phase-separated from the polymer material so that the liquid crystal molecules were oriented in a slightly deformed concentric circle, i.e., a square shape with its corners slightly rounded, in the case of using a square-shaped pixel as shown in FIG. 45.

In such a cell exhibiting anisotropy in four directions, viewing angle characteristics in a gray-scale display can be improved by disposing the polarizing plates so that their polarizing axes are positioned respectively in the vertical and horizontal directions, or disposing the polarizing plates so as to be respectively tilted to the right and to the left at an angle of 45° from the vertical direction.

In Example 7, the liquid crystal molecules are radially oriented in an omnidirection with respect to the center of each pixel. Thus, the conventional problems, such as a narrow range of an observation direction and reverse contrast viewing, can be overcome. A wide observing direction without reverse contrast viewing can be realized.

In particular, in the present example, the polymer is prevented from entering the pixels, each pixel includes the fewest number of liquid crystal domains, and liquid crystal molecules are axisymmetrically oriented with the disclination lines completely suppressed. Therefore, the viewing angle characteristics and light transmittance under the application of no voltage are improved, resulting in a satisfactory black level under the application of a voltage and high contrast.

CONSTRUCTION EXAMPLE 29

The same cell as that of Construction Example 26 was fabricated, and a mixture was injected into the cell. The mixture was obtained by mixing 0.1 g of R-684 (manufactured by Nippon Kayaku Co., Ltd.), 0.05 g of p-fluorostyrene, 0.60 g of isobornyl methacrylate, 0.15 g of perfluorooctyl acrylate, 0.1 g of bifunctional polymerizable liquid crystal material represented by the following Formula 4, 4 g of liquid crystal material ZLI-4792 (twist angle was adjusted by S-811 so as to be 90° in the cell : manufactured by Merck & Co., Inc.), and 0.0025 of photopolymerization initiator (Irgacure 651).

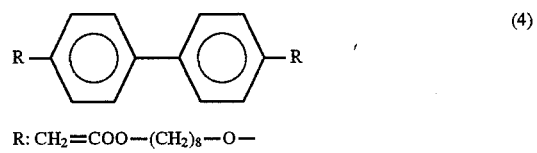

$R: CH_2=COO-(CH_2)_8-O-$

The same photomask as that of Construction Example 26 was placed on the cell, and the cell was irradiated with UV-rays under the application of a voltage to cure the photopolymerizable resin. Crossed polarizing plates were attached to both sides of the cell to produce a liquid crystal display device in which the liquid crystal regions were partitioned by the polymer walls.

The cell thus obtained was observed with a polarizing microscope, indicating that the same phase separation state and orientation state of the liquid crystal as that of Construction Example 26 were obtained. Then, the cell was observed under the application of a voltage, revealing that no disclination lines were formed. Separately, a wedge cell was fabricated and a mixture, obtained by mixing the above-mentioned materials excluding S-811, was injected into the cell. Here, the wedge cell is a cell obtained by attaching two substrates to each other at some angle. In the wedge cell, a distance between the substrates (cell gap) can be successively varied. The cell thus obtained was irradiated with monochromatic light, and measured for its apparent Δ n. As a result, the measured Δ n was found to be hardly different from Δ n peculiar to the liquid crystal material. When the cell was observed while being tilted, the change in coloration, which was considered to be caused by a large change in refractive index, was hardly observed, compared with the case where a monofunctional polymerizable liquid crystal material was used. It can be expected from these facts that the cell of the present example has small pretilt.

EXAMPLE 8

Example 8 is characterized by the structure of a photomask. The size of each light-shielding portion of the photomask is smaller than that of each segmented electrode so that a plurality of light-shielding portions correspond to each pixel.

By allowing the phase separation between the liquid crystal and the polymer material to be effected under the application of a voltage, using such a photomask, a liquid crystal display device in which a plurality of liquid crystal regions are present in each pixel can be obtained. Also, in the present example, it is not necessary to align the light-shielding portions with the pixels, as long as the light-shielding portions are formed at an equal distance from each other over the entire display region of the cell. Thus, the attaching step with precision is not required. Furthermore, disclination lines can be prevented from forming under the application of a voltage by adding a photopolymerizable liquid crystal compound to the mixture to be injected into the cell, and thus, a large viewing angle display mode excellent in contrast can be provided.

(Number of Light-Shielding Portions Per Pixel)

If the number of light-shielding portions of the photomask per pixel is too large, a number of polymer walls enter the pixel regions, resulting in a dark display. Thus, 16 or less of light-shielding portions per pixel are preferred.

(Size of Each Light-Shielding Portion)

Figure 46:
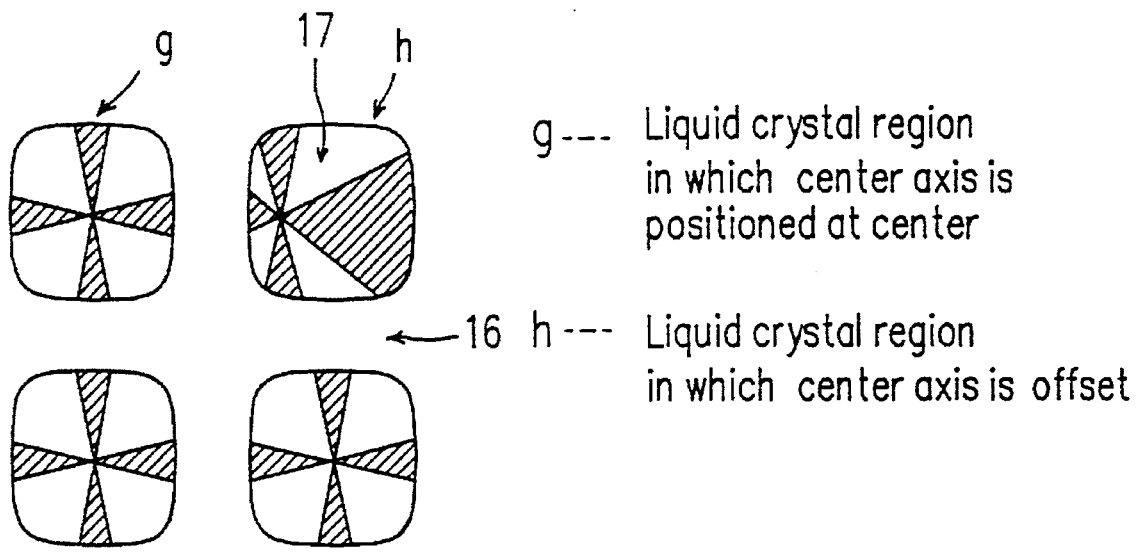
FIG. 46 is a diagram illustrating the size of each light-shielding portion of a photomask in Example 8 according to the present invention.

In the case where each liquid crystal region having a mono-domain structure is large, and the liquid crystal molecules in each mono-domain are radially or concentrically oriented, when the orientation axis is shifted from the center portion, the following occurs. A number of regions fall in blind (dark) directions, when the cell is observed from a certain direction (in the case where the cell is seen in a tilted direction), as shown in FIG. 46. As a result, the entire pixel becomes a dark state, generating a dark display variation (as represented by a hatching in the figure.). This phenomenon can be prevented in the present example by forming each pixel region with a plurality of liquid crystal regions to average the axis shift in each pixel.

For effectively averaging the axis shift in each pixel, the size of each light-shielding portion is set to be in the range of 10 to 100 µm. When the size is more than 100 µm, a display variation can be recognized and sufficient effects cannot be obtained. When the size is less than 10 µm, a number of polymer portions are formed, decreasing light transmittance.

Hereinafter, Example 8 will be described in more detail.

Two glass substrates (1.1 mm in thickness) having a transparent electrode made of ITO (50 nm in thickness) were attached to each other with a spacer (6.0 µm in diameter) interposed therebetween to fabricate a cell.

A mixture was injected into the cell in a transparent state. The mixture was obtained by mixing 0.1 g of R-684 (manufactured by Nippon Kayaku Co., Ltd.), 0.1 g of styrene, 0.4 g of isobornyl methacrylate, 0.2 g of perfluorooctyl acrylate, 0.3 g of the compound represented by Formula 3, 4 g of liquid crystal material ZLI-4792 (adjusted by S-811 so that a chiral pitch be 90° in the cell: manufactured by Merck & Co., Inc.), and 0.0025 g of photopolymerization initiator (Irgacure 651).

The injection port of the cell thus produced was light-shielded so that the polymerizable material was not cured within the cell and cured only in the portions outside of the cell, and then, the cell was sealed.

Figure 47:
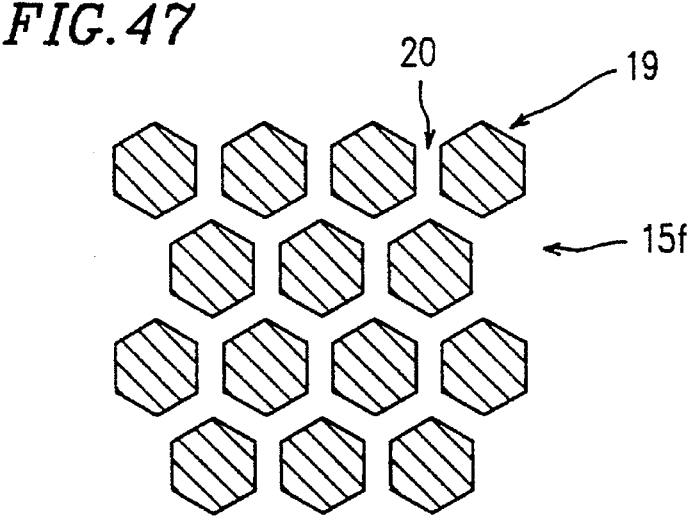
FIG. 47 is a plan view of the photomask used in Example 8 according to the present invention.
Figure 48:
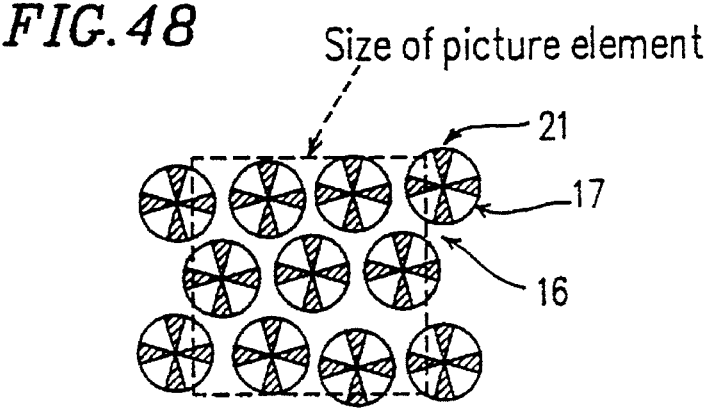
FIG. 48 is a plan view of the pixel portions of the liquid crystal display device produced in Example 8 according to the present invention.

Thereafter, a photomask 15f, shown in FIG. 47, was placed on the cell. The cell was irradiated with collimated light beams at 10 mW/cm² using a high-pressure mercury lamp through a dot pattern of the photomask 15f while applying a voltage with a square wave (effective value of ±5 V) for one second, and the cell was allowed to stand for 30 seconds without the irradiation. This cycle was repeated 20 times. Then, the display cell was irradiated with UV-rays for 10 minutes to cure the polymerizable material. After the polymerizable material was cured, the display cell was observed with a polarizing microscope, indicating that liquid crystal domains having the same size and arrangement pitch as those of the dot pattern of the photomask 15f (i.e., having a structure in which average 9 liquid crystal regions 17 were formed per pixel) were formed. Furthermore, as shown in FIG. 48, almost one liquid crystal domain was present per liquid crystal region 17, and the liquid crystal molecules were symmetrically oriented with respect to the center of each liquid crystal region 17.

Next, two crossed-polarizing plates were attached to both sides of the display cell to fabricate a liquid crystal display device in which the liquid crystal regions were partitioned by the polymer walls. The cell of the present example has no problem of reverse contrast viewing caused in the conventional TN cell, and the increase in light transmittance in a direction, largely apart from the normal line to the panel, at the time of saturation of a voltage is not observed. Furthermore, the generation of disclination lines under the application of a voltage was hardly seen.

As described above, in Example 8, the size of each light-shielding portion is smaller than that of each pixel. Therefore, the precision alignment of the light-shielding portions with the pixels is not required, simplifying the production steps and apparatus.

Figure 49A:
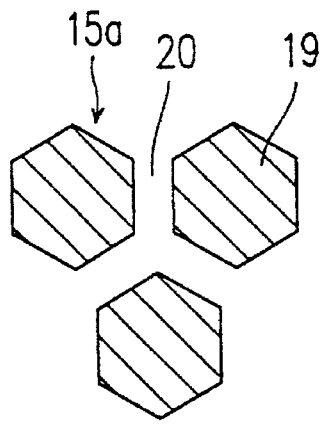
FIGS. 49(a) and 49(b) are diagrams respectively showing an example of a photomask usable in the present invention and a liquid crystal region to be obtained.
Figure 49B:
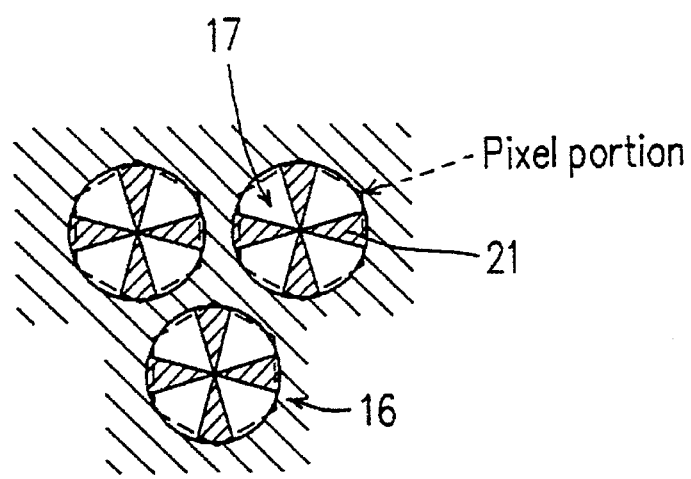
Figure 50:
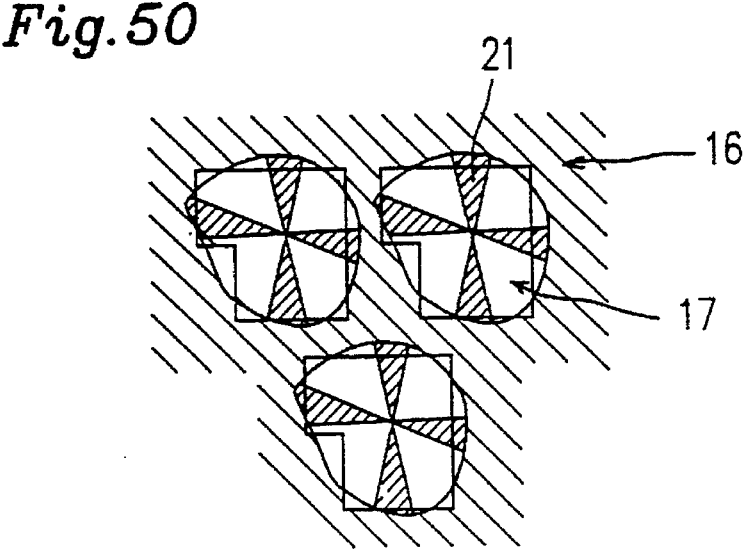
FIG. 50 is a diagram showing an example of a photomask usable in the present invention and a liquid crystal region to be obtained.
Figure 51A:
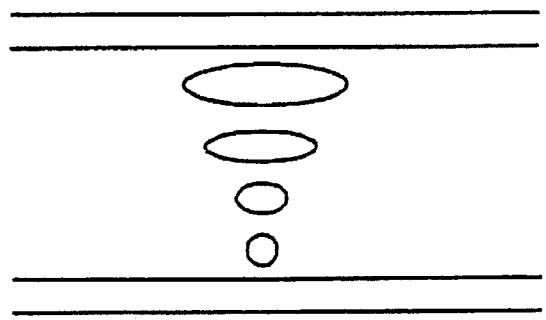
FIGS. 51(a) to 51(c) are cross-sectional views illustrating the behavior of liquid crystal molecules of a conventional liquid crystal display device.
Figure 51B:
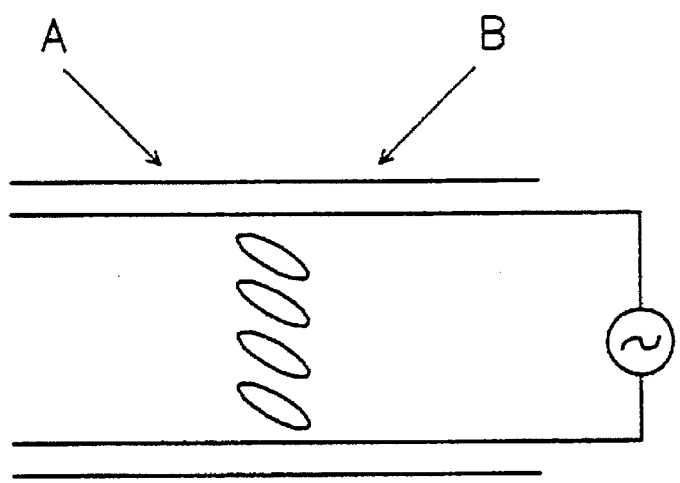
Figure 51C:
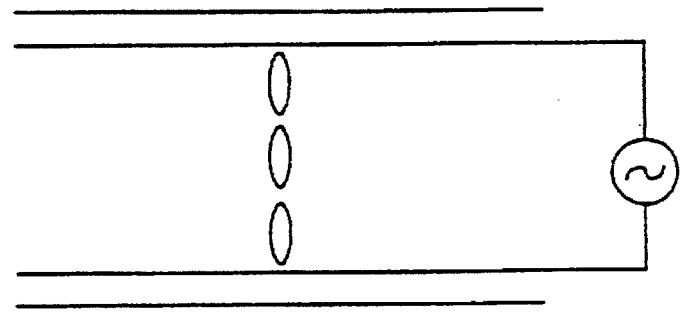

According to the present invention, photomasks with shapes other than the above-mentioned ones can be used. The relationship between the liquid crystal region to be formed and the photomask is exemplified here. In the case where a photomask 15g having light-shielding portions 19 in the form of a hexagon shown in FIG. 49(a) is used, liquid crystal regions 17, as shown in FIG. 49(b), are formed. In FIG. 49(b), a broken line represents the contour of each light-shielding portion 19 of the photomask 15g. FIG. 50 shows the relationship in size between the photomask 15g and the liquid crystal regions 17 in the case where the photomask 15g (the contour of which is represented by a solid line) in the form of a square with its corner cut out is used.

The following effects can be obtained by using the liquid crystal display device and the method for producing the same according to the present invention.

Liquid crystal filled in a plurality of liquid crystal regions in a display medium layer can be radially or concentrically oriented in an imaginary plane parallel with the substrate surface. At least one liquid crystal domain can be formed in each of the plurality of liquid crystal regions. Thus, when the angle and direction in which the liquid crystal display device of the present invention are observed from outside are changed, the dependence of display contrast on a viewing angle can be eliminated because of the radial or concentric orientation of the liquid crystal molecules. Moreover, the radial orientation of the liquid crystal molecules prevents the disclination lines from forming in the liquid crystal regions, resulting in a remarkably improved display quality. Furthermore, light transmittance under the application of no voltage is improved, and thus, a light image with satisfactory display quality can be displayed even under the application of no voltage.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for producing a liquid crystal display device comprising the steps of:
   (1) providing a mixture containing a liquid crystalline compound and a photopolymerizable compound between two substrates, at least one of which is transparent; and
   (2) irradiating light having a predetermined irradiation intensity distribution to the mixture between the two substrates, allowing a phase separation of the mixture involved in polymerization thereof to be effected, and uniformly distributing supporting walls made of a resin and a liquid crystal.

2. A method for producing liquid crystal display device according to claim 1, wherein a photopolymerization initiator is added to the mixture.

3. A method for producing a liquid crystal display device according to claim 1, wherein, in step (2), a uniform distribution of the supporting walls and the liquid crystal is determined so as to correspond to an arrangement pitch of a plurality of pixels defined by the two substrates.

4. A method for producing a liquid crystal display device according to claim 1, wherein step (2) includes alignment treatment for allowing molecules of the liquid crystal partitioned by the supporting walls to be axisymmetrically oriented in an imaginary plane parallel with a surface of the substrates.

5. A method for producing a liquid crystal display device according to claim 4, wherein a light-shield corresponds to a center portion of an axisymmetric orientation of the liquid crystal molecules is formed on either of the two substrates.

6. A method for producing a liquid crystal display device according to claim 1, wherein the mixture is irradiated with light having a uniform irradiation intensity distribution under a condition that UV-rays having short wavelengths of 300 nm or less are shielded.

7. A method for producing a liquid crystal display device according to claim 6, wherein short wavelength UV-rays are shielded using a UV-rays cut filter.

8. A method for producing a liquid crystal display device according to claim 6, wherein the UV-rays component in a short wavelength region is shielded by using an inorganic and organic material which makes transmittance of light with a wavelength of 300 nm not more than 10% and transmittance of light with a wavelength of 350 nm at least 40%, assuming that light transmittance with respect to air is 100%.

9. A method for producing a liquid crystal display device according to claim 1, wherein at least one of a substantially controlled electric field and a magnetic field is applied to the mixture during light irradiation.

10. A method for producing a liquid crystal display device according to claim 9, wherein the electric field is supplied using an electrode for a display.

11. A method for producing a liquid crystal display device according to claim 1, wherein light having the predetermined irradiation intensity distribution is formed by using a photomask.

12. A method for producing a liquid crystal display device according to claim 1, wherein the photopolymerizable compound includes a fluorinated compound.

13. A method for producing a liquid crystal display device comprising the steps of:
   injecting a mixture containing a liquid crystalline compound, a photopolymerizable compound, and a liquid crystalline photopolymerizable compound between electrode substrates in a cell, at least one of the substrates being transparent; and
   irradiating the mixture with light having a uniform irradiation intensity distribution while at least one of an electric field and a magnetic field is applied to the mixture, thereby allowing phase separation involved in polymerization to be effected.

14. A method for producing a liquid crystal display device according to claim 13, wherein a temperature of the cell during light irradiation is set to be at least a temperature at which liquid crystal to be used exhibits an isotropic phase, and then the cell is cooled.

* * * * *